US007680696B1

(12) United States Patent
Murray

(10) Patent No.: US 7,680,696 B1
(45) Date of Patent: Mar. 16, 2010

(54) COMPUTER PROCESSING SYSTEM FOR FACILITATING THE ORDER, PURCHASE, AND DELIVERY OF PRODUCTS

(76) Inventor: Thomas G. Murray, 3523 Cooper Creek Rd., Denton County, TX (US) 76208-3203

( * ) Notice: Subject to any disclaimer, the term of this patent is extended or adjusted under 35 U.S.C. 154(b) by 1084 days.

(21) Appl. No.: 11/320,161

(22) Filed: Dec. 28, 2005

Related U.S. Application Data

(62) Division of application No. 10/125,097, filed on Apr. 17, 2002, now abandoned.

(60) Provisional application No. 60/347,958, filed on Jan. 12, 2002.

(51) Int. Cl.
*G06Q 30/00* (2006.01)
(52) U.S. Cl. .......................................... 705/26; 705/27
(58) Field of Classification Search ................ 705/26, 705/27
See application file for complete search history.

(56) References Cited

U.S. PATENT DOCUMENTS

| | | | |
|---|---|---|---|
| 4,799,156 A | 1/1989 | Shavit et al. | |
| 5,319,542 A | 6/1994 | King, Jr. et al. | |
| 5,740,425 A | 4/1998 | Povilus | |
| 5,799,289 A | 8/1998 | Fukushima et al. | |
| 5,893,093 A | 4/1999 | Wills | |
| 5,918,214 A | 6/1999 | Perkowski | |
| 5,960,411 A | 9/1999 | Hartman et al. | |
| 5,991,739 A | 11/1999 | Cupps et al. | |
| 5,995,943 A | 11/1999 | Bull et al. | |
| 6,014,644 A | 1/2000 | Erickson | |
| 6,052,670 A | 4/2000 | Johnson | |
| 6,055,519 A | 4/2000 | Kennedy et al. | |
| 6,064,979 A | 5/2000 | Perkowski | |
| 6,078,897 A * | 6/2000 | Rubin et al. | 705/14 |
| 6,081,789 A | 6/2000 | Purcell | |
| 6,085,170 A | 7/2000 | Tsukuda | |
| 6,101,484 A | 8/2000 | Halbert et al. | |
| 6,131,087 A | 10/2000 | Luke et al. | |
| 6,148,289 A | 11/2000 | Virdy | |

(Continued)

FOREIGN PATENT DOCUMENTS

JP  2001-155067 A1  8/2001

(Continued)

OTHER PUBLICATIONS

NorthFarm; NF-One Enhancements; Date Unknown.

(Continued)

*Primary Examiner*—Robert M. Pond
(74) *Attorney, Agent, or Firm*—Scheef & Stone, LLP; Jack D. Stone, Jr.

(57) ABSTRACT

A method for facilitating the ordering of two or more products, wherein a data repository receives from each respective buyer of two or more buyers at least two respective orders for purchase quantities of units of at least two products of said two or more products. The data repository calculates, substantially contemporaneously with the step of receiving, a composite order comprising the total units of each of said two or more products specified in each respective order received from each respective buyer. A near valid order quantity is determined with reference to said total units, and the purchase quantity is adjusted with reference to the total units taken with respect to the near valid order quantity.

35 Claims, 30 Drawing Sheets

U.S. PATENT DOCUMENTS

| | | | |
|---|---|---|---|
| 6,188,994 B1 | 2/2001 | Egendorf | |
| 6,249,772 B1 | 6/2001 | Walker et al. | |
| 6,249,773 B1 | 6/2001 | Allard et al. | |
| 6,260,024 B1 | 7/2001 | Shkedy | |
| 6,263,317 B1 | 7/2001 | Sharp et al. | |
| 6,269,343 B1 | 7/2001 | Pallakoff | |
| 6,272,472 B1 | 8/2001 | Daneels et al. | |
| 6,285,986 B1 | 9/2001 | Andrews | |
| 6,336,100 B1 | 1/2002 | Yamada | |
| 6,338,050 B1 | 1/2002 | Conklin et al. | |
| 6,351,738 B1 | 2/2002 | Clark | |
| 6,405,176 B1 | 6/2002 | Toohey | |
| 6,418,441 B1 | 7/2002 | Call | |
| 6,442,544 B1 | 8/2002 | Kohli | |
| 6,484,150 B1 | 11/2002 | Blinn et al. | |
| 6,490,567 B1 | 12/2002 | Gregory | |
| 6,493,724 B1 | 12/2002 | Cusack et al. | |
| 6,499,052 B1 | 12/2002 | Hoang et al. | |
| 6,553,346 B1 | 4/2003 | Walker et al. | |
| 6,553,350 B2 | 4/2003 | Carter | |
| 6,574,608 B1 | 6/2003 | Dahod et al. | |
| 6,578,030 B1 | 6/2003 | Wilmsen et al. | |
| 6,584,451 B1 | 6/2003 | Shoham et al. | |
| 6,714,922 B1 | 3/2004 | Sansone et al. | |
| 6,876,983 B1 | 4/2005 | Goddard | |
| 6,934,690 B1 | 8/2005 | Van Horn et al. | |
| 6,963,847 B1 | 11/2005 | Kennedy et al. | |
| 2001/0014878 A1 | 8/2001 | Mitra et al. | |
| 2001/0027431 A1 | 10/2001 | Rupp et al. | |
| 2001/0032162 A1 | 10/2001 | Alsberg et al. | |
| 2001/0032163 A1 | 10/2001 | Fertik et al. | |
| 2001/0044758 A1 | 11/2001 | Talib et al. | |
| 2002/0023123 A1 | 2/2002 | Madison | |
| 2002/0029193 A1 | 3/2002 | Ranjan et al. | |
| 2002/0042756 A1 | 4/2002 | Kumar et al. | |
| 2002/0077932 A1* | 6/2002 | Mukai | 705/26 |
| 2002/0082887 A1 | 6/2002 | Boyert et al. | |
| 2002/0087332 A1 | 7/2002 | Como | |
| 2002/0087522 A1 | 7/2002 | MacGregor | |
| 2002/0133425 A1 | 9/2002 | Pederson et al. | |
| 2002/0161646 A1 | 10/2002 | Gailey et al. | |
| 2002/0188689 A1 | 12/2002 | Michael | |
| 2003/0018536 A1 | 1/2003 | Eggebraaten et al. | |
| 2003/0055744 A1 | 3/2003 | Walker et al. | |
| 2003/0061114 A1 | 3/2003 | Schwartz et al. | |
| 2003/0088556 A1 | 5/2003 | Allen, III | |
| 2003/0101107 A1 | 5/2003 | Agarwal et al. | |
| 2003/0142797 A1 | 7/2003 | Troy et al. | |
| 2004/0225569 A1 | 11/2004 | Bunnell | |
| 2005/0076297 A1 | 4/2005 | Tanaka | |
| 2005/0125251 A1 | 6/2005 | Berger et al. | |

FOREIGN PATENT DOCUMENTS

| | | |
|---|---|---|
| WO | WO9950771 | 10/1999 |
| WO | WO0043928 | 7/2000 |
| WO | WO0075839 A2 | 12/2000 |
| WO | WO0101315 A1 | 1/2001 |
| WO | WO0102992 A2 | 1/2001 |
| WO | WO0140904 A2 | 6/2001 |
| WO | WO0175628 A1 | 10/2001 |
| WO | WO0195224 A1 | 12/2001 |
| WO | WO0221398 A1 | 3/2002 |
| WO | WO0223445 A2 | 3/2002 |
| WO | WO03058540 A1 | 7/2003 |

OTHER PUBLICATIONS

NorthFarm; NF- One Enhancements (NorthFarm); Date Unknown.
NorthFarm; Table of Contents: Visual NF-One; Date Unknown.
NorthFarm; NF-Web: Web Based Ordering From Natural Farms; Date Unknown.
NorthFarm; NF-Web: Web Based Ordering From North Farms; Date Unknown.
NorthFarm, NF-Web (Update and FAQ); Date Unknown.
NorthFarm, NF-Web: North Farm (Update and FAQ), May 1, 2002.
NorthFarm, Cooperative Online Catalog (Other web pages); Date Unknown.
Robert J. Pickford; An Organizers' Manual for Cooperative Food Buying Clubs, Federation of Ohio River Cooperatives; 1981.
Edmund G. Brown, Jr.; How to Form a Pre-Order Co-op, California Dept. of Consumer Affairs; 1982.
Ozark Cooperative Warehouse; Buying Club Manual, Ozark Cooperative Warehouse; 1990.
Deb Maynard; Linking Buying Clubs and Retails for Co-op Development; Feb. 1997.
Deb Maynard; Northeast Cooperatives: The Business Environment; 2002.
Deb Maynard; Northeast Cooperatives: Website Development Proposal; Jun. 3, 2002.
Robert J. Kauffmann and Bin Wang; New Buyers' Arrival Under Dynamic Pricing Market Microstructure: The Case of Group-Buying Discounts on the Internet, Fall 2001.
Robert J. Kauffmann and Bin Wang; Bid Together, Buy Together; On the Efficacy of Group-Buying Business Models in the Internet-Based Selling, May 16, 2001.
Mobshop; The Value of Demand Aggregation in Public Marketplaces; 2001.
WWW.PCGUIDE.COM; Group Buying Clubs; 1997.
Hudson Valley; Hudson Valley Federation of Food Cooperatives; Oct. 28, 2001.
Ozark Cooperative Warehouse's Ordering Software; Instruction Manual; Jun. 1, 2002.
Ozark Cooperative Warehouse's Ordering Software; Supplemental Pages; Apr. 4, 2002.
Ozark Cooperative Warehouse's Ordering Software; Updated Software Memo; Jun. 18, 2002.
United Northeast, LLC.; FoodLink Electronic Ordering Form; Date unknown.
United Northeast; Buying Club Software Provided by United Natural Foods (Manual for Coordinator Mode 6.0); Jul. 2004.
United Northeast; Buying Club Software Developed by United Northeast (Manual for Coordinator Mode Version 5.0); Date Unknown.
United Northeast; Software for Buying Clubs (Manual for Coordinator Mode Version 5.0); Date Unknown.
United Northeast; Manual for FoodLink Ver 4.5; Date Unknown.
United Northeast; Member: Setup and Use of FoodLink Ver 4.5 or 5.0 Member Mode; Date Unknown.
United Northeast; FoodLink: Frequently Asked Questions; Dec. 11, 2001.
Blooming Prairie; PrairieNet.txt; Sep. 30, 1999.
Blooming Prairie; Member: Setup and Use of FoodLink; Aug. 3, 2004.
Blooming Prairie (Aaron Pierce, Coordinator); FoodLink for Members; 2001.
Blooming Prairie; Frequently Asked Questions; Jul. 13, 2001.
Blooming Prairie; FoodLink Users' Guide; May 3, 2001.
Tucson Cooperative Warehouse; Instruction Manual (and web order form attached); 2003.
Tucson Cooperative Warehouse; WebOrder, Jun. 5, 2003.
FOODCLUB.ORG; MountainPeoplesWarehouse; Date Unknown.
FOODCLUB.ORG; Frequently Asked Questions; Date Unknown.
FOODCLUB.ORG; TMG Club; Date Unknown.
FOODCLUB.ORG; Statement of Purpose; Date Unknown.
FOODCLUB.ORG; E-mail Notifying of System Membership; Jan. 31, 2002.
FOODCLUB.ORG; Links; Date Unknown.
FOODCLUB.ORG; Frequently Asked Questions (Updated); Date Unknown.
FOODCLUB.ORG; Buy Organic: Natural Foods for a Better World; Date Unknown.
FOODCLUB.ORG; Administration; Date Unknown.
FOODCLUB.ORG; Order Form- Art Dogs and Grace; Date Unknown.

FOODCLUB.ORG; Discussion of FoodClub Online Buying-Club Software; Date Unknown.

FOODCLUB.ORG; Talk Subscribers; Date Unknown.

FOODCLUB.ORG; Buy Organic; Natural Foods for a Better World (Existing Groups); Date Unknown.

FOODBUYING CLUB.COM; Demo Food Buying Club Order Split Sheet (Menu Choices); Jun. 2, 2003.

FOODBUYINGCLUB.COM; Demo Food Buying Club Administration (Administration); Jun. 4, 2003.

FOODBUYINGCLUB.COM; Demo Food Buying Club (Pages), Jun. 4, 2003.

FOODBUYINGCLUB.COM; Demo Food Buying Club Reports; Jun. 4, 2003.

FOODBUYINGCLUB.COM; Home Page (Assorted pages printout); Jun. 2, 2002.

FOODBUYINGCLUB.COM; Services/Features/Monthly Fees (Assorted pages printout); Jun. 2, 2002.

BUYORGANIC.ORG; Member Order Form for Eating Light; Jun. 10, 2003.

BUYORGANIC.ORG; In the Garden Co-op (Order Form); Jan. 3, 2002.

BUYORGANIC.ORG; OrganicCoop.com: Weekly Organic Buying Club for Pick Up; Apr. 4, 2002.

\* cited by examiner

COMPUTER PROCESSING SYSTEM FOR FACILITATING THE ORDER, PURCHASE, AND DELIVERY OF PRODUCTS

CLAIM OF PRIORITY

This application is a divisional application of U.S. patent application Ser. No. 10/125,097, now abandoned entitled "COMPUTER PROCESSING SYSTEM FOR FACILITATING THE ORDER, PURCHASE, AND DELIVERY OF PRODUCTS" filed by Thomas G. Murray, on Apr. 17, 2002, which claims priority from U.S. Provisional Patent Application No. 60/347,958 entitled "ON-LINE, REAL-TIME PROCESSING SYSTEM FOR AGGREGATION OF ORDERS, PURCHASES, AND DELIVERIES OF PRODUCTS FOR LOCAL BUYER GROUPS" filed by Thomas G. Murray, on Jan. 12, 2002, both of which applications are incorporated herein by reference in their entireties.

FIELD OF THE INVENTION

The present invention relates in general to electronic commerce and more particularly to a method of and apparatus for expediting the process of ordering and receiving products and/or services for one or more buyer groups.

BACKGROUND

Electronic communications have greatly increased the efficiency of purchasing individual products by a consumer. If the consumer knows the products to be purchased, a simple telephone call to a retailer, manufacturer, or distributor of that product can result in a satisfactory purchase. Greater flexibility is offered a consumer through other telecommunication systems, such as the Internet. With the Internet, a consumer may search for, locate, obtain detailed product information including pictures, and then purchase one or more products from a single manufacturer or distributor. After the consumer places the order over the Internet, the product is then shipped from that manufacturer or from a distributor to the consumer. Although the Internet is a highly efficient information, communications, and order processing medium for ordering products, physical limitations and costs with respect to the actual delivery of products which fulfill a single buyer's order remain unchanged.

Delivery of most products in the conventional retail system occurs through distributors which traditionally act as intermediaries between manufacturers and retailers (or businesses) to aggregate large volumes of low margin goods in order to minimize unit transportation costs. Distributors typically operate on very narrow profit margins, carefully balancing product selection, availability, price, and volume as needed to achieve a level of profitability that can sustain service delivery to the intended target market or markets.

An attempt by consumers to achieve lower cost and improved availability of products may be found in a form of organization known by varied terms such as buyer club, food club, buyer group, food coop, or local food cooperative. Such organizations may be formed when there is a common interest in ordering bulk quantities of products from a supplier of a common product, such as natural foods. Buyer group formation begins when one person (who usually becomes the buyer-coordinator) makes pre-arrangements with a supplier (such as a natural foods distributor) to be able to order any of a number of available products offered by that supplier. The buyer-coordinator receives an account number, a minimum dollar amount per order, an order cutoff time or schedule, and a delivery schedule and delivery point from the supplier, who provides the basic information needed for the buyer-coordinator to plan each order cycle for the local food cooperative. The cutoff time is typically expressed by both date and hour, such as 9 AM on Thursday, May $12^{th}$.

The buyer-coordinator preferably undertakes a number of activities for the food coop, which are in addition to the separate and distinct activities of each buyer. Preferably, buyer-coordinator activities include setting up the order cycle, setting product pricing, determining the exact products and final quantities of units of products to be ordered for the group, notifying the supplier as to the composite order to be placed (the total quantity of each product with all the products further being included in the single order for all the buyers in a group being referred to as the "composite order"), paying the supplier, arranging for collection of the shipment from the delivery point, transporting the shipment to a buyer pickup site, breaking down the orders by buyer, collecting payment from the buyers, and reconciling any order discrepancies. The buyer-coordinator is preferably also a buyer of products.

Buyers may preferably have limited access to buyer-coordinator related activities and preferably cannot, as one example, update the supplier with the buyer's single order nor change product pricing to the group. While the buyer coordinator preferably performs the above mentioned activities, many of these may also be performed by a retailer, a third party agent, a distributor or one or more other buyers may also handle certain of the above activities.

Each order cycle occurs in two distinct phases, an order phase and a delivery phase (a cutoff event separates these phases). The buyer-coordinator handles most tasks but will often enlist assistance from other buyers in the local food cooperative. At the beginning of each order cycle, the buyer-coordinator preferably will select a supplier and the products for that order cycle, and may send out by e-mail a list of products and prices to each of the buyers in the local coop. Alternatively, buyers may telephone, fax, or e-mail orders to the buyer-coordinator by selecting a product from a pre-printed catalogue. Orders from buyers must be received back by the buyer-coordinator by a specific date and time (i.e., say up to 9 AM on the 12th of May), which is termed in this document, the cutoff event, cutoff time, or simply cutoff. After the cutoff occurs, orders from buyers are no longer accepted for that order cycle. The buyer-coordinator then aggregates the orders into a single composite order and sends this composite order by e-mail, fax, file transfer, or telephone to the supplier. The supplier then receives the composite order as a purchase of those products by that buyer group for that order cycle, which starts the delivery phase.

The total quantities of products ordered by the buyer group affect both their availability and pricing. Some suppliers will ONLY accept orders for many products in caseload quantities (the terms "case", "caselot", "case lot", "caseload", and "case load" are used interchangeably). For those products that require caseload orders from a supplier, the product preferably will not be ordered from the supplier unless the total volume of units achieves exactly one or more of the pre-defined caseload quantities of units for that product. Therefore, if there are 12 units to a case, and the product is only sold by the case, then an order may preferably only be placed in units of 12, 24, 36, 48 and so on (ie, all the integer multiples of the 12 units). Any integer multiple of the pre-defined units that achieve one or more case lot quantities of units is referred to as an "integer multiple of case lot units", "integer number of case lots", "integral caselot quantity", "case quantity", caselot quantity", "caseload quantity", or a "valid order quantity", and these terms may be used interchangeably and in the singular and in the plural to define the same concept.

Some products as noted are only sold by the case, other products are sold by the unit, and some products are sold by both the case and by the unit and achieve a price break only as one or more case quantities of units or set number of units is achieved. For those circumstances where a product is sold by both cases and by units, there are often significant pricing surcharges for placing unit orders versus caseload quantity orders.

In addition, typically a minimum dollar amount per composite order is required before suppliers will accept an order from a buyer group. This minimum dollar amount may be needed to enable a truck to achieve a sufficiently high route density to pay for the transportation costs for shipment of the product over the necessary distance to the delivery point and also may be necessary to justify the cost to prepare an order for delivery to a customer. As examples, minimum dollars required for an order may be as low as $10 and as high as $1,000 or more, but preferably range from $300 to $700. Without a total dollar order from a buyer group equaling or exceeding some minimum dollar amount, an order may not be accepted by a supplier. Finally, as volumes increase, some suppliers provide dollar volume discounts for attaining total dollar order volumes of the aggregate order which exceed pre-established threshold amounts. An example of such a threshold structure can be, say $1,000 to $2,999 achieving a 1% discount, $3,000 to $4,999 achieving a 2% discount, and $5,000 and above achieving a 3% discount.

The supplier, after receiving the composite order to purchase products from the buyer group, preferably ships the products typically by truck to a pre-established delivery point where it will be collected by one or more buyers of the group. The shipped products for that group may then preferably be brought to a separate buyer pickup site. Alternatively, the buyer pickup site may be the delivery point (for example, if a retailer is operating the buyer group). The delivery point may be a church, retail store, parking lot, or a convenient spot for the truck to meet with the party collecting the shipment. The buyer pickup site may be the home of the buyer coordinator, a home of the buyer, or as noted above, a retail store.

The shipment, which is divided by product, is typically re-distributed from product cases into separate boxes or containers sorted by buyer in which each box includes the proper quantities of units for each product that the buyer ordered. This is called "breaking down" the order. Then at pre-agreed times after break-down of the order, each buyer will retrieve the boxes or containers which contain their order. The buyer-coordinator may collect payment at the time of the buyer's pickup of the products or may require payment at the time of placement of the order (which may occur just after the cutoff).

To speed communications among buyers, buyer-coordinators of such groups often use e-mail to send out product/price lists, product availability information, and communicate planning, ordering and delivery schedules. Then buyers send back by e-mail the orders for those products they want to buy for that order cycle. While the use of the e-mail system in this fashion is more efficient than verbal telephone communications, large amounts of time are still consumed. The quantities of units for each product ordered must be tallied up for aggregation and submission to the supplier.

Typically there are numerous follow up conversations or communications that the buyer-coordinator makes to adjust order quantities to achieve the exact integer quantities of units needed to make one or more cases. This often requires numerous calls or communications as one change begets another and then another, all of which need to be coordinated and concluded between multiple buyers by the cutoff. Finally, to reduce pressure and last minute communications and achieve that amount of units allowing caseload quantity orders, buyer-coordinators will sometimes order extra quantities of products and include these in a "surplus" account. This places the extra units of those products in the group's inventory. In essence, to enable an order for a product to be placed to satisfy various buyer's orders and to minimize "pre-selling" additional units needed to achieve case quantities of units, the buyer-coordinator may choose to assume inventory risk.

To improve over manual compilation and communication of buyer orders, at least two computer software programs have been developed which operate on a personal computer. These computer software programs allow the buyer-coordinator to download product/price lists from a supplier and allow some aggregation of buyer's orders but only after the buyer-coordinator has received these orders back from the buyers. The software programs can calculate account balances for each buyer in each order cycle and can electronically submit to the supplier the composite order for the order cycle. However, both of these computer software programs use an intermittent hub and spoke communications mode which does not allow for an integrated system operating in an updated real-time mode.

Although an improvement over purely manual systems, there are many major disadvantages of the existing computer software programs. Since these programs function only by collecting order data on each individual's personal computer, they do not aggregate group orders on an ongoing basis and thus they do not allow collaboration among all buyers of the buyer group using the latest information so as to achieve optimal aggregated quantities of products. Another fundamental and critical disadvantage is the inability of each buyer, at the time the buyer is placing their order, to know what quantities that buyer will need to purchase to ensure a case lot quantity is obtained and then, as the process unfolds, to determine any further order changes might be needed or advisable. The existing computer software programs also do not allow buyers real-time access to supplier information as part of the order process. Furthermore such computer software programs are unable to automatically send notifications between buyers and to and from suppliers with respect to changes and updates which are occurring or are needed and thus they do not enable optimized orders to be created throughout the order cycle.

It would thus be desirable to have a system that minimizes the time-consuming accumulation and distribution of product ordering and delivery information and optimizes the order, payment, and delivery of products for buyers in local buyer groups.

SUMMARY OF THE INVENTION

The present invention relates to a system and method in which buyers of local buyer groups are able to, collaboratively and in real-time, aggregate orders, purchases, payments, and deliveries of products from one or more suppliers to achieve substantial time savings and performance benefits for all participants. This is achieved by facilitating the ordering of two or more products, wherein a data repository receives from each respective buyer of two or more buyers at least two respective orders for purchase quantities of units of at least two products of said two or more products. The data repository calculates, substantially contemporaneously with the step of receiving, a composite order comprising the total units of each of said two or more products specified in each respective order received from each respective buyer. A near valid order quantity is determined with reference to said total units, and the purchase quantity is adjusted with reference to the total units taken with respect to the near valid order quantity.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

Figure 1:
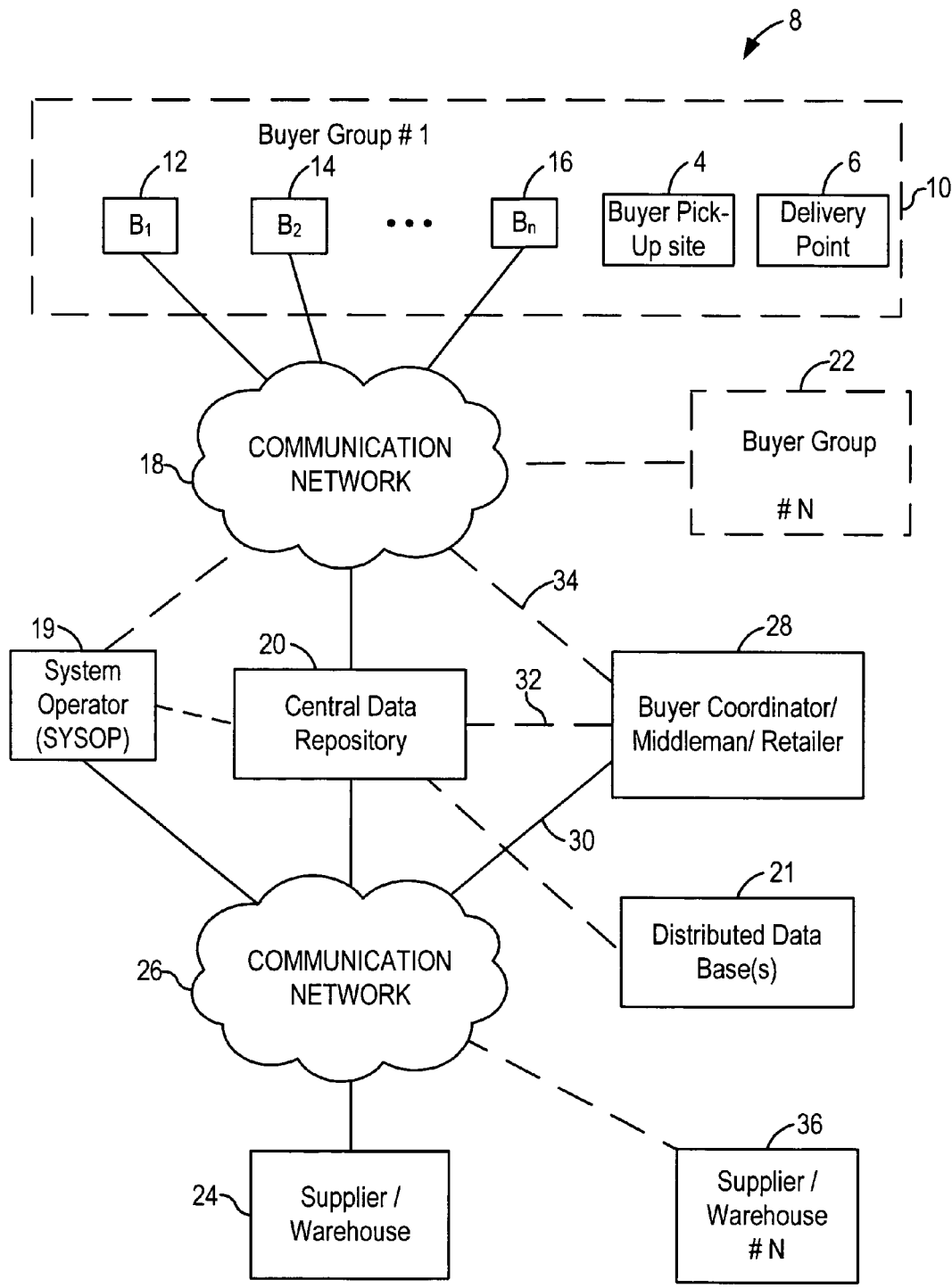
FIG. 1 is a block diagram illustrating a communication process embodying features of the present invention.

In the following discussion, numerous specific details are set forth to provide a thorough understanding of the present invention. In some instances, well-known elements have been illustrated in schematic or block diagram form in order not to obscure the present invention in unnecessary detail. Additionally, for the most part, details concerning computers, communications networks, and the like have been omitted inasmuch as such details are not considered necessary to obtain a complete understanding of the present invention, and are considered to be within the skills of persons of ordinary skill in the relevant art.

It is noted that, unless indicated otherwise, all functions described herein are performed by a processor such as a computer or electronic data processor in accordance with code such as computer program code, software, integrated circuits, and/or the like that are coded to perform such functions. Furthermore, it is considered that the design, development, and implementation details of all such code would be apparent to a person having ordinary skill in the art based upon a review of the present description of the invention.

The present invention comprises in part the realization that many products from certain suppliers are available only in pre-defined bulk quantities or must be purchased in certain pre-defined bulk quantity increments so as to achieve one or more price breaks versus prices offered through traditional retail outlets.

For the purposes of discussion and explanation, the term "unit" in the case of retail products would preferably be the smallest indivisible package (e.g., a bag of cereal, can of tomatoes, bottle of ketchup, and the like) as might be sold from a retail outlet such as, for example, a grocery store. The terms "case", "caselot", "case lot", or "case load" may be used interchangeably, and are used herein to indicate a bulk quantity of units of a given product as it is preferably shipped in bulk to a retail business or to a buyer group. Therefore, as used herein, the terms "case", "caselot", "case lot", or "case load" preferably designate a bulk quantity increment. Where a product is sold by cases, or by both cases and by units, the case, caselot, case lot, caseload, case load quantity of units, and any integer of those units, designate a valid order quantity for that product.

For many products offered by suppliers, unless a sufficient quantity of units are ordered to achieve at least one case, an order for that product may not be filled from the supplier. In some instances, a certain minimum quantity of units are required to achieve one or more price discounts for that product with break points which are preferably set at case quantities of units. It should also be understood that, for those instances when buyers in aggregate order a quantity of a product in an increment of units that is other than the quantity of units contained in one or more cases, the integer multiples of the pre-defined number of units that exactly achieve case quantities are the quantity increments that must be ordered by the group to achieve a valid order quantity when the product is only sold by the case. For example, an order of 17 units, when the case quantity for ordering that product is 12 units (and no buyers together have ordered 12 units), requires that the order must either be decreased by 5 units to 12 or increased by 7 units to 24 to achieve a valid order quantity.

Some products are available on a unit basis and thus a caselot minimum is not a restriction on placing orders for these products, although a further price break may be offered at each caselot quantity of units that are ordered for a product sold by the unit. Where both caselots and unit quantities of a product are sold, purchasing only unit quantities typically results in significantly higher prices than when purchasing a caselot quantity of units of that product. Where a product is sold by both the unit and by a larger quantity such as a case, and which achieves one or more price breaks at one or more breakpoints of unit quantities, then valid order quantities are those quantities of units which when ordered obtain a price break for that product. For example, it is possible that price breaks might be offered for more than one quantity increment of units such as 1-3, 4-6, 7-9, and 10-12. In such an instance, the valid order quantities are 4, 7, and 10 as, at each of these quantities of units, a further price break (discount) is offered.

The physical container for some products may be a pallet of goods, truck load, or even a railroad car, container, bargelot, or shipload, but most typically will be a cardboard carton containing a set quantity of units of a product such as 12, 24, 30, or 144 units. Typically these are sized by volume and weight to conveniently fit in a carton that can be easily lifted by a single person.

The terms "product" and "SKU" may be used interchangeably, each referring to a specific product that may be ordered by a buyer. "Product" preferably refers to a brief narrative description such as "Corn Flakes" or "Pinto Beans". As is generally known, SKU (Stock Keeping Unit) is, or refers to, a multi-digit number associated with a product for inventory purposes and is unique for each product of a supplier. As noted, the acceptable quantity of a product that is required either to enable a purchase of a product and/or to achieve a price discount is termed a "valid order quantity". If a product is only sold by the case, and a case is 12 units, then a valid order quantity must consist of 12, 24, 36, or any other positive integer multiple of 12 units. A valid order quantity thus includes a case, case lot, caselot, case load, and caseload.

It has also been noted that many suppliers of goods at the wholesale level impose a minimum total dollar order requirement. To make it easier to reach the minimum dollar order, a buyer group may elect to collaborate with at least one additional buyer group to aggregate orders for all buyers of all the collaborating buyer groups provided that the collaborating groups are using a common supplier. This collaboration of groups can better achieve the minimum dollar requirement and perhaps gain further volume and achieve volume price discounts. In addition, the more buyers who participate in an order cycle, the greater the probability that valid order quantities will be achieved by the buyer group for the products that are available only by the case or that need to achieve certain quantities of units to achieve price breaks.

The collaboration of more than one buyer group placing concurrent orders together in a single order cycle is termed a MGP (Multi-Group Purchase). It implies that all buyer groups participating in a MGP preferably have a common supplier, delivery point, cutoff, and typically a single payment provider. Although the specific mechanics of the MGP arrangement are not provided in the flow diagrams of the present description of the invention, the modifications would primarily lie in the range of buyers over which the aggregation and quantity optimizations are performed, and would follow generally the thought process of the present flow diagrams (i.e., FIGS. 1-18) for the single buyer group system. The ordered quantities of products from the supplier are the aggregation of all the products ordered by all buyer's of all buyer groups that are participating in the MGP into one single larger composite order. Thus modifying the disclosed invention to include the MGP capability is believed to be well within the capability of one skilled in the art of generating computer programs to accomplish the actions set forth in the present flow diagrams for the single buyer group system.

In FIG. 1, the reference numeral 8 designates a computer processing system embodying features of the present invention. The system 8 includes a dash line block 10 representing a first buyer group and is shown containing a plurality of buyer terminals or nodes 12, 14 and 16 from which individual buyers, $B_1$, $B_2$, and $B_n$ may place orders, revise orders or obtain other information relative to orders or products available. The subscript n of $B_n$ is used to indicate that that the buyer group 10 may comprise any number n of nodes and buyers. Each of the nodes 12, 14 and 16 are shown connected for communication through a communication network 18 to a central data repository 20 that is also referred to as data repository 20. Each buyer group 10 also includes at least one buyer pickup site 4 and at least one delivery point 6.

Data repository 20 is preferably effective for managing a number of functions including online data storage in various electronic media formats (such as a hard drive, mirrored storage drive, random access memory, and the like), data intensive calculation and processing, off-line backup of data, wide area network (WAN) communication, execution of software programs, storage of final and intermediate calculations and data, and communications by various modalities with buyers, suppliers, one or more system operators and any other party or parties that may access or utilize the system 8. Data repository 20 preferably includes all the data and information which is needed to accomplish the calculations and processes encompassed by the system 8 but may also include a connection to one or more distributed databases 21 which are readily accessible by the data repository 20. The communication network 18 may be any available system but in a preferred embodiment comprises the Internet. One or more other buyer groups may also be involved in the buying process as shown by a dash line connected to block 22 labeled buyer group #N.

A first supplier, warehouse or other product supplying entity 24 is preferably also in contact with data repository 20 via a communications network 26 which may be independent from, or the same as, the network 18. For example, in the case of the preferred embodiment of the invention as utilized through the Internet by both the supplier 24 and a buyer group, communication network 18 and communication network 26 would preferably both be the Internet. Preferably a buyer-coordinator (or other agent, broker, or middleman, including a retailer) represented by block 28 is shown communicating with data repository 20 via a connection 30 with network 26. As noted in FIG. 1, a retailer, broker, agent, or middleman, may conduct the same activities as the buyer coordinator 28 and if so, then the buyer-coordinator 28 may be replaced in certain or all functions by one or more of a retailer, broker, agent, supplier or middleman. Dash lines 32 and 34 illustrate that buyer-coordinator 28 may alternatively be directly connected to block 20 or may alternatively be connected via another route such as link 34 and network 18. A System Operator (SYSOP) 19 which may be a third party or a supplier, is shown communicating with the data repository 20 through either of communication networks 26 or 18. Other product suppliers, as represented by a block 36 may also supply products to one or more buyers $B_n$ and would typically communicate with the data repository 20 in a manner similar to supplier 24.

In an alternative embodiment, a supplier 24 may utilize the system 8 through the central data repository 20 located or accessed by the supplier 24 or operated and controlled directly by the supplier 24, through for example a bulletin board system, direct dial-up capability, through a third party network, or the like, in addition to use of the system 8 through the Internet or by means of a virtual private network or other communications network. By the above means or by other capabilities, a supplier 24 may provide a further value-added service in addition to simply supplying products to buyer groups 10. In essence, the system 8 thus provides a "front end" real time, on-line order aggregation system which can serve the needs of any buyer groups 10 which either are purchasing, or would like to purchase, products from a supplier 24. Effectively the system 8 thus preferably serves one or more buyer groups, also referred to herein as groups of buyers, 10 who repetitively order multiple products on a relatively frequent basis, whether the system 8 is implemented by a supplier, retailer, or a third party.

Figure 2:
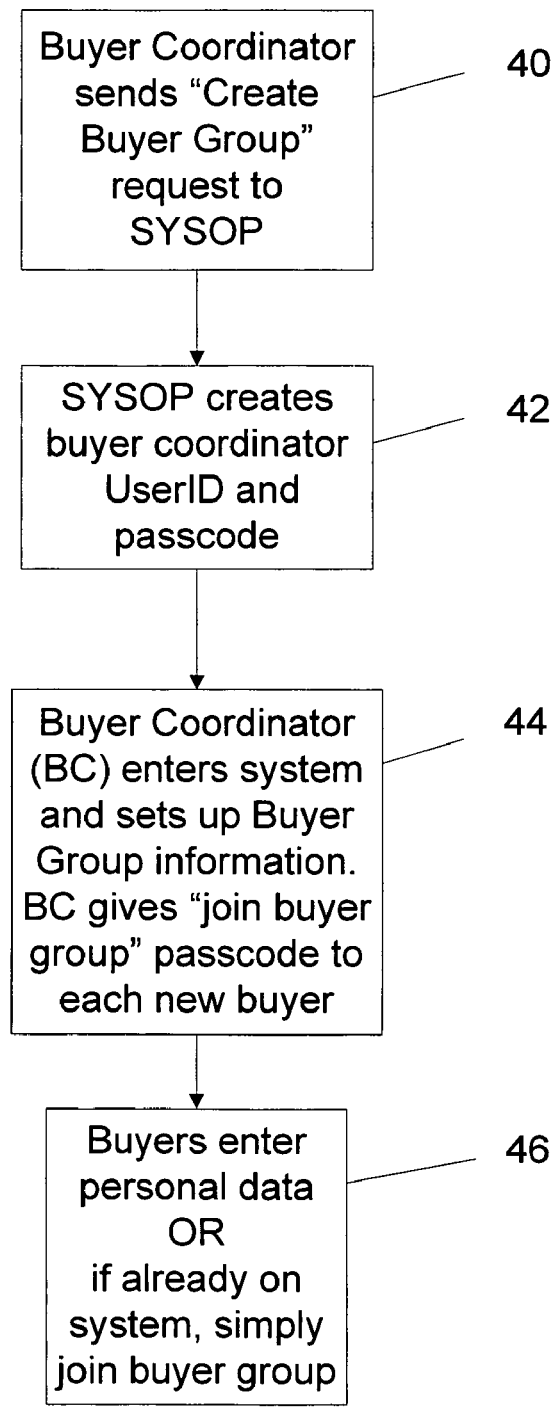
FIG. 2 is a high-level flow diagram illustrating the establishment of a buyer group.

FIG. 2 generally illustrates a preferred process of establishing a buyer group's creation and introduction to central data repository 20. After a plurality of buyers $B_n$ are organized as a buyer group, a buyer-coordinator 28 sends an appropriate request to the SYSOP 19 which may be viewed by the buyer-coordinator as the data repository 20 but may alternatively be the separate entity referred to as SYSOP as noted in block 19. Buyer-coordinator's request 40 preferably occurs by means of communications network 18. The SYSOP 19 or data repository 20 returns to the buyer-coordinator 28 both a buyer-coordinator ID and a pass-code to allow the buyer-coordinator 28 to access the data repository 20 as set forth in block 42. The buyer-coordinator ID and passcode are preferably generated by data repository 20 but, alternatively, may be provided after a manual pre-qualifying step in which data are provided by buyer-coordinator 28 to SYSOP 19 and reviewed by SYSOP 19 before permitting the addition of buyer-coordinator 28 to data repository 20.

The buyer-coordinator 28 then sets up buyer group information in the data repository 20 as set forth in a block 44, which information includes at minimum the e-mail address and name of each buyer $B_n$ in the buyer group, and the desired quantity optimization algorithms and pricing algorithms for that buyer group (which algorithms are described in further detail below and in FIGS. 13, 14, 15, and 16). The buyer-coordinator 28 then may contact the buyers $B_n$ of the buyer group, such as those shown in buyer group 10 in FIG. 1, and communicate that buyer group 10 has been created and will accept buyers' entry of personal data into data repository 20 as set forth in block 46. This communication with the buyers $B_n$ is preferably separately undertaken by the buyer-coordinator 28 but may, alternatively, be an automated response of the system, as described below with respect to block 502 of FIG. 18 as a pre-defined trigger or response event. As further indicated in block 46, if a given buyer $B_n$ is already a member of a different buyer group also residing in data repository 20, that buyer may merely join the present buyer group without needing to re-enter their personal data.

Figure 3:
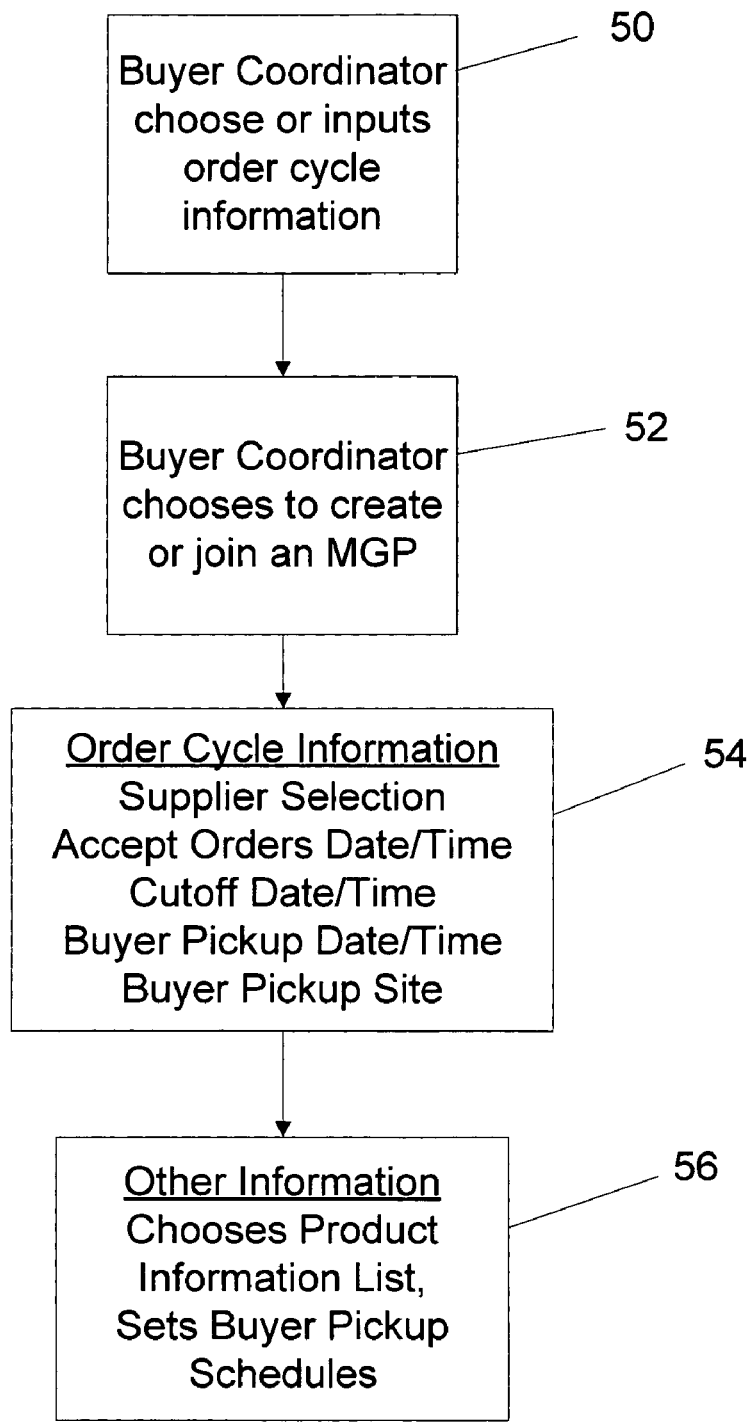
FIG. 3 is a high-level flow diagram illustrating steps involved in creating an order cycle for a group buying products.

The blocks of FIG. 3 generally illustrate a preferred process of setting up an order cycle within which all buyers of a buyer group may enter and/or refine their orders. As set forth in a block 50, the buyer-coordinator 28 chooses, selects from a menu, or otherwise inputs order cycle information and data in the data repository 20. At this point in the order cycle buyer groups 10 may elect to establish the collaborative MGP arrangements as noted in block 52. As further detailed in a block 54, this data typically includes selection of the supplier 24, an order cycle open or commencing date, a cutoff time, and the expected date and time (or dates and times) for buyers to retrieve the ordered products at the buyer pickup site. As set forth in a block 56, the buyer-coordinator 28 may further review the order cycle data and the product information for the supplier and modify same as appropriate to changing conditions and circumstances. This review process as pertains to product information is further detailed in connection with FIG. 17.

Figure 4:
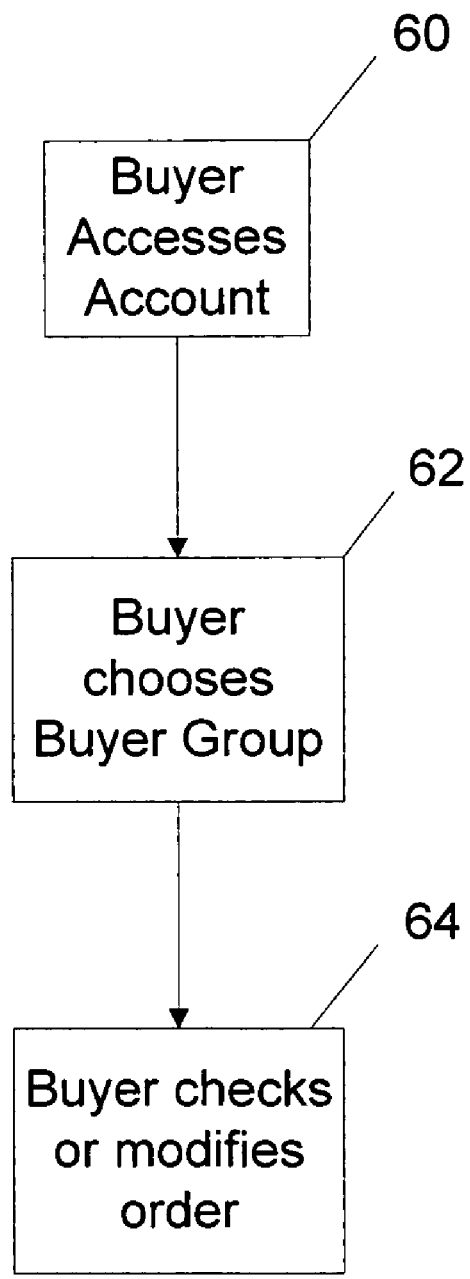
FIG. 4 is a high-level flow diagram of a product buying process from the standpoint of a single buyer.

The blocks of FIG. 4 generally illustrate a preferred ordering process from a buyer standpoint. The three blocks 60, 62, and 64 are further detailed in FIGS. 9 through 17. A buyer, such as represented by one of nodes 12, 14 or 16 in FIG. 1, accesses the data repository 20 via the network 18 using their unique user ID and unique pass-code as presented in a block 60. Since a buyer may belong to more than one buyer group, a unique pass-code is used to identify a specific buyer who may use this unique pass-code to access any buyer group to which the buyer belongs. The buyer chooses, from a menu or otherwise, a buyer group from which to purchase products as set forth in a block 62. As shown in a block 64, the buyer may then place an order or revise an order already existing in a given order cycle.

Figure 8:
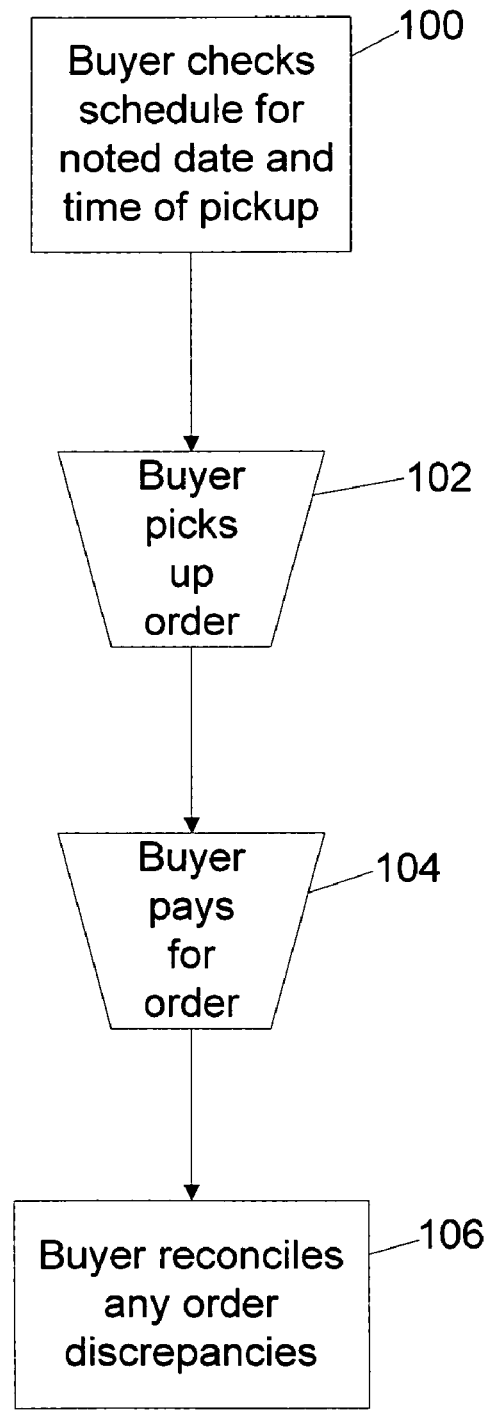
FIG. 8 is a high-level flow diagram of the activities incurred by buyers picking up and paying for orders.

After the cutoff has occurred and after the shipment has been collected by the buyer-coordinator 28, the buyer can retrieve the order as set forth generally in FIG. 8 at the buyer pickup site 4 and pay for the order at that time. Alternatively, although not specifically set forth in FIG. 8, the buyer-coordinator 28 may stipulate that a buyer is required to either make payment with buyer's placement of an order, have a positive balance on file, provide electronic check payment, have on file a credit card, have food stamps or another payment form available to the buyer-coordinator, and/or make other pre-payment arrangements before that order will be accepted and forwarded as part of the composite order submitted by that buyer-coordinator to the supplier for that order cycle. Buyers may pay by check, credit card, electronic check, debit card, cash, food stamps, or any other form of payment acceptable to the buyer-coordinator, the seller, retailer, or the agent of the seller of the products.

Figure 5:
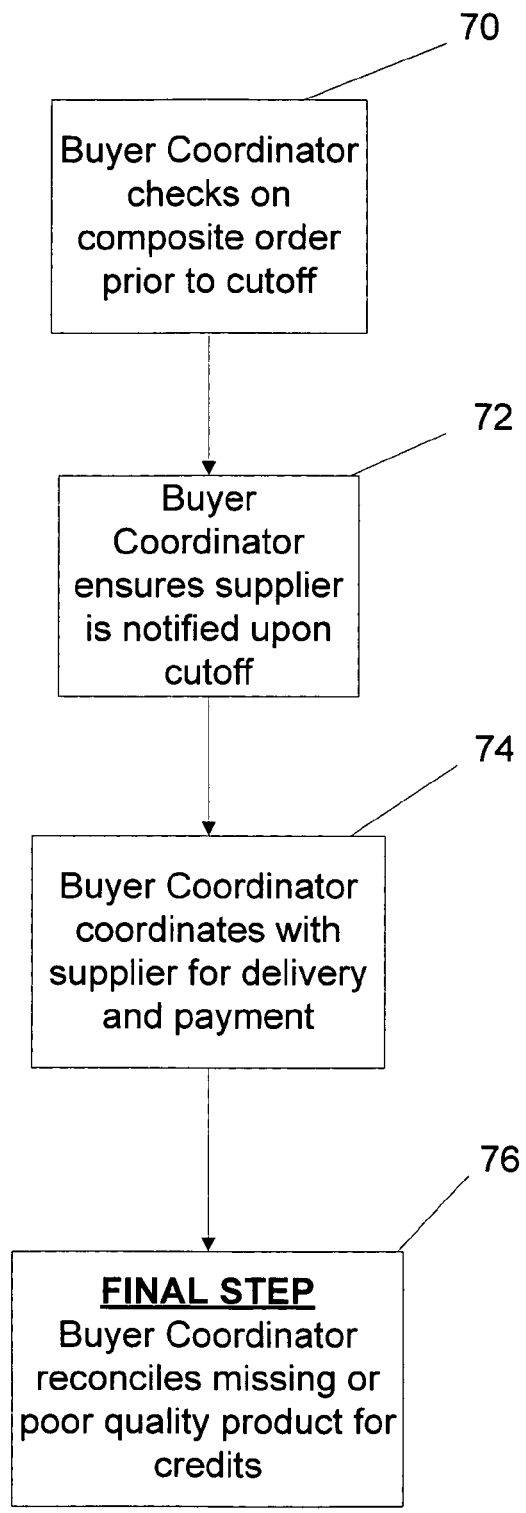
FIG. 5 is a high-level flow diagram of buyer-coordinator order cycle cutoff and supplier management.

The blocks of FIG. 5 generally illustrate the steps incurred by the buyer-coordinator 28 for managing a preferred order process prior to, during, and subsequent to the cutoff time. As presented in a block 70 the buyer-coordinator 28 generally checks the order status of all orders placed by all the buyers in a group 10 who have ordered prior to the cutoff looking for order changes or additions to orders that can be made to the composite order by the buyer-coordinator to achieve greater fulfillment of objectives of the buyer group 10. After the cutoff time, the buyer-coordinator 28 must make sure the supplier 24 is or has been notified of the composite order as shown in a block 72. Such communication 72 of the composite order of the group may be achieved by the buyer-coordinator 28 forwarding the information by file transfer, fax, or telephone to the supplier 24. Alternatively, the supplier 24 may access data repository 20 and extract the composite order for the group or the composite order could be automatically transmitted to the supplier according to pre-established procedures with the supplier.

Coordination between the buyer-coordinator 28 and the supplier 24 is necessary for arranging delivery of the products and for making payment as set forth in a block 74. Although not always necessary, a block 76 sets forth the step of a buyer-coordinator reconciling with a supplier 24 for any products that were ordered but were not received, or that were defective in quality or products that were received but not ordered (mispicks).

Figure 6:
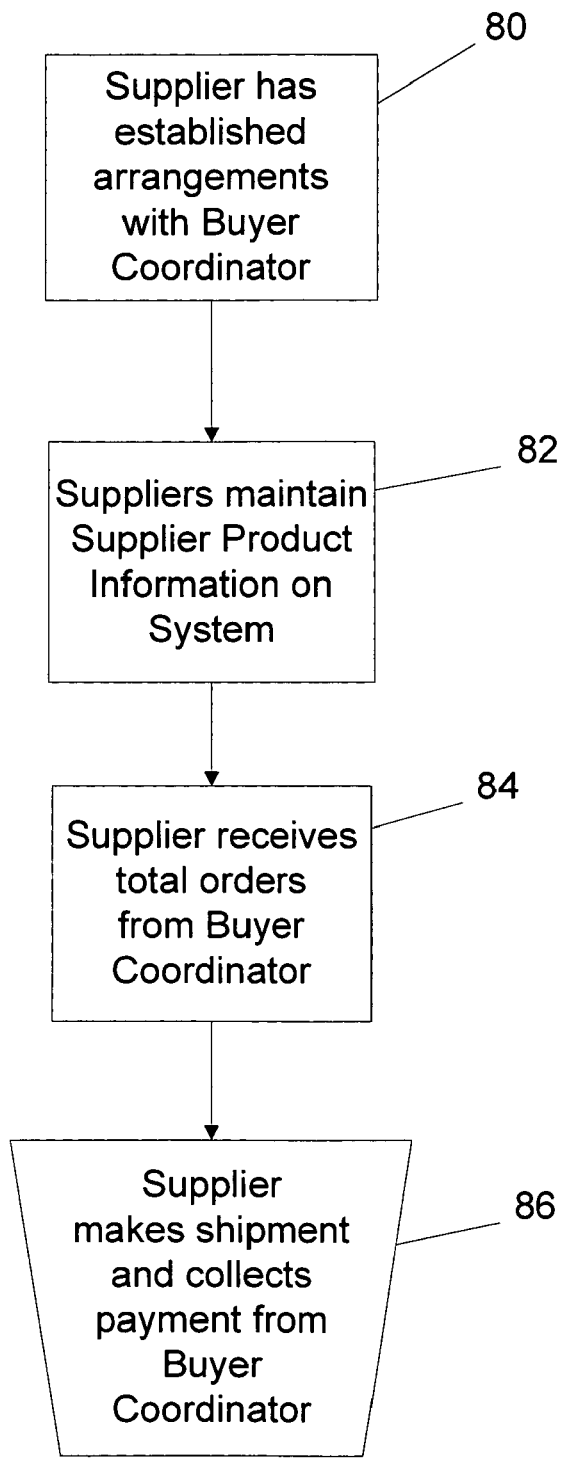
FIG. 6 is a high-level flow diagram of a product supply process from the standpoint of a single product supplier supplying products to a buyer-coordinator.
Figure 17:
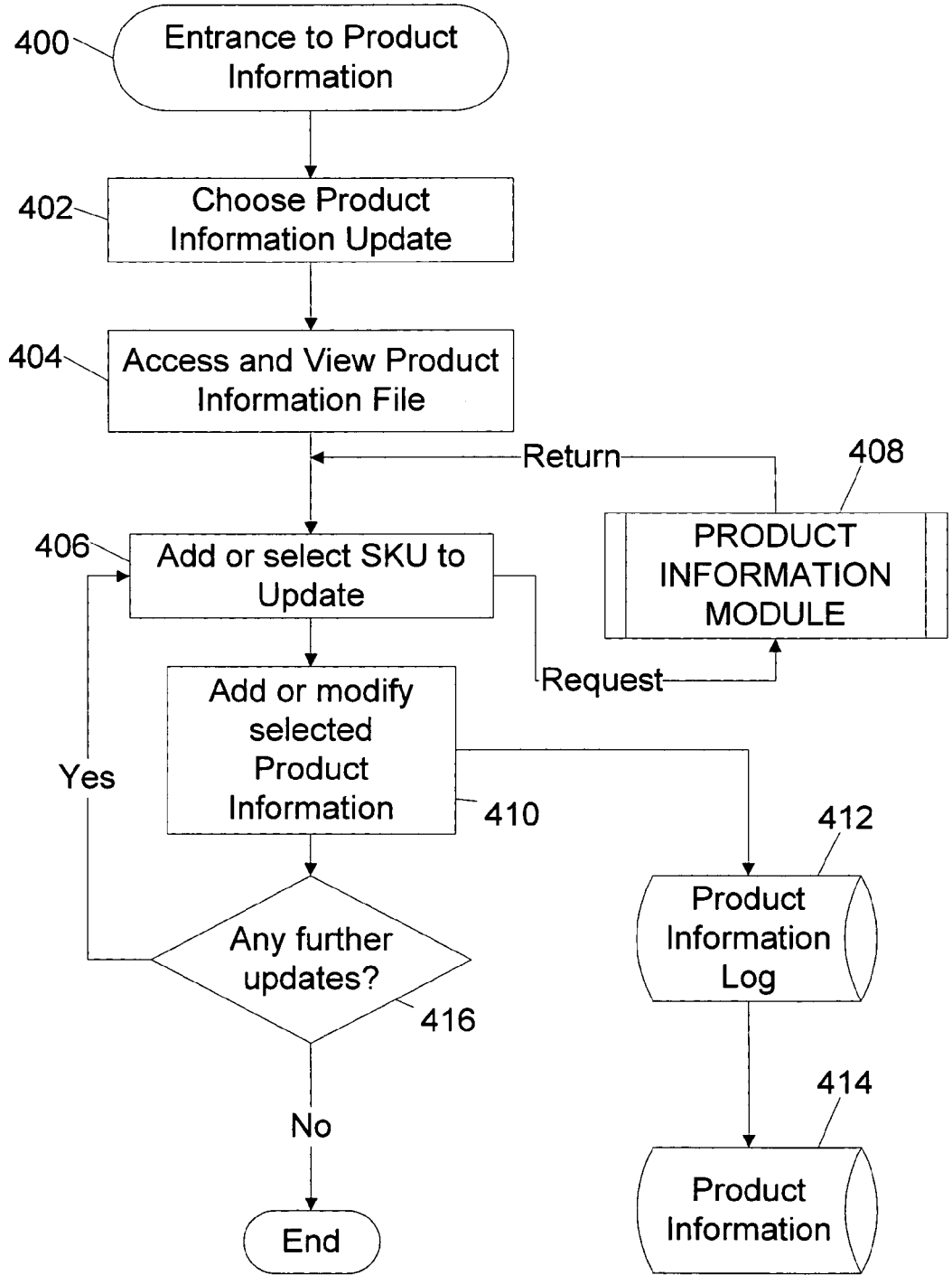
FIG. 17 is a flow diagram depicting steps involved in a buyer-coordinator entering and/or reviewing product information.

As set forth, the blocks of FIG. 6 relate to the steps incurred by a supplier 24 of products to a buyer group 10 using a preferred embodiment of the present invention. The supplier 24 must have certain arrangements established with a given buyer-coordinator 28 as stated in a block 80. While the product information in data repository 20 may be substantially maintained by the buyer-coordinator 28 as depicted in FIG. 17, it is preferably primarily maintained by a supplier as set forth in a block 82. After the order cycle for a buyer group has ended, the supplier 28 needs to obtain the composite order of all products ordered by the buyer group from the buyer-coordinator 28 or directly from data repository 20 as shown in a block 84. The supplier 24 then makes a shipment to a delivery point 6, in accordance with that order and at some point in time collects payment for the buyer-coordinator as shown in a block 86.

Figure 7:
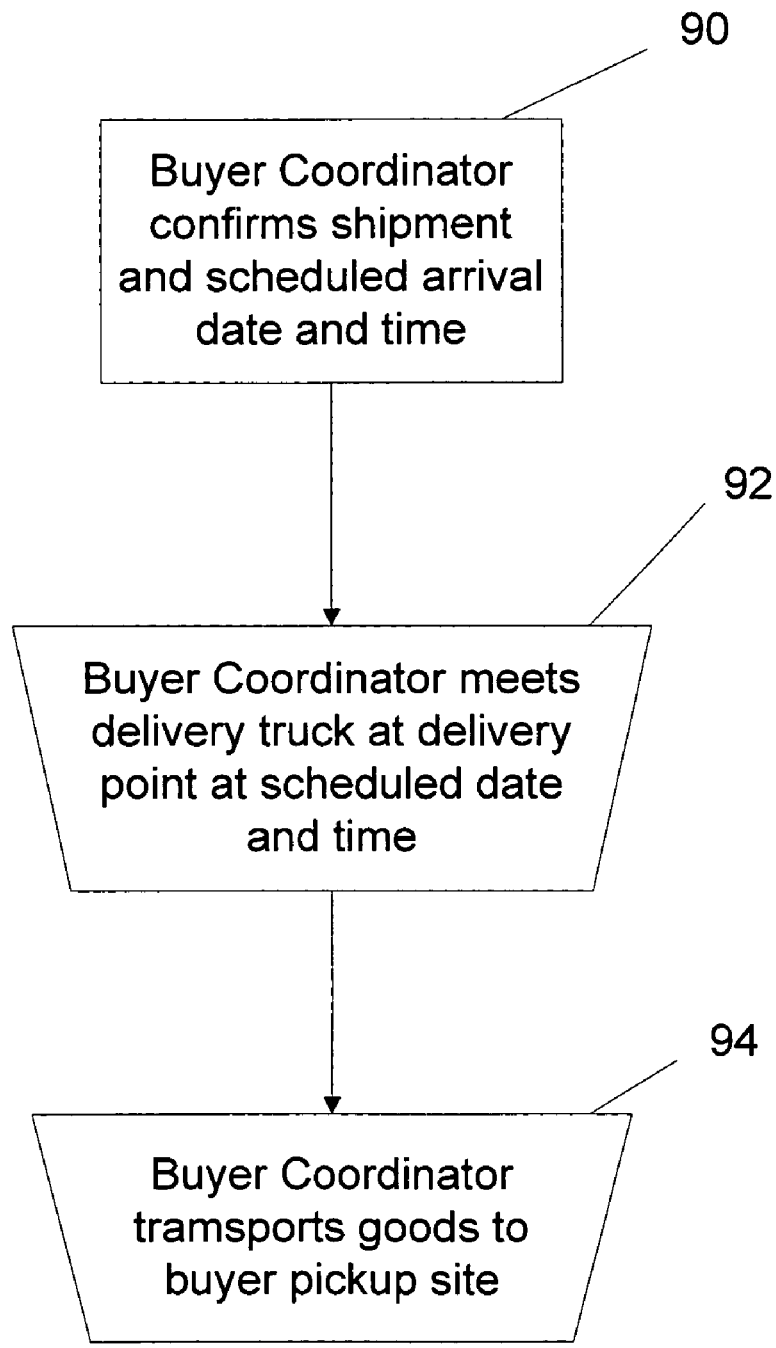
FIG. 7 comprises a high-level flow diagram of activities incurred by the buyer-coordinator with regard to products shipped by a supplier and retrieved by a buyer-coordinator.

In FIG. 7, a block 90 indicates that a buyer-coordinator 28 needs to be aware of shipping and scheduled arrival dates and times. The buyer-coordinator 28 needs to make arrangements to have the supplier's truck with the shipment met at the delivery point 6 and the products transported to a buyer pickup site 4 as stated in blocks 92 and 94. Alternatively, if buyer-coordinator 28 is a retail establishment, or a buyer-coordinator is working cooperatively with a retail establishment, then the delivery point 6 and the buyer pickup site 4 may be one and the same.

As shown in a block 100 in FIG. 8, a buyer may check the scheduled date and time for pickup of goods. This information preferably includes both the general dates and times pickups are permitted for all buyers, along with a specific time slot a buyer is assigned to retrieve his or her particular order at the buyer pickup site 4. Scheduling buyer pickups may help prevent bottlenecks from occurring when large numbers of buyers show up simultaneously, all seeking to retrieve their orders and leave the buyer pickup site 4 quickly. This scheduling information is preferably accessed from data repository 20 by each buyer or buyers. Alternatively, each buyer may be notified by the buyer-coordinator 28 about the delivery and pickup information in accordance with the present invention as noted in FIG. 18. Such notification may occur by multiple means including e-mail, fax, and telephone and may be automated as noted in FIG. 18. As shown in blocks 102 and 104, the buyer retrieves and pays for the order. If appropriate, the buyer may reconcile any order discrepancies as set forth in a block 106.

Figure 9A:
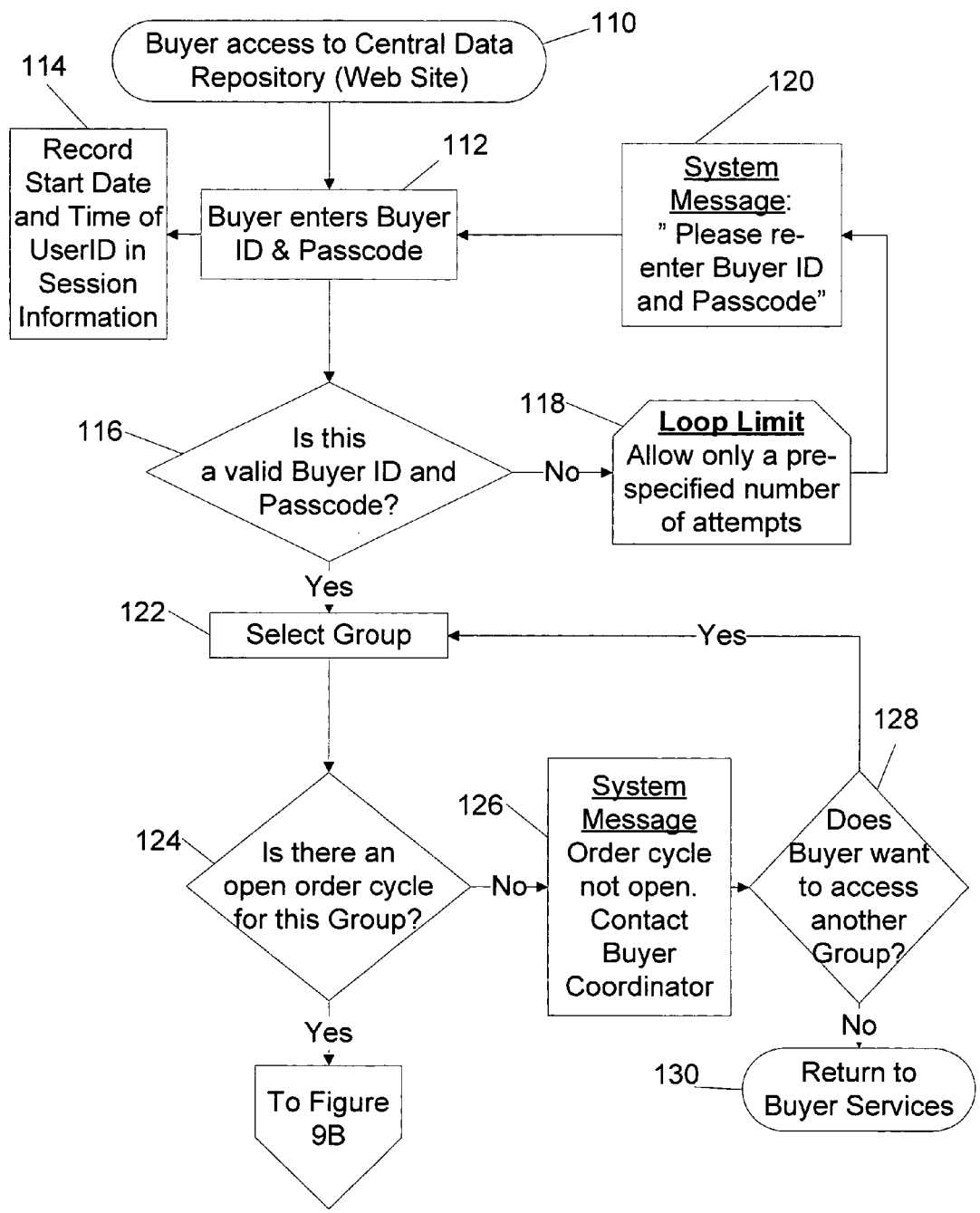
FIGS. 9A-9B are a flow diagram depicting steps involved in a buyer accessing a buyer group account (FIGS. 9A-9B will be referred to herein collectively and individually as FIG. 9)
Figure 9B:
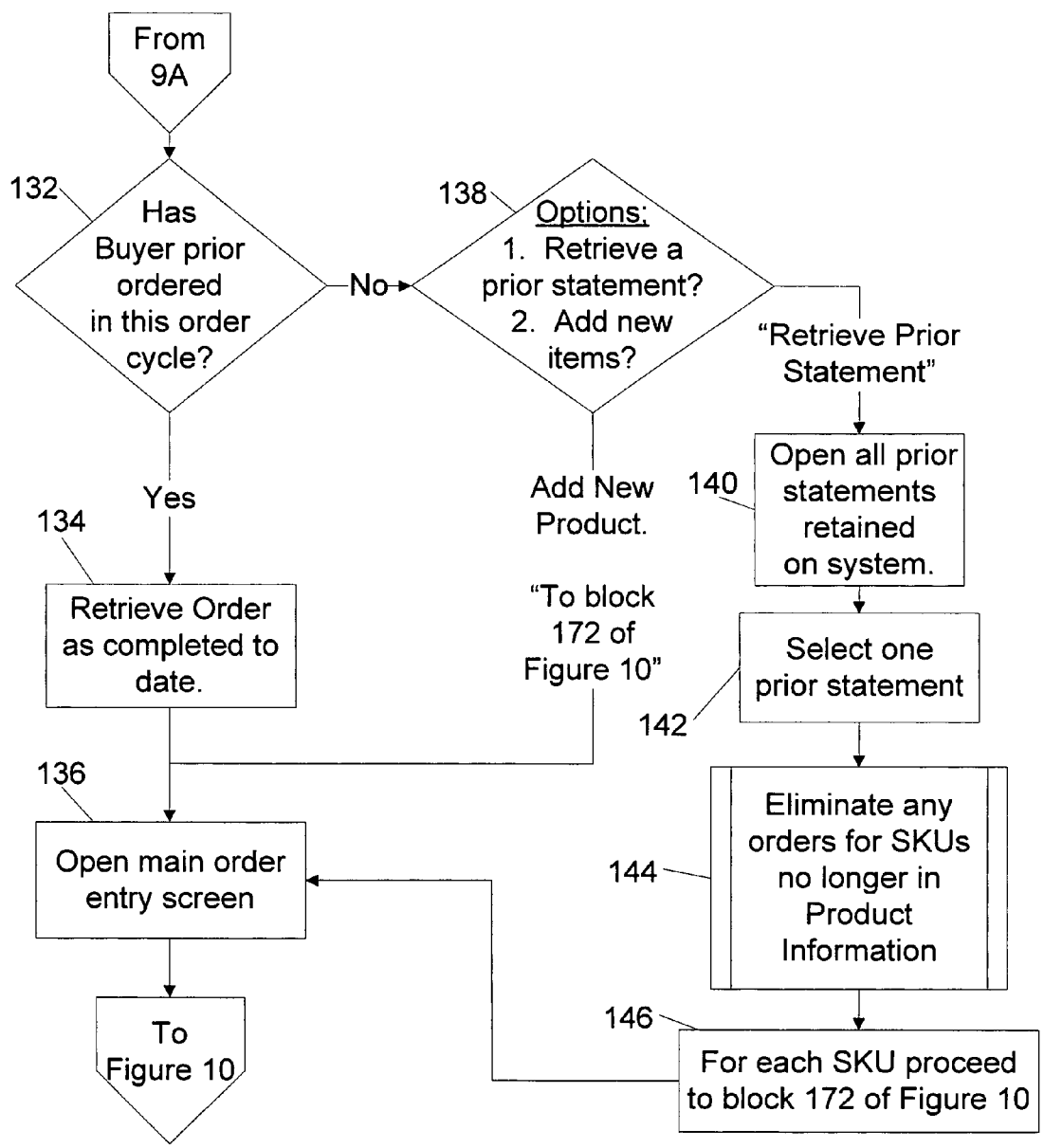

The flow diagram of FIG. 9 provides additional detail for the steps involved in completing blocks 60 and 62 and commencing the actions of block 64 of FIG. 4 in accordance with a preferred embodiment of the present invention. A buyer 12 may access data repository 20 as set forth in a block 110, which access is preferably through a web site located on the Internet. A buyer ID and pass-code is entered in accordance with a step 112, at which time a date and time are recorded for that buyer as set forth in a block 114. The time of order placement or modification may be preferably utilized with one or more allocation algorithms discussed in further detail below.

The ID and pass-code are checked in a decision block 116 and, if not valid, a loop limit block 118 is entered before proceeding to a system message block 120 requesting reentry of the ID and pass-code. Although not specifically shown, the buyer would preferably, at least temporarily, be denied access to the system after a given number of failed attempts. When a valid ID and pass-code are detected by block 116, the buyer is preferably presented with a menu to select from all buyer groups 10 of which buyer is a member when the buyer is a member of multiple buyer groups 10. The choice of the specific buyer group 10 for the buyer at this instance is set forth in a block 122. A decision block 124 checks to see if there is an open order cycle for the buyer group 10 that the buyer selects. If there is no order cycle presently open for the selected buyer group, a block 126 so informs the buyer. Execution passes thereafter a choice, in a decision block 128, to determine if the buyer wishes to access another group. If not, the buyer is returned to a buyer services area in which the buyer may access other system functions for this buyer in accordance with a block 130. Such other functions may include changes to the buyer's own information, access to the buyer's past statements, account balances, orders and payments, or communication capabilities with the buyer-coordinator 28, other buyers in data repository 20, or within buyer's own buyer group. Otherwise, the buyer is returned to the select block 122 to choose another buyer group.

If there is an open order cycle for the buyer group 10, a decision block 132 checks to see if the present buyer has previously ordered in the present order cycle. If so, the system 8 goes to a block 134 and retrieves the order as completed to date before opening a main order entry screen in a block 136. Such main order entry screen may display buyer and buyer group identification data, days, hours, and minutes left to the cutoff time, any products ordered to date for this buyer in this order cycle, and other information. Execution then proceeds with the steps outlined in FIG. 10.

If, in block 132, it is determined that the buyer has not had a prior order in the present order cycle, a menu is presented as set forth in a decision block 138. An Option 1 allows the retrieval of a prior statement whereby a previous order of a buyer in a prior order cycle may be retrieved. As set forth in blocks 140 and 142, the buyer is permitted to select one of the statements from a prior order cycle so that if the products and quantities of units that the buyer wishes to order are generally the same, the buyer will not have to re-select each one to add to his or her current order. The use of a prior order statement thus reduces the number of SKUs that must be looked up in placing an order when a buyer typically reorders some or all of the same products in a subsequent order cycle. It also may potentially reduce the number of products for which quantities must be selected since a buyer may generally include the same quantity of units for each product as was ordered in the order cycle from which the buyer's statement was retrieved. Execution at a comparison block 144 then eliminates the products that are no longer available in the current product information offering from the supplier 24 as shown in a block 144. As shown in a block 146 execution proceeds to process each SKU in the steps of FIG. 10.

Figure 10A:
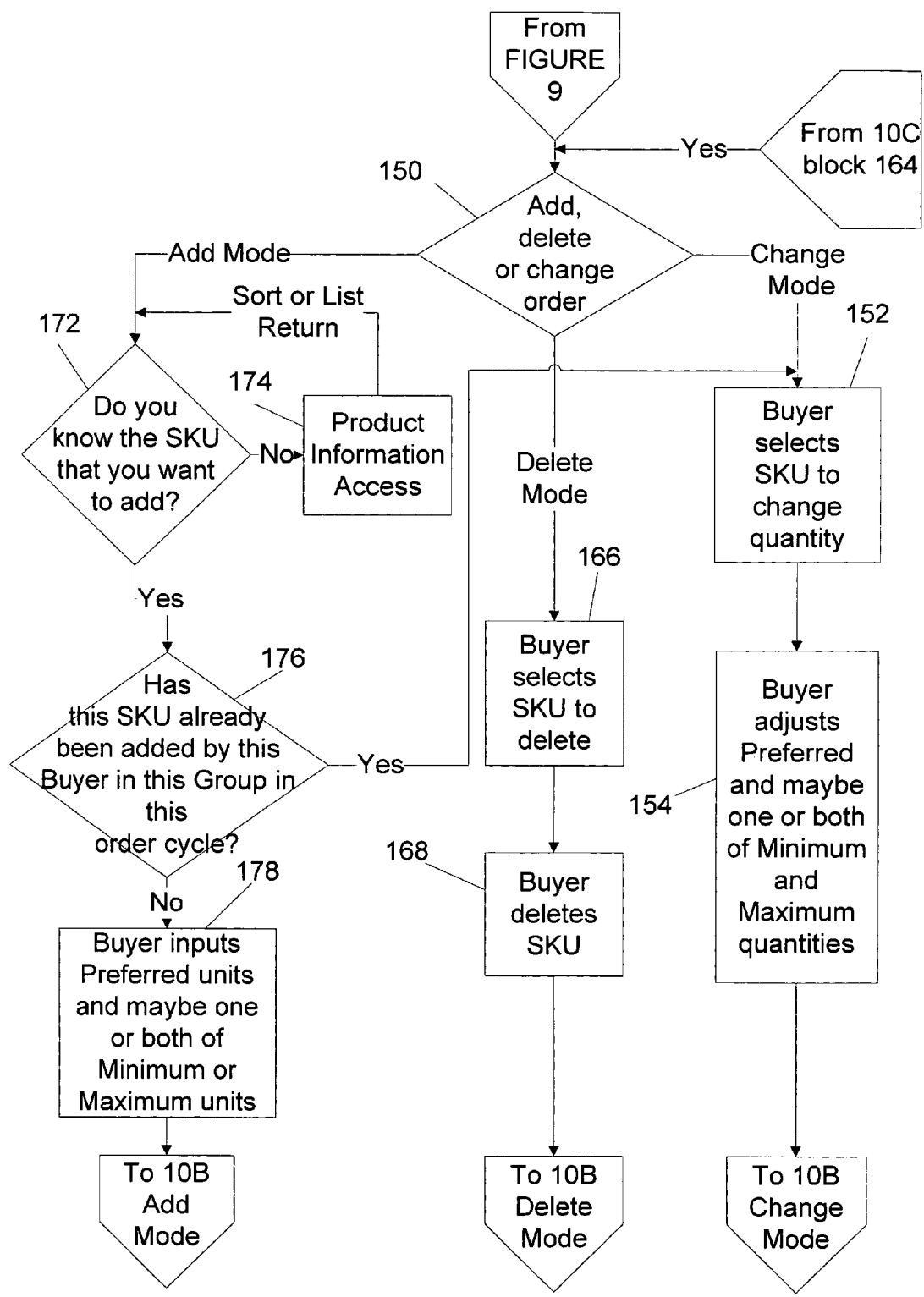
FIGS. 10A-10C are a flow diagram depicting steps involved in a buyer making a new order or modifying an existing order in a buyer group (FIGS. 10A-10C will be referred to herein collectively and individually as FIG. 10)
Figure 10B:
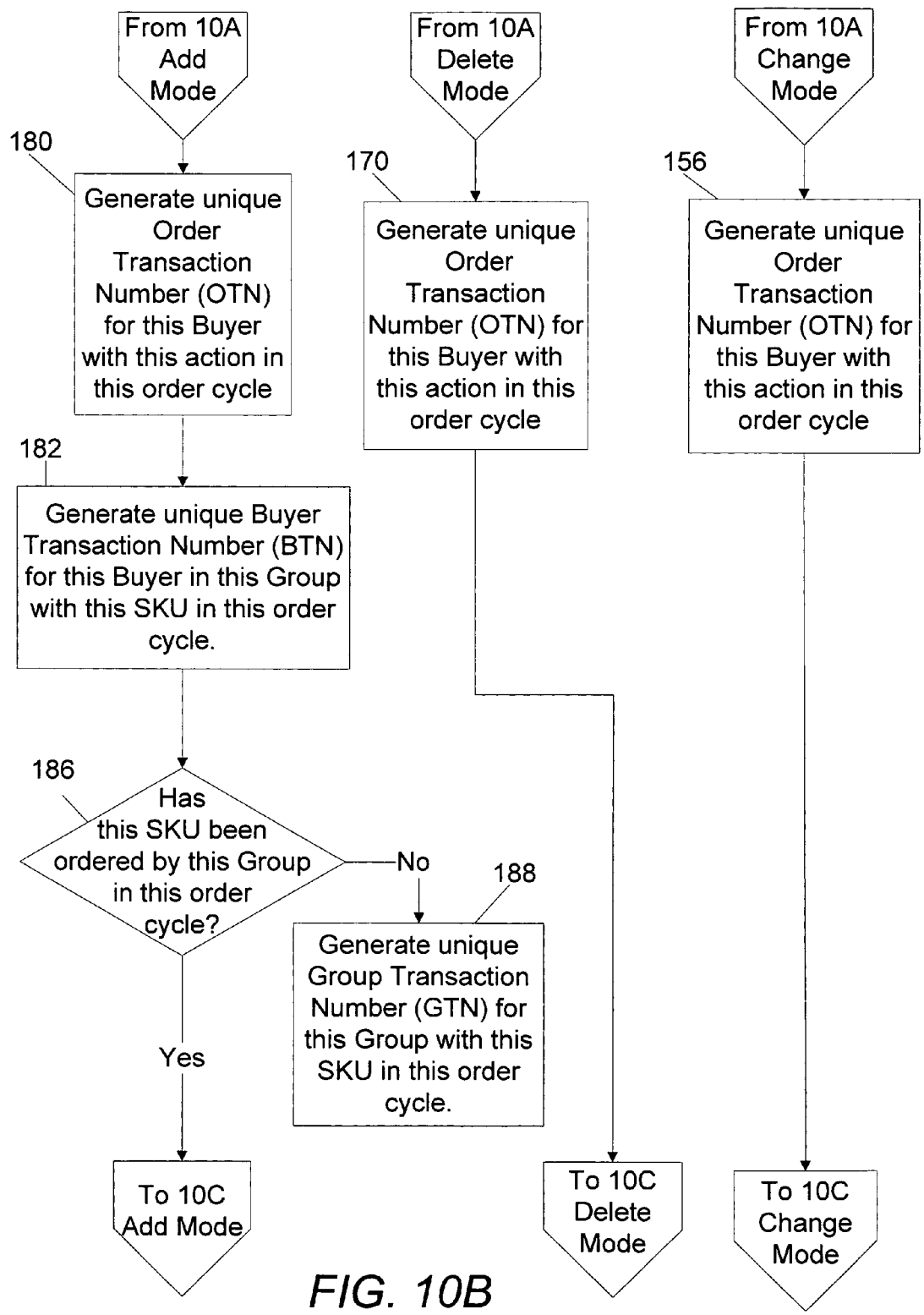
Figure 10C:
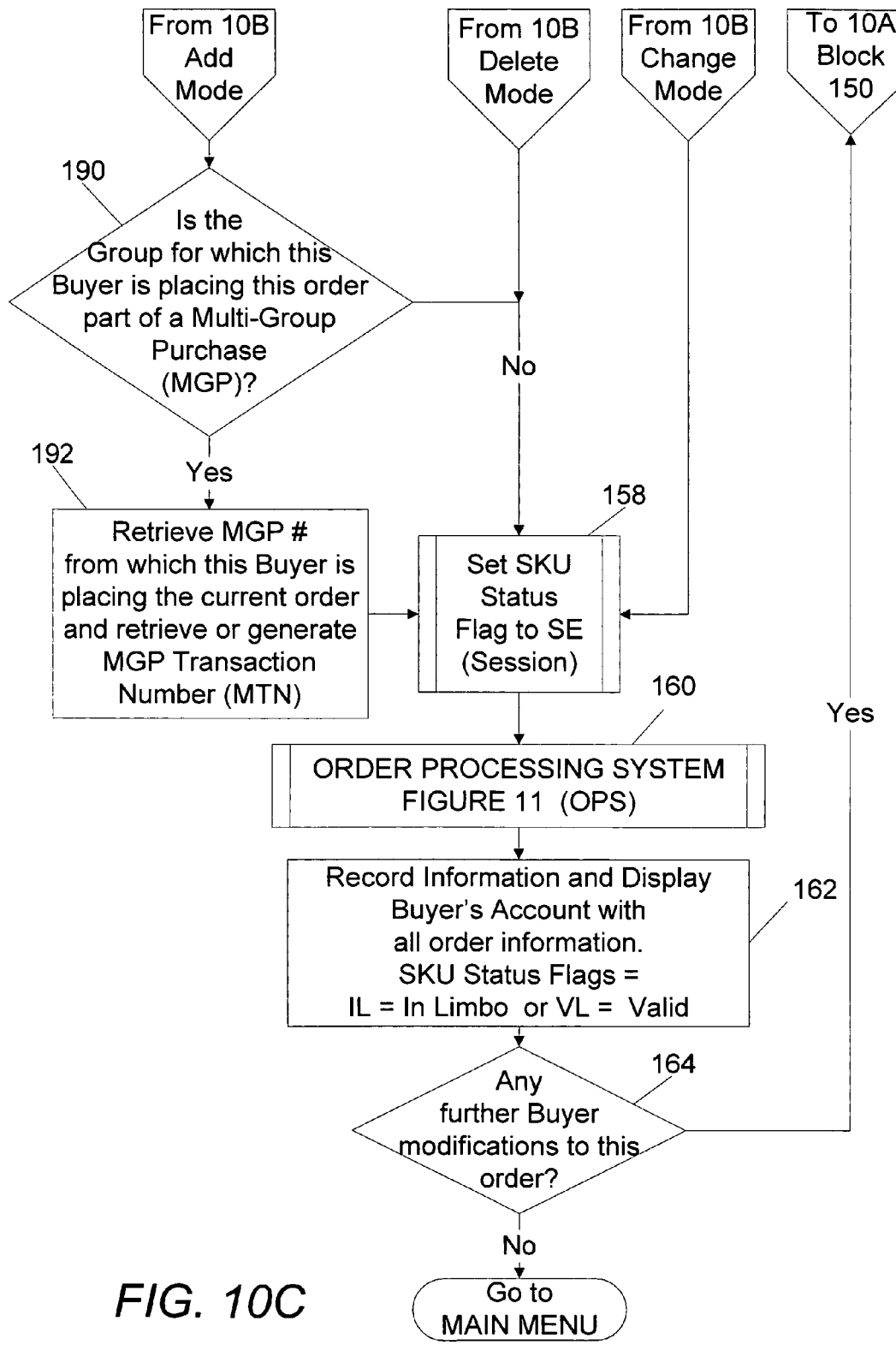

Option 2 of block 138 allows the buyer to add new products that the buyer wants to order in this new order cycle, whereupon the buyer will next proceed to FIG. 10, block 172. The flow diagrams of FIGS. 10-16 illustrate the steps involved in a buyer creating or modifying an order.

FIG. 10 begins with an add, delete, or change order decision block 150. If a determination is made to change an order, the next step in a block 152 is to allow the buyer to select an SKU from the buyer's order for changing the quantity. Next, in a block 154, the buyer is allowed to change the buyer's preferred, maximum, and minimum quantities of units for an ordered product. A buyer's selected quantity of units for placing an order for a product shall be termed the "purchase quantity" but, as next noted below, the purchase quantity which will actually be ordered is subject to later adjustment either directly by the buyer or indirectly by allocation through any one or more of many alternative modes of quantity optimization from an initial selected quantity of units, should a buyer or group of buyers allow for order quantity adjustments.

As will be noted and become clear in this description of the invention, an ability to allocate and adjust quantities of units of an ordered product by individual buyers assists in achieving an optimized purchase of such product for a group of buyers. To allow this to be undertaken, it is generally preferable that at least one buyer in the group be willing to undertake a variation from a purchase quantity of units that he/she specifies. As is described herein, the variation is preferably noted as a buyer-specified minimum quantity of units and a buyer-specified maximum quantity of units in addition to the buyer selection of a preferred quantity of units for a given product. The minimum is a quantity of units that is less than the preferred quantity and the maximum is a quantity of units that is greater than the preferred quantity of units. In accordance with a preferred embodiment of the invention, the buyer 12 selects a preferred quantity of units and also has the option of choosing both or either of a minimum quantity and a maximum quantity of units as well.

It may be further understood that an alternative means of specifying a variation of units is provided if a buyer 12 is allowed to choose both a minimum quantity and a maximum quantity of units without selecting a preferred quantity of units. In this instance, a preferred quantity of units may then be calculated with reference to the minimum quantity and the maximum quantity of units. By way of example, the preferred quantity of units may be calculated as the average of the minimum quantity and the maximum quantity of units that were specified by the buyer (along with a suitable rounding convention such as always rounding up at the fraction of ½ or greater beyond the integer) to achieve an integer quantity of preferred units for that buyer for that product in that order cycle.

Conversely, a preferred quantity of units of a product may be specified without the selection of either a maximum quantity of units or a minimum quantity of units, in which instance variations from the preferred selection would preferably not be allowed and undertaken for that buyer. A valid order quantity would then be obtained for buyers choosing this approach only on those occasions when some combination of summations of buyers' orders of preferred units would exactly equal a valid order quantity. It may be appreciated that the probability of satisfying a buyer group's purchase expectations for a product in which no buyers have allowed variations from each of their selected quantities of units would be significantly less than when multiple buyers allow some quantity variation (say by specifying a maximum quantity and a minimum quantity of units in addition to a preferred quantity of units) to be coupled with a further allocation capability that is optimized to achieve a valid order quantity.

Each buyer may also specify a preferred quantity of units with only a minimum (and no maximum) whereupon re-allocations would preferably occur only between the total of all of the preferred units and the total of all the minimum units for the group of buyers. Alternatively, each buyer may specify a preferred quantity of units with only a maximum (and no minimum) whereupon reallocations would preferably occur only between the total of all the preferred units and the total of all the maximum units for the group of buyers. Each buyer may also specify only a maximum quantity (with no specified preferred quantity and no minimum quantity) in which instance the minimum quantity may be inferred to be zero and allocations may be achieved by adding up all maximum quantities and preferably selecting those valid order quantities which are less than the total of the maximum quantities. Alternatively each buyer may specify only a minimum quantity (with no specified preferred quantity and no maximum quantity) in which instance the minimum quantity may be coupled with a required maximum increase to enable a valid order quantity to be achieved. It may be appreciated that, in this instance, the maximum for a buyer would effectively be no greater than a quantity of units that is one less than the quantity of units which comprise a case of that product. For example, if a buyer has ordered a minimum of 13 units for a product sold only in case lots of 12, then ordering 11 additional units (1 unit less than the case lot quantity of 12) enables two case lots (totaling 24 units) to be ordered from the supplier.

The following table depicts, by way of example only, and without limitation, variations of seven alternative combinations of preferred ("pref"), minimum ("min"), and maximum ("max") quantities that a buyer may enter, and how each entry may be utilized by the system 8 to use or generate minimum, preferred, and maximum quantities of units for performing allocation calculations:

| BUYER ENTERS QUANTITIES FOR: | SYSTEM USES OR GENERATES QUANTITIES EQUAL TO: | | |
| --- | --- | --- | --- |
| | MINIMUM | PREFERRED | MAXIMUM |
| pref only | pref | pref | pref |
| min only | min | min | min + caselot units − 1 |
| max only | 0 | max | max |
| min & max | min | (min + max)/2 | max |
| pref & min | min | pref | min + caselot units − 1 |
| pref & max | 0 | pref | max |
| pref & min & max | min | pref | max |

In addition, a buyer may specify a preferred quantity of units and allow for an absolute integer deviation increase or decrease or both. This also might be used when a buyer retrieves a prior statement and preferably accepts an across-the-board deviation from the units of each product which were ordered in that prior statement. For example, a preferred (or prior ordered) choice of 7 units with a specified minimum quantity of 5 units and a specified maximum quantity of 10 units may be presented as a preferred (or prior ordered) quantity choice of 7 units, with a willingness to accept 2 units less (equaling the 5 unit minimum) and 3 units more (equaling the 10 unit maximum).

Similarly, the buyer may specify a preferred quantity of units and allow for a percentage deviation increase or decrease, to a rounded integer of units. For example, in the above preferred choice of 7 units with a minimum of 5 units and a maximum of 10 units, a willingness to reduce the order by 30% (or 2.1 units) with rounding achieves the 2 unit reduction to 5 units (the minimum) and a willingness to increase the order by 40% (or 2.8 units) with rounding achieves a 3 unit increase to 10 units (the maximum). As will be noted below, the buyer group 10 may also establish an acceptable deviation as a whole that would then apply to each buyer of that group placing an order (perhaps up to some predefined quantity limit by buyers under a "the lesser of" structure, described further below).

An alternate approach may be adopted to increase the group's likelihood of achieving valid order quantities if the group of buyers is sufficiently large and generally orders a common set of products. If an average of at least the same number of buyers elect to purchase a given product comprises the quantity of units in a case (say 12 buyers of a product and 12 units in a case of that product), and if the group required (say as a condition of membership) a minimum stipulated deviation of, for example, 1 unit for each buyer placing an order for a product, then the probability of achieving a valid order quantity for a product which a number of buyers have ordered (when the number of buyers of that product represents a high proportion relative to the quantity of units in the case) would be high. In such instance, the probability of satisfying the desire of the group for purchasing that product would have a higher likelihood of being satisfied.

The buyer group 10 may determine that deviations should be required for the product, or required for the buyer, or a combination of these two. For example, a required deviation for buyers in a group might be, "To place orders through this group we require up to a 3 unit (increase or decrease) deviation on each product ordered". A deviation required by the group for a product might be constructed as, "We require up to a 3 unit (increase or decrease) deviation for any orders placed for this product". A combination approach might also be employed, e.g., an across-the-board 1 unit minimum deviation requirement per buyer order on all products, with certain products requiring some greater deviation established specifically for those products.

As may be noted from the above discussion, there are a number of techniques that may be employed to establish acceptable variations for a quantity of ordered units of a product. Each technique for establishing a variation then enables adjustments of quantities among buyers of a product to achieve a valid order quantity of units so as to enable one or more of, placement of an order for a product, an improved group purchase of the product, and better pricing with a supplier, some combination thereof, or the like. For purposes of illustrating a preferable method for a buyer to specify a variation in the system 8, the examples cited herein will preferably illustrate an offered opportunity for each buyer placing an order to specify a minimum quantity of units and a maximum quantity of units.

After the buyer changes the quantities of units in block 154, a unique order transaction number (OTN) for the buyer in this order cycle is then generated as set forth in a block 156, and then an SKU status flag is set to SE signifying the creation of a session for this buyer as set forth in a block 158. The SKU status flag will be subject to alteration as the order (OTN) proceeds through execution for this buyer in this group for this product for this change event.

Returning to decision block 150, the buyer may choose to delete one or more SKUs from their order. Execution then proceeds to a block 166 whereby the buyer selects an SKU from the buyer's order for deleting the entire product from the buyer's order as set forth in a further block 168. A unique OTN is then generated in a block 170 in substantially the same manner as was accomplished in block 156. From block 170 execution proceeds to block 158 where the status flag is set to session (SE) signifying the creation of a session for this buyer. The SKU status flag will be subject to alteration as the order (OTN) proceeds through execution for this buyer in this group for this product for this delete event.

If the buyer, in block 150 chooses to add to an order, the next step is set forth in a decision block 172 wherein a buyer may enter the SKU to be added, if known. If the buyer does not know the SKU, the SKU information may be obtained by a search function processed in a block 174, which search function is effective for identifying SKUs based on the available product information which has been updated by at least one of the buyer-coordinator 28 and supplier 24. Once an SKU is selected by the buyer, execution will proceed to a decision block 176 to determine if the selected SKU has already been selected by the buyer in the present order cycle. If it is determined that the selected SKU has already been selected by the buyer in the present order cycle, then execution proceeds to a change-SKU-amount section starting with block 152 to enable the buyer to add additional units to the buyer's previous order. If it is determined that the selected SKU has not already been selected by the buyer in the present order cycle, then the next step is for the buyer to enter the preferred and, optionally, the maximum and minimum quantity of units as set forth in a block 178. As has been noted previously, providing a maximum and minimum quantity of units is only one of many modes of allowing for variations in the quantity of units of a product to be ordered by a buyer.

As with the above change and delete events, an OTN is now generated in a block 180 for this add event, and a Buyer Transaction Number (BTN) is also generated in a block 182 before continuing to a decision block 186 where a determination is made as to whether anyone in the group has prior ordered the presently selected SKU. If it is determined that no one in the group has prior ordered the presently selected SKU, then a unique Group Transaction Number (GTN) is next generated in accordance with a block 188 before proceeding to a decision block 190. If the determination in block 186 is that someone in the group has prior ordered the presently selected SKU, then the Group Transaction Number is recorded along with the BTN and OTN for this record and the process proceeds to block 190.

In block 190, a determination may be made if the group which the buyer has selected is part of a Multi-Group Purchase. If it is determined that the group which the buyer has selected is part of a Multi-Group Purchase, then a Multi-Group Purchase number (MGP #) is retrieved and a MGP Transaction Number (MTN) is retrieved or generated as set forth in a block 192, before proceeding to block 158. For each SKU that is ordered as part of an MGP, the MGP Transaction Number (MTN) is created to enable aggregation of these quantities across all buyers who are participants in the groups which are participants in the MGP. If it is determined in block 190 that the group which the buyer has selected is not part of a Multi-Group Purchase, then execution proceeds to block 158. The OTN, BTN, GTN, and, if appropriate, MTN, will be added to the Order Log file, which constitutes a transaction table recording each add, delete, and change of each event which affects each buyer's orders.

It is considered that further details regarding additional steps that must occur in connection with a MGP would be apparent to a person of ordinary skill in the art upon a review of the present description of the invention and, therefore, such details will not be provided in the remaining figures. It may be recalled however that it may be beneficial for several buyer groups to combine the orders of two or more groups together to obtain better availability and pricing of products, including a greater likelihood of achieving valid order quantities and the minimum total dollar amount that may be required from a supplier before accepting an order. When such a collaboration of buyer groups' orders is in effect, there will preferably be an optimization of ordered quantities of products for all buyers of all buyer groups in the MGP to achieve optimal orders for all the SKUs which have a common MGP #. Further, a reporting mechanism will preferably be provided for dividing the composite order to the supplier into the proper quantities of products for each buyer group in the MGP. In addition, to allow reconciliation of payments between the buyer-coordinator 28 who paid the supplier 24 on behalf of the MGP, and the one or more buyer-coordinators 28 who did not pay the supplier 24, a report is generated calculating and reporting amounts owed to the supplier 24 by each buyer group participating in the MGP.

As may be noted from the prior discussions, it should be readily apparent that the OTN records single events for an individual buyer for a product in a session, the BTN delineates the buyer's total quantity of units of a product for a given order cycle, the GTN delineates the total quantity of units of a group for a given product for a given order cycle, and, if the MGP mode of the invention is utilized, the MTN defines the total quantity of units for a given product of all buyers participating in a given MGP # for a given order cycle.

The next series of steps are represented by an order processing system (OPS) block 160 (expanded upon later in FIG. 11). After the OPS portion is completed in FIG. 10, the buyer's account is displayed with all the order information and the SKU status flags may be set to IL (in limbo) or VL (valid) as shown in a block 162. A setting of IL may occur when the quantity of units ordered for a given SKU does not achieve a valid order quantity for those specific instances where the supplier sells that product in caselot quantities only and the buyer-coordinator 28 is not presently willing to absorb the difference. After block 162, further buyer modifications to the order are determined in a decision block 164. If the buyer chooses to make more modifications to the order, there will be a return to decision block 150. Otherwise, the buyer is preferably returned to a main menu such as may be presented in connection with block 122 where the buyer may order from a different group or log off.

Figure 11:
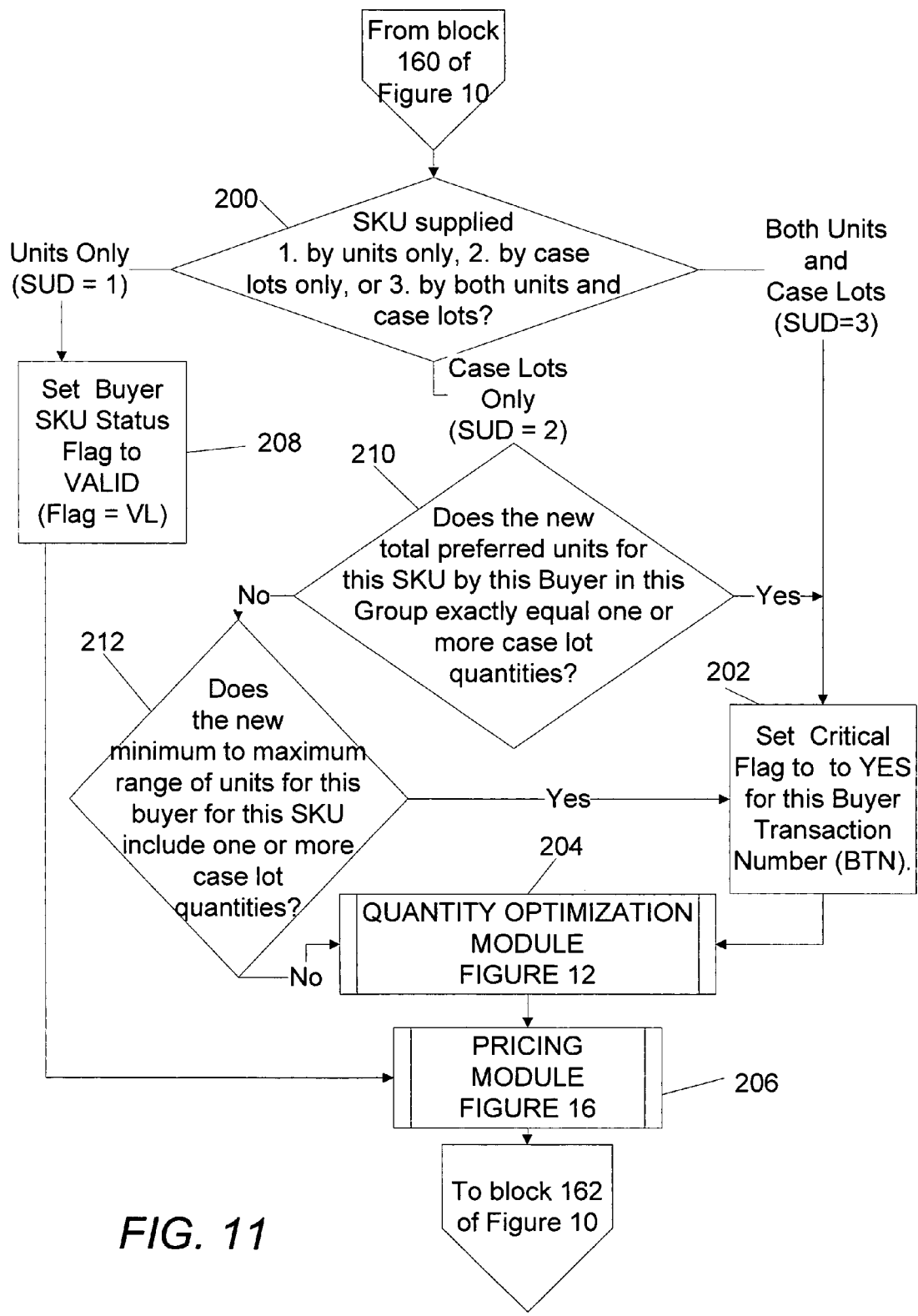
FIG. 11 is a flow diagram detailing further steps involved in the ordering process of FIG. 10.
Figure 12A:
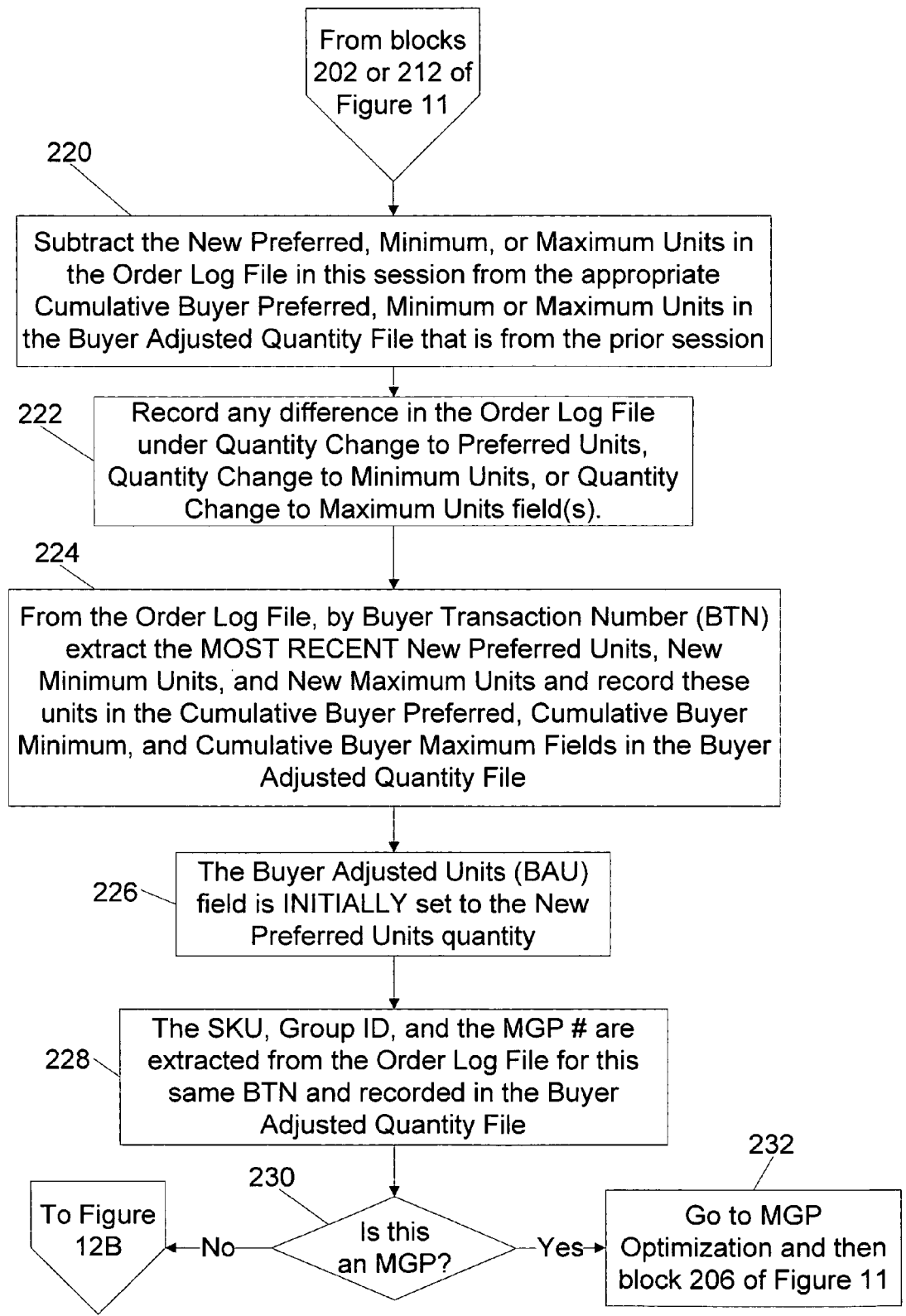
FIGS. 12A-12D provide additional details of the steps involved in a Quantity Optimization Module of FIG. 11 (FIGS. 12A-12D will be referred to herein collectively and individually as FIG. 12)
Figure 12B:
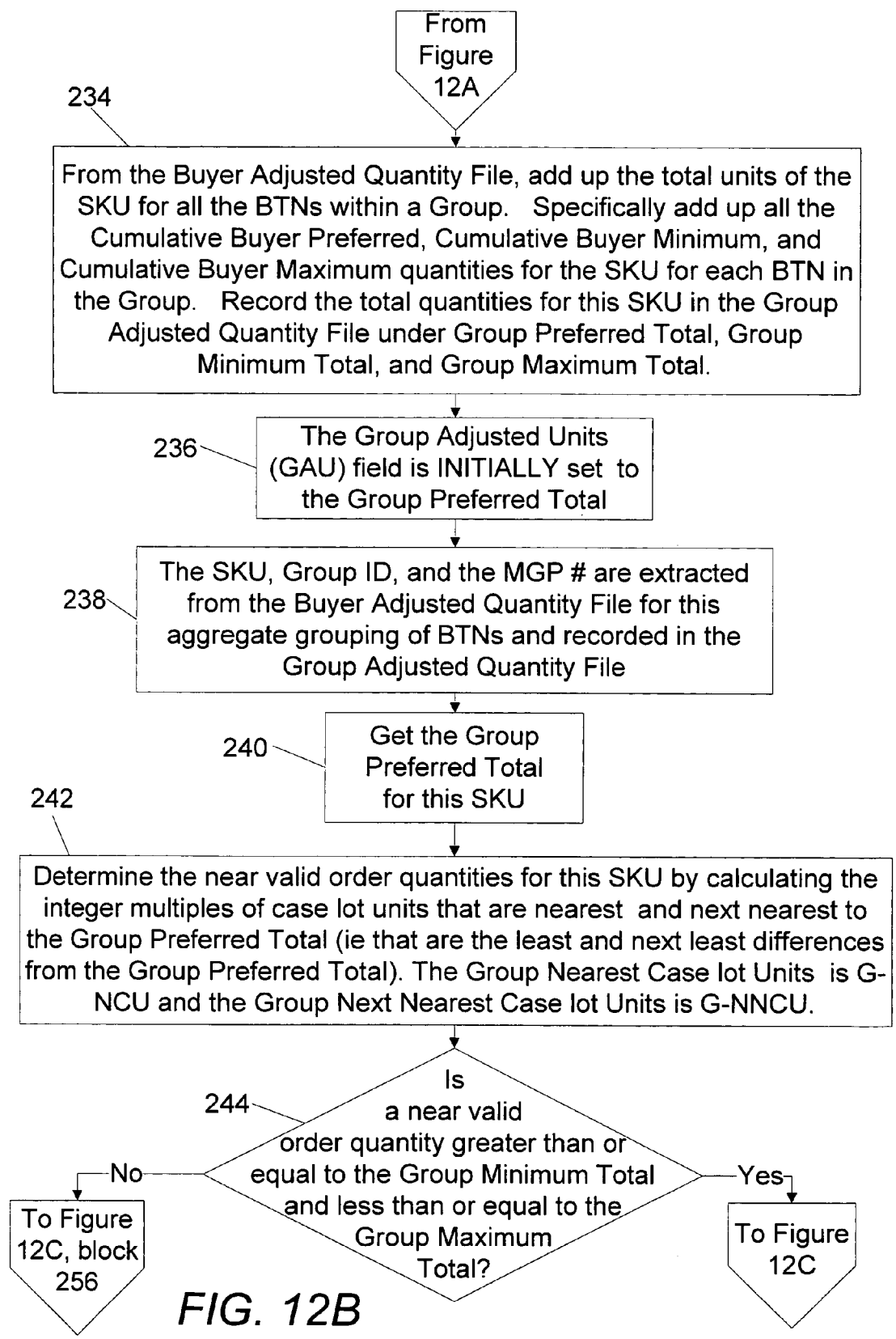
Figure 12C:
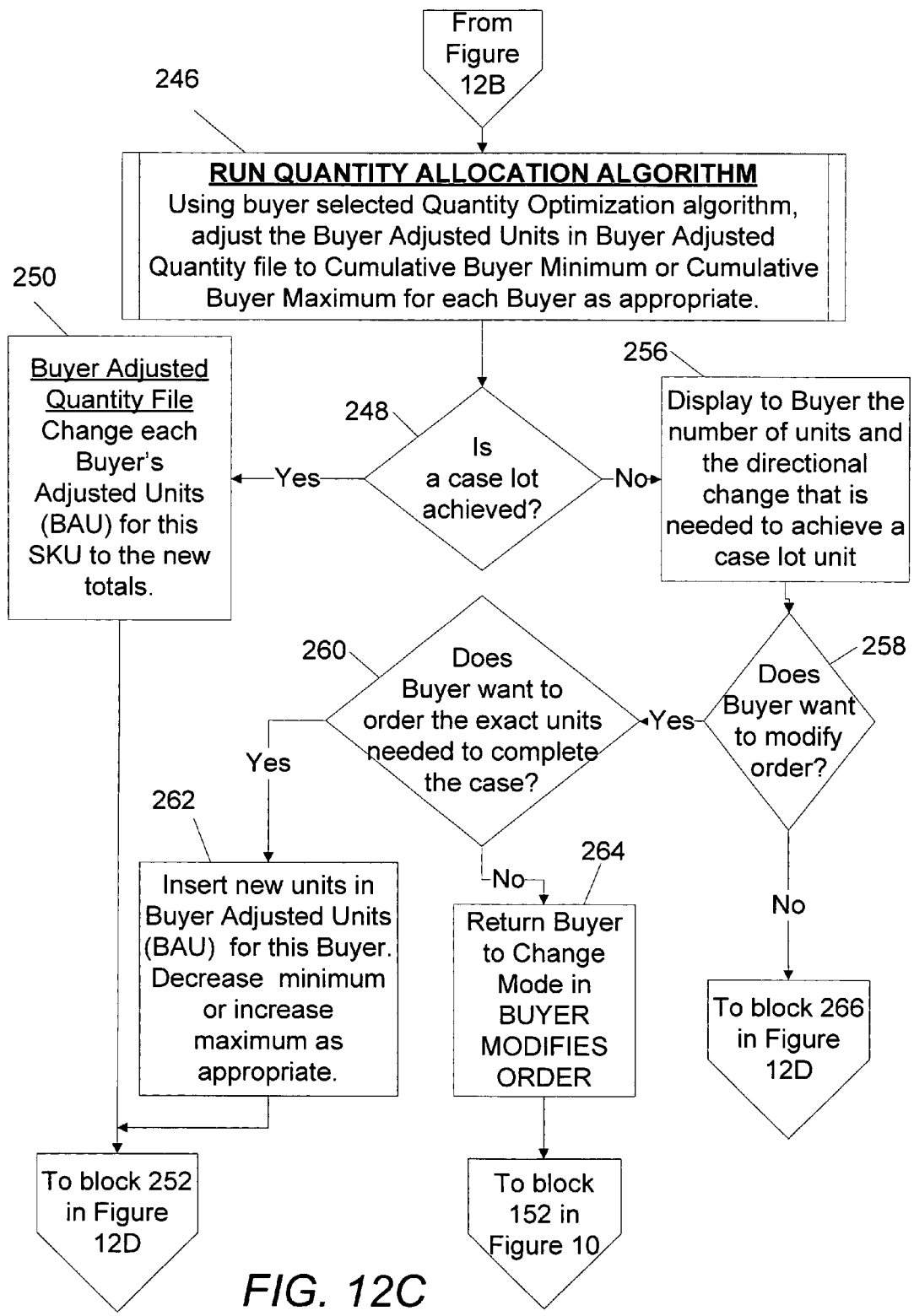
Figure 12D:
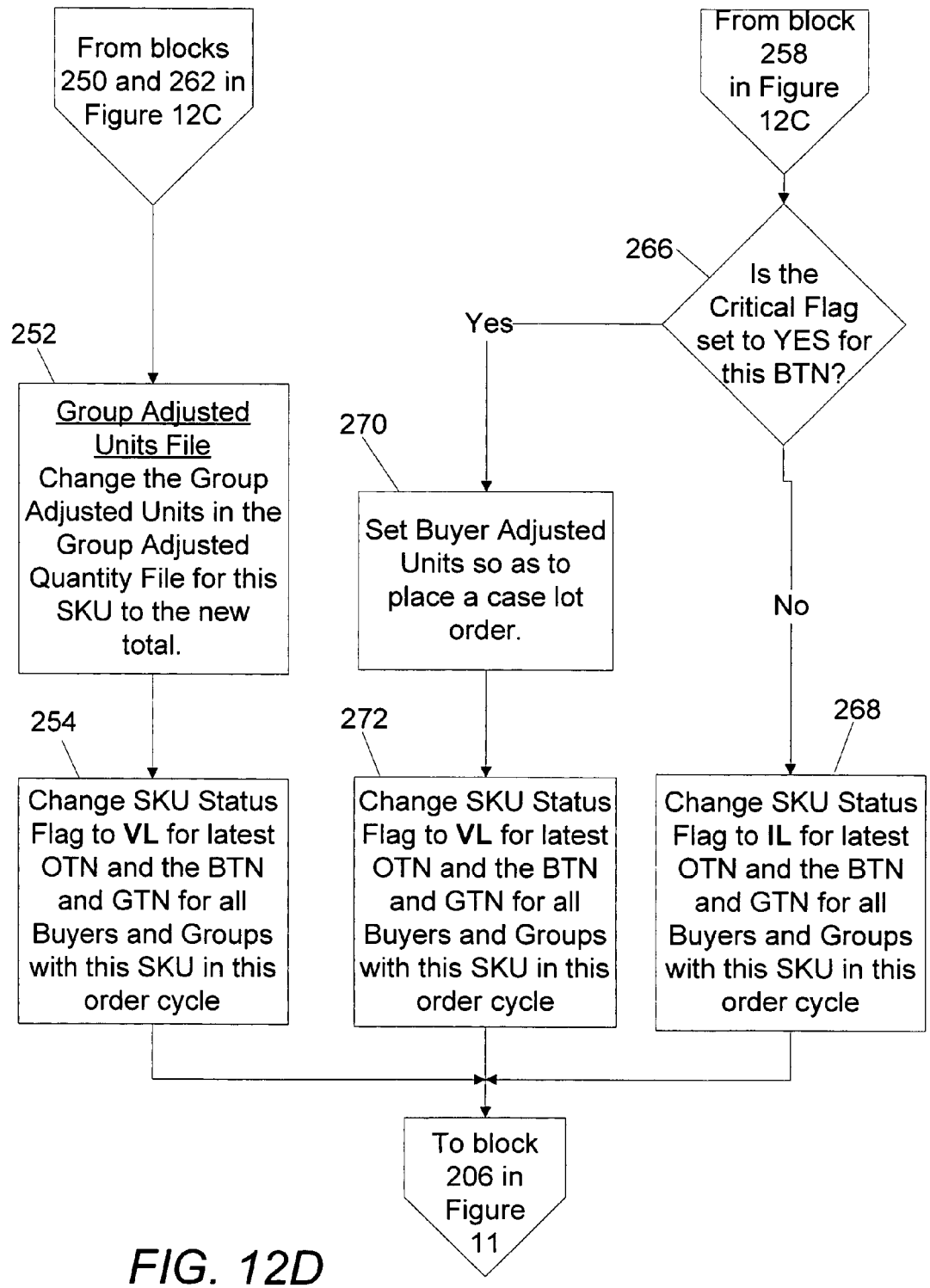

The order processing system (OPS) of FIG. 11 starts with a decision block 200 where, preferably, it is determined whether the SKU presently being considered is sold by units only, caselots only, or both units and caselots. A term and numeric designation is established whereby a product sold by units only is preferably assigned a Supplier Unit Designator (SUD)=1, a product sold by caselots only is preferably assigned an SUD=2, and a product that is sold by both units and caselots is preferably assigned an SUD=3.

If the SKU which is being modified is sold by units only (SUD=1), execution proceeds to a block 208 where the SKU status flag is set to VL indicating valid, since this product can be ordered in any units. Therefore, when the product is sold in only unit quantities and greater quantities provide no price breaks, no quantity optimization algorithm need be invoked to determine optimal purchase quantities. Thus, in the instance described above, then a composite order for this group may be aggregated without any quantity optimization requirements. It should be understood that while FIG. 11 shows an output of block 208 being physically input to the pricing module 206, this flag is set to VL at the time of the determination in block 200 and is then later accessed and used within the flow chart of the pricing module of FIG. 16 when appropriate.

If the SKU which is being modified is sold by caselots only (SUD=2), then execution proceeds to a decision block 210 in order to determine whether the preferred quantity of units entered by the buyer exactly equals an integer number of case lot quantities. If it is determined that the preferred quantity of units entered by the buyer does exactly equal an integer number of case lot quantities, then this is a valid order quantity and execution proceeds to a block 202 to set the Critical Flag to YES for this BTN before continuing to the Quantity Optimization Module indicated in a block 204. The Critical Flag is designated to be a separate field from the SKU status flag, and will be utilized to ensure that the order for this buyer for this product in this order cycle will be placed with the supplier, whether or not a case lot increment of units is obtained for all buyers of the group by the Quantity Optimization Module.

The setting of this Critical Flag to YES in block 202 for this BTN indicates that a sufficient quantity of the selected product has been ordered by this buyer in the present order cycle to order the product from the supplier and, therefore, the buyer is assured of an order being placed for this product as part of the current order cycle. If decision block 210 results in a NO condition, then execution proceeds to decision block 212 to ascertain if the range of quantities from minimum to maximum of the selected SKU by the present buyer includes one or more case lot quantities. If it does, then this is a valid order quantity and execution proceeds to block 202 and the Critical Flag in block 202 for this BTN is set to YES. Then execution proceeds thereafter to block 204, a Quantity Optimization Module. If block 212 results in a NO condition, then execution proceeds directly to the Quantity Optimization Module noted in block 204 and described in FIG. 12.

If the SKU which is being modified is sold by units and case lots (SUD=3), execution preferably proceeds to block 202 to set the Critical Flag to YES for this BTN before continuing to the Quantity Optimization Module indicated in a block 204. In this instance, the setting of this Critical Flag to YES for this BTN indicates that the selected product achieves a sufficient quantity of units in the present order cycle to obtain the product from the supplier and, therefore, that the buyer will be assured of an order being placed for this product as part of the current order cycle. However, since the product may be ordered by the case or by the unit, and case lot pricing is typically significantly less than unit pricing, the BTN is still subject to further optimization by quantity for the purpose of achieving more favored pricing. If for any reason a caselot quantity is not achieved, the product will preferably nonetheless be ordered for this buyer in this order cycle since it may be supplied by units as well as by caselot quantities.

The Quantity Optimization Module block 204 is presented in more detail in FIG. 12. For each product having an SUD=2 or an SUD=3, optimization will attempt to obtain a valid order quantity. For all products that achieve a valid order quantity in the Quantity Optimization Module, the next step comprises a Pricing Module 206. Details of the Pricing Module 206 are provided below with respect to FIG. 16. After the Pricing Module, execution then continues to block 162 in FIG. 10 to display the buyer's account information and then to block 164 to determine if there are any further changes needed or whether the buyer is finished placing orders in this session.

Figure 13A:
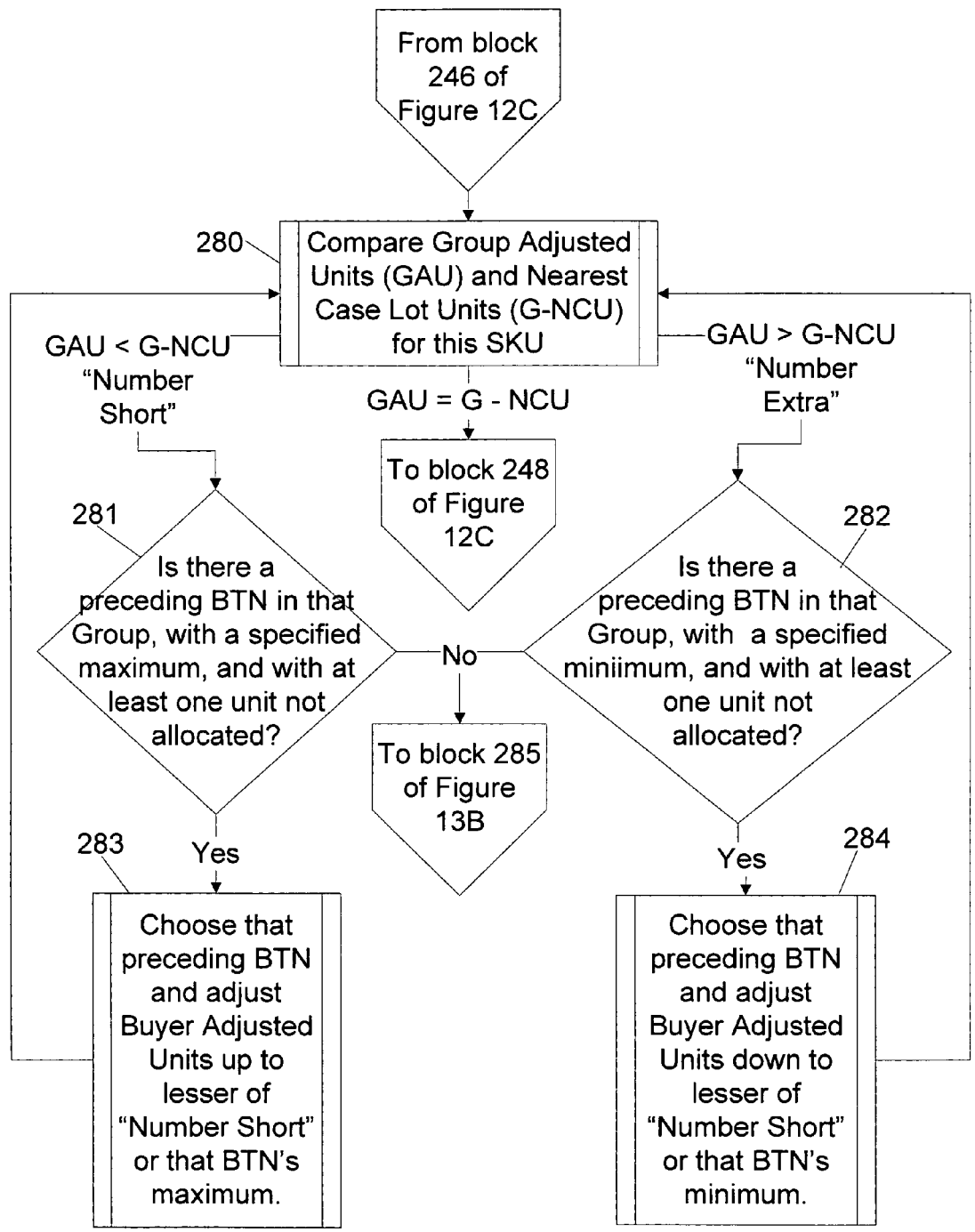
FIGS. 13A-13B are a high-level flow diagram of a LIFA (Last-in, First Adjusted) algorithm that may be used in conjunction with the Quantity Optimization Module of FIG. 11 or may used as a subset under the algorithm of FIG. 15 (FIGS. 13A-13B will be referred to herein collectively and individually as FIG. 13)
Figure 13B:
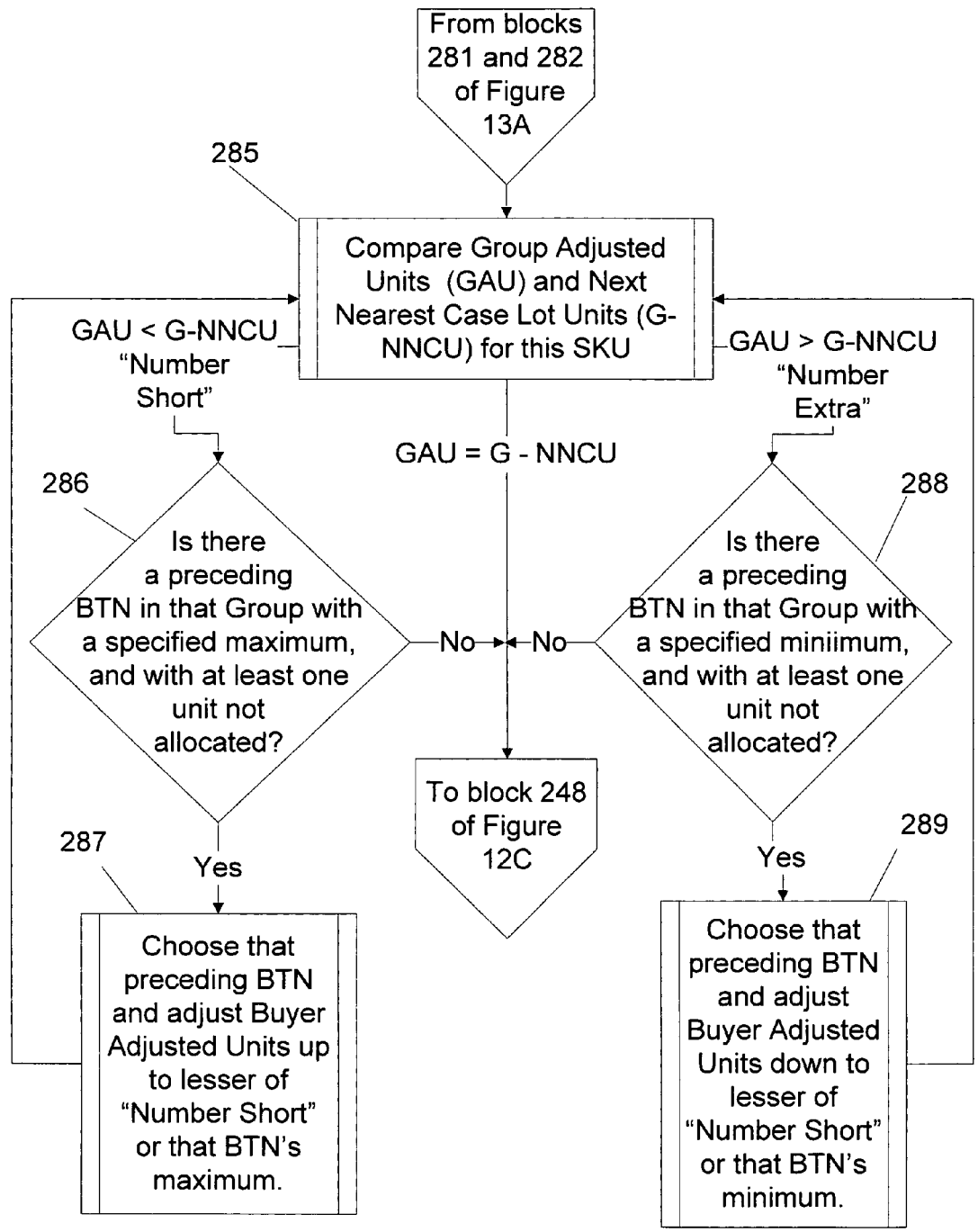
Figure 14A:
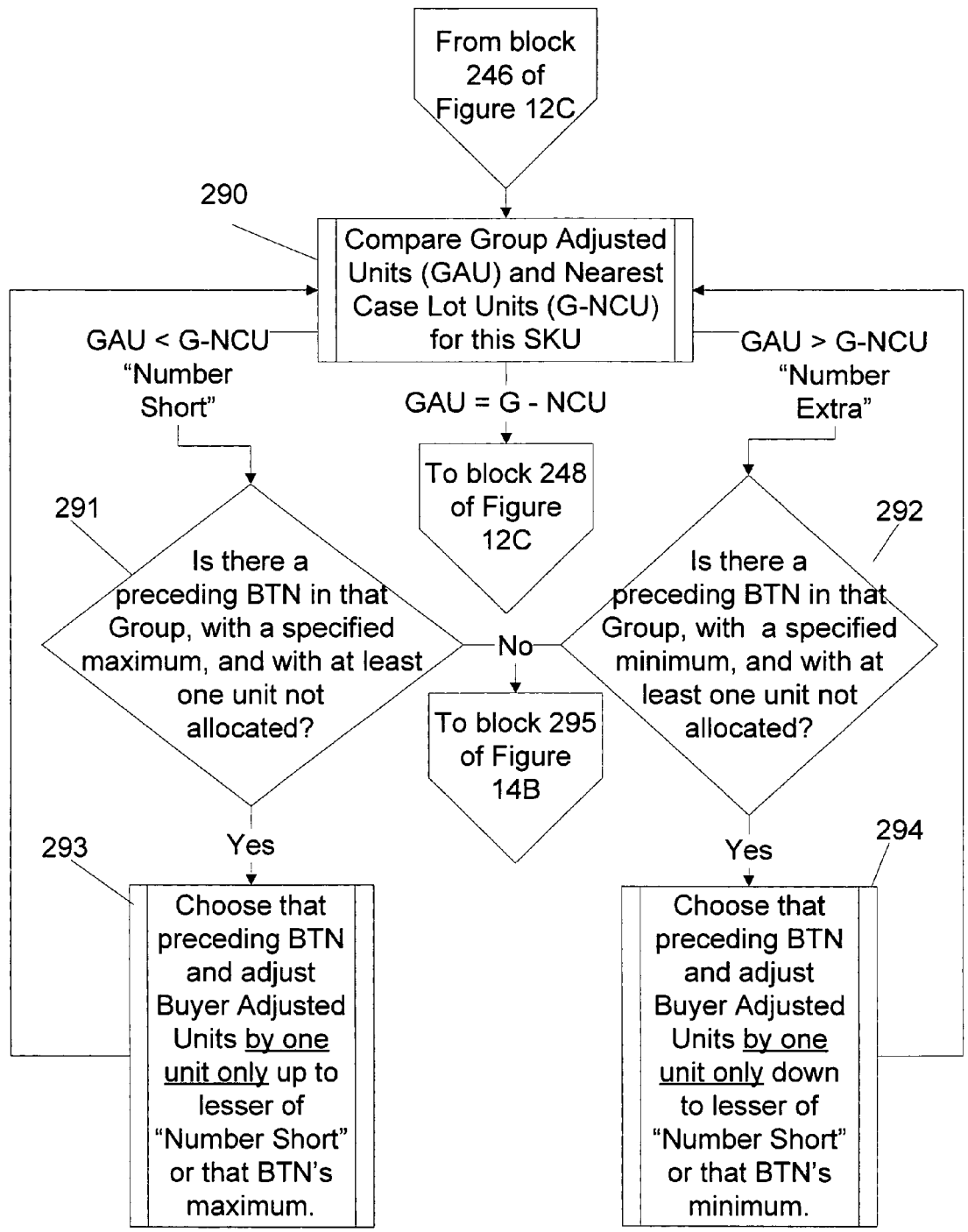
FIGS. 14A-14B are a high-level flow diagram of a LIFA with LADP (LIFA with Least Absolute Difference from Preference) algorithm that may be used in conjunction with the Quantity Optimization Module of FIG. 11 or may be used as a subset under the algorithm of FIG. 15 (FIGS. 14A-14B will be referred to herein collectively and individually as FIG. 14)
Figure 14B:
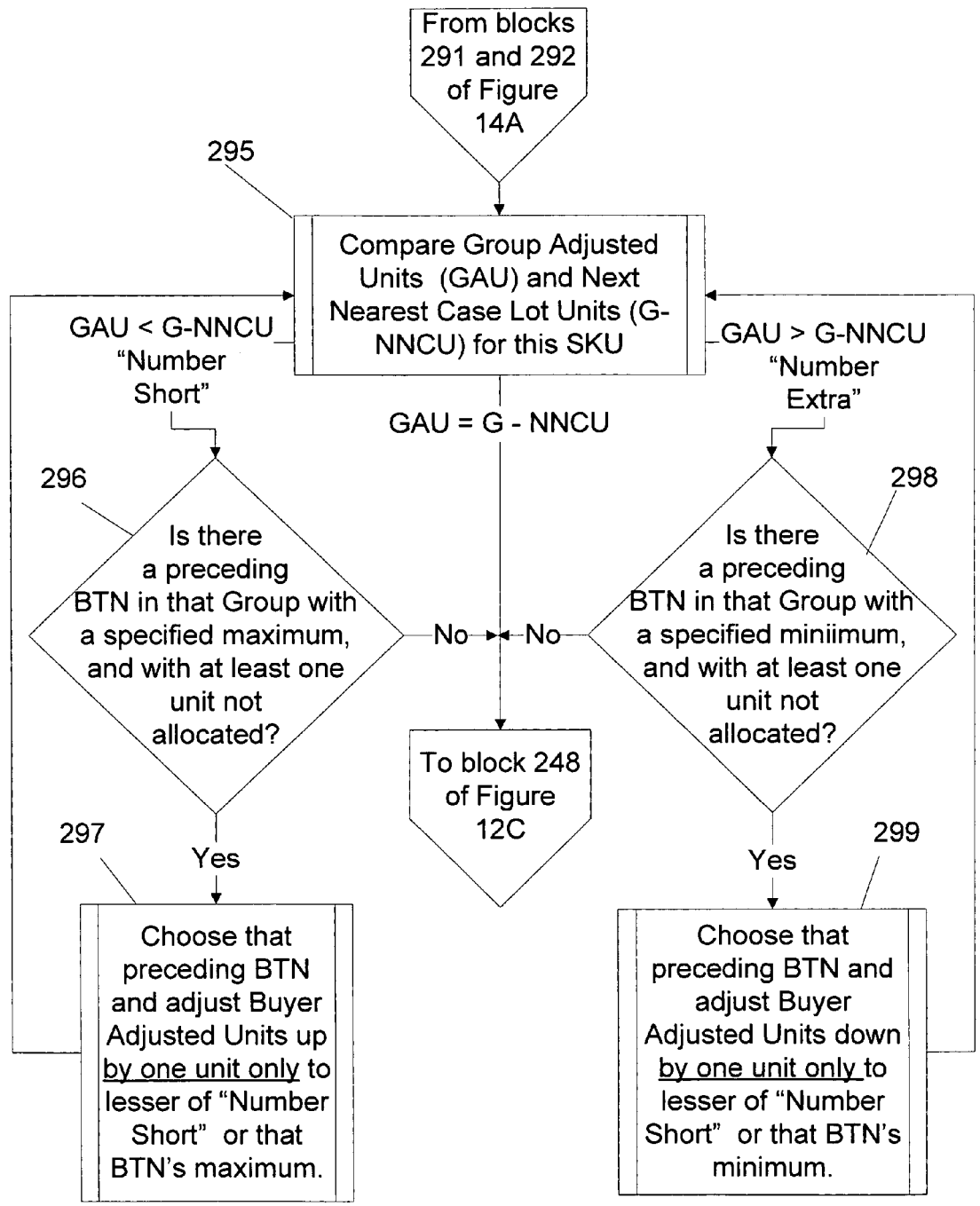
Figure 15A:
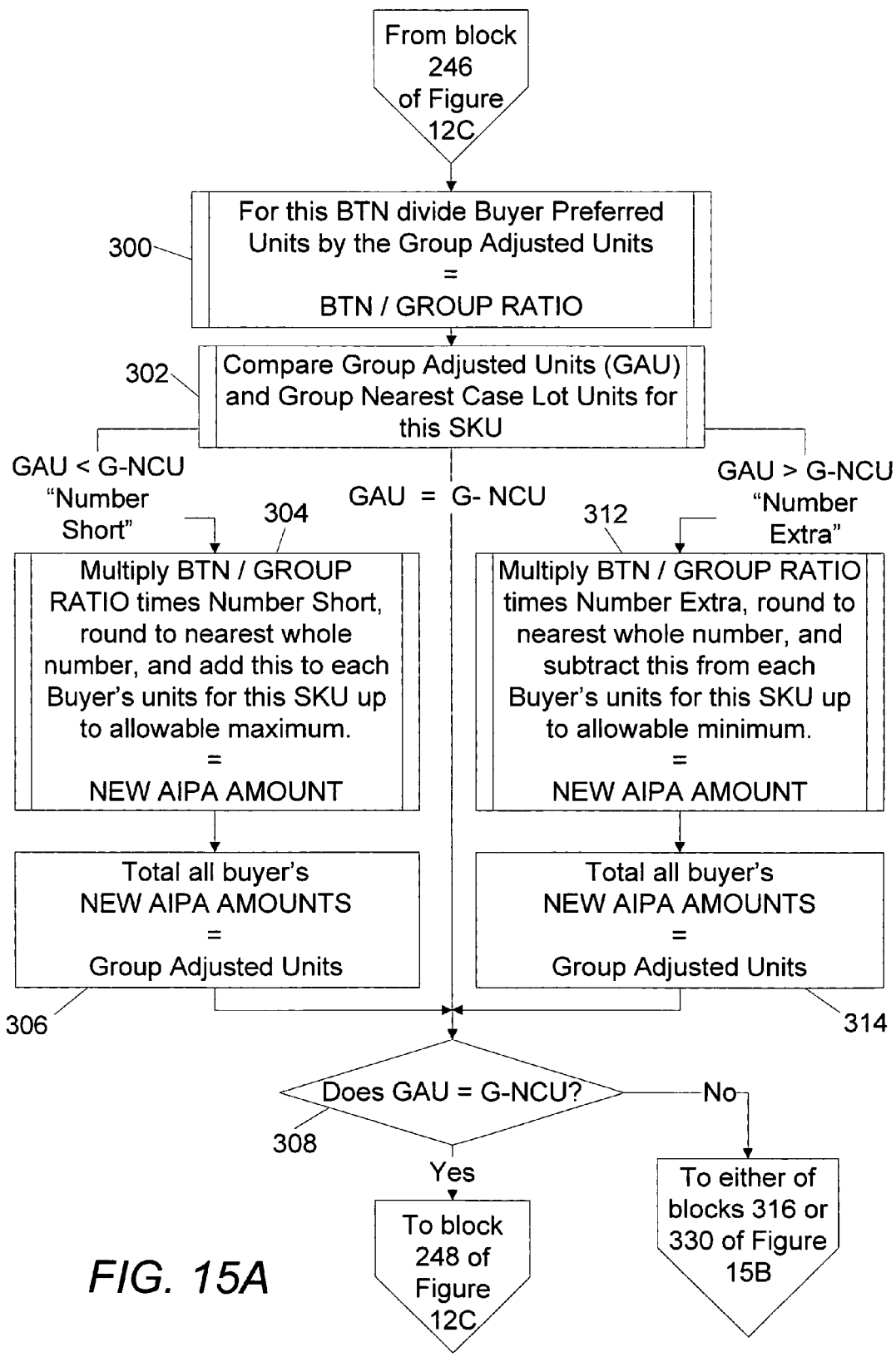
FIGS. 15A-15B are a high-level flow diagram of an AIPA (Adjusted in Proportional Amounts) algorithm that may be used in conjunction with the Quantity Optimization Module of FIG. 11 (FIGS. 15A-15B will be referred to herein collectively and individually as FIG. 15)
Figure 15B:
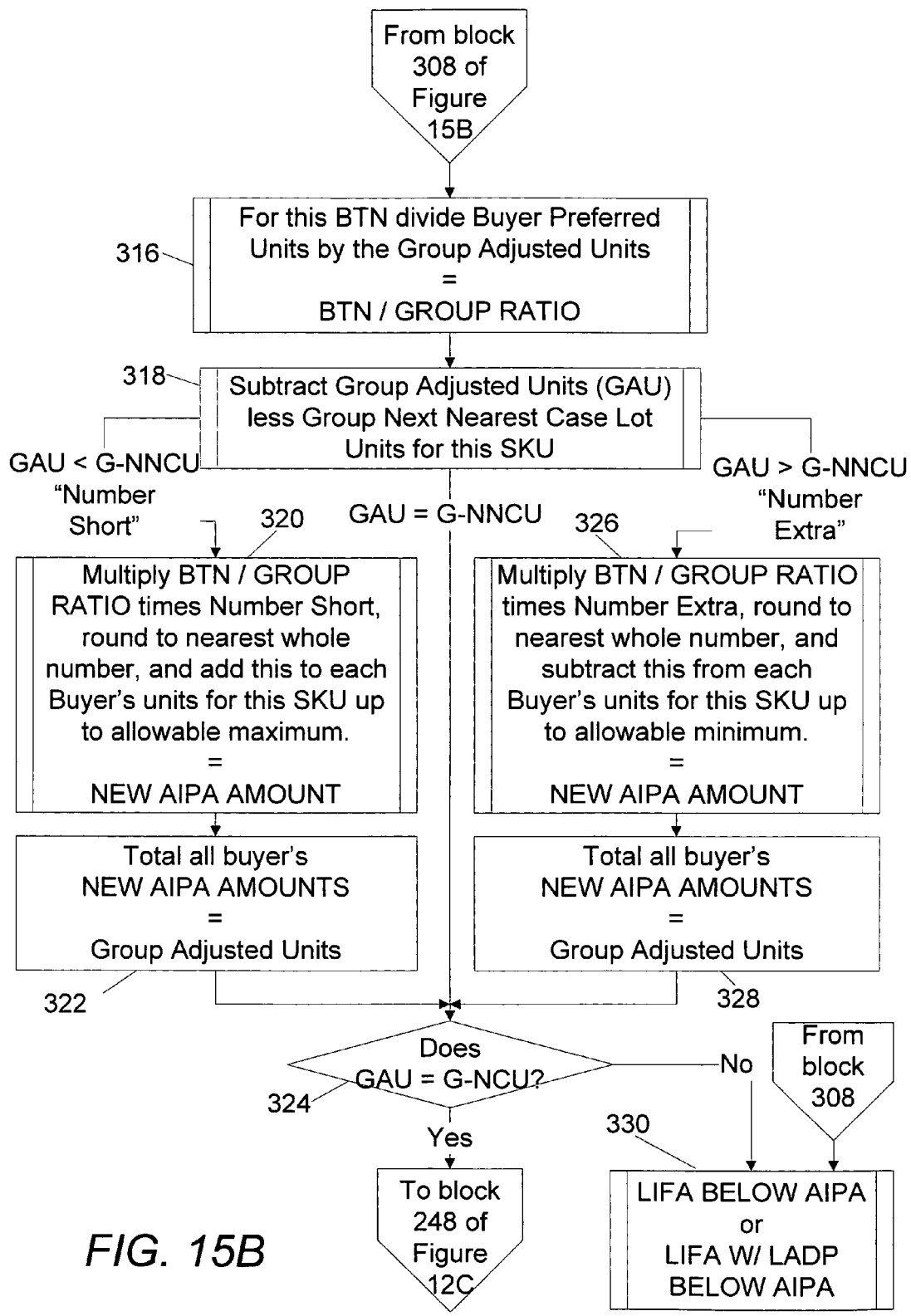

The Quantity Optimization Module, FIG. 12, in conjunction with at least one of FIGS. 13, 14, and 15, details various preferable means of completing the Quantity Optimization Module block 204 of FIG. 11. As will be presented hereafter and has been discussed above, the preferred, minimum and maximum units that will be utilized for illustrative purposes in FIGS. 13, 14, and 15 are the exact integers which are the buyer's preferred units and the acceptable minimum units and maximum units specified by a buyer to define acceptable variation limits. However, as noted above, variations may be obtained by various alternative methodologies to perform the optimization calculations generally described hereafter.

A first step 220 involves subtracting the latest buyer specified total quantities of preferred, minimum and maximum units for this session from the similar quantity listings in the previous session for the present buyer. This establishes the current changes made in this event. A next step in block 222 records these difference values (positive or negative) in the order log file before proceeding to a block 224.

The latest preferred, minimum and maximum unit quantities specified by the present buyer are next extracted from the order log file as set forth in block 224 and then passed to a Buyer Adjusted Quantity file. These extracted quantities are then available for later use by an adjustment or allocation algorithm. In a next step 226, a total buyer adjusted units (BAU) field in the data repository 20 is then initially set to the total preferred units quantity as obtained previously and as used in block 220. Next, in a block 228, the SKU, Group ID and, if appropriate, the MGP# are extracted from data repository 20 for this same BTN and recorded in the Buyer Adjusted Quantity file. As shown, a logical next decision block 230 ascertains if this order is part of a Multi-Group Purchase (MGP). If so a series of steps, similar to those yet to be detailed for a single buyer group, would be followed to provide a predetermined optimal allocation of units among all the buyers of the combined groups participating in the MGP who have ordered this SKU in this order cycle. This is shown as a single block 232. Upon completion of block 232, the process would preferably continue to the pricing module 206.

Since the present description of the invention details only a single buyer group purchase flow diagram, the next step is presented in a block 234. In accordance with this step, the total preferred, minimum and maximum unit quantities for all buyers of the buyer group who have ordered the present SKU in the present order cycle are recorded in the Group Adjusted Quantity file. Next, in a block 236, a Group Adjusted Units (GAU) field in the data repository 20 is initially set to the Group (or MGP) Preferred Total. In a block 238, the SKU and Group ID and, if appropriate, the MGP #, are extracted from data repository 20 and recorded in a Group Adjusted Quantity file. Next, the group (or MGP) preferred total is obtained for the present SKU in a block 240.

The next step as noted in block 242 is preferably to calculate near valid order quantities. The near valid order quantities preferably comprise the nearest and next nearest case lot quantities to the Group Preferred Total quantity. The procedure for determining the nearest and next nearest case lot units is described in greater detail below. As noted in a decision block 244, if a near valid order quantity (i.e., the units of the nearest and next nearest case lots for this SKU) is not equal to or does not fall within the Group Minimum Total or the Group Maximum Total range, then execution preferably proceeds to FIG. 12C, block 256. In block 256 a calculation is offered to the buyer enabling a modification to be made to the buyer's order outside of the buyer's specified minimum and maximum range which can then enable a near valid order quantity to be achieved for that SKU. If a near valid order quantity is equal to or does fall within either of the Group Minimum Total and Group Maximum Total range, then execution next proceeds to FIG. 12C, block 246.

Block 246 defines a module which, based on the algorithms that the buyer-coordinator 28 has selected for the buyer group in block 44, utilize the preferred quantities and variations of all buyers who have ordered this SKU to determine a preferable beneficial outcome for the buyer group (or for all buyer groups participating in the MGP). As is discussed later, a variety of different algorithm or sets of algorithms for a group of buyers may be employed. However, in a given MGP (which by definition includes more than one group of buyers) a uniform quantity optimization algorithm or set of quantity optimization algorithms is preferably used for all the buyer groups participating in that MGP.

As will be noted in detail later, the primary function of block 246 is to utilize the pre-selected algorithms to adjust purchase quantities in an attempt to achieve a valid order (caselot) quantity for an SKU by re-allocating units among each buyer of the group (or MGP where applicable) who has ordered the SKU. If in a decision block 248 it is ascertained that a valid order quantity can be achieved by adjusting units to levels that are equal to or within buyers' specified minimum and maximum ranges, execution proceeds to a block 250. As set forth in block 250, each buyer's quantity of the presently selected SKU is adjusted as appropriate throughout the indicated variation range entered by that buyer before proceeding to a block 252 where the Group Adjusted Units (GAU) field in data repository 20 is updated. When an integer number of caselots has been achieved with the present buyer's order of the present SKU, the SKU status flag is changed to valid (VL) for all the BTN, GTN, and if appropriate, MTN, in a further block 254 before returning to the Pricing Module 206 in FIG. 11.

If an integer number of caselots (valid order quantity) cannot be obtained in block 246, execution preferably proceeds from block 248 to a block 256 wherein the buyer is preferably informed of the exact quantity of units (whether an increase or decrease to the purchase quantity of that buyer) that the buyer may select so as to achieve a case lot. A determination is then made in a decision block 258 as to whether or not the buyer is willing to modify the present order. If the buyer is willing to modify the present order, a determination is made in a block 260 as to whether the buyer is willing to modify the present order to achieve a complete case. If the buyer is willing to modify the present order to achieve a complete case, the quantity is recorded as set forth in a block 262 before proceeding to blocks 252 and 254 and returning to the pricing module 206. If the buyer does not want to order the exact quantity of units needed to complete a case, execution proceeds through a block 264 to the "modify order" path going to block 150 in FIG. 10. If, in decision block 258, it is determined that the buyer does not want to modify the order, execution proceeds to a decision block 266 where a check is made to determine if the Critical Flag is set to YES for this BTN. If the Critical Flag is not set to YES for this BTN, the SKU status flag is set to IL (In Limbo) as stated in a block 268 and a return is made to pricing block 206 in FIG. 11. Otherwise, in a block 270, the Buyer Adjusted Units are set to obtain a case lot order for this BTN before setting the SKU status flag to VL in a block 272 for the latest OTN and other indicated fields before advancing to the Pricing Module 206 in FIG. 11.

The above discussion notes that each buyer in decision blocks 258 and 260 is provided the option of modifying an ordered quantity of units for that product which will exactly enable achievement of a valid order quantity. Alternatively, the buyer-coordinator may, at any time in the order cycle but preferably as the cutoff approaches, choose to order on behalf of the group a quantity of units that enables an optimized purchase result for the group to be achieved. For example, if 5 buyers have in aggregate ordered a total of 47 units of a product in which 48 units comprise 4 cases of 12 units each (and the product is sold only by the case and no other combination of the 5 buyers' purchase quantities achieves a valid order quantity), the buyer-coordinator on behalf of the 5 buyers may elect to purchase the 1 unit which brings the total order to 48 units which thus enables the buyers' orders for 47 units to be placed with the supplier. The 1 extra unit ordered by the buyer-coordinator then becomes inventory for the group of buyers. The group benefit is thus enhanced by creating satisfied buyers who purchase more products, which in turn increases the likelihood that all buyers of that group will achieve their desired quantities of units for each ordered product. Effectively this benefit results from a group of buyers acting cooperatively by providing allowable variations which when coupled with communications and algorithms increases the probability of achieving valid order quantities for ordered products for all buyers of that group.

Quantity Allocation Algorithms

It has been noted that in many instances products are available from certain suppliers in only bulk quantities of units, called cases, case lots, and the like, and that without achieving such quantities of units some buyers' orders will not be able to be filled from those suppliers. Since it is of major importance to maximize all buyers' probabilities of achieving successful orders, i.e., to generate a valid order quantity for the group, one or more methods are needed for allocating quantities of units to optimally serve the group's desire to order products which otherwise may not be available to the buyers of that group when acting as individuals. Therefore to achieve the satisfaction of the group as a whole an allocation system is needed whereby units ordered by buyers are adjusted within variations that are acceptable to the group and/or to each buyer within the group. Certain algorithms are generally discussed below to illustrate means by which group needs may be attained by adjusting buyers' purchase quantities, thereby allocating caselot units across buyers of that product so as to achieve a valid order quantity for that product.

The purposes for running algorithms are at least three. A first purpose is to preferably achieve for buyers in a group (or an MGP) order placement for a product from a supplier when that product is sold only by a given quantity of units (such as a caselot quantity) so that buyers in a group may receive some quantity of units of the products that they have ordered. A second purpose is to make adjustments by some guiding rules which reflect various input factors including, specified minimum and maximum units or integer quantity deviations or percentage quantity deviations, the timing of placement of buyers' orders, a subsequent change in the quantity of units specified for a product by a buyer, group determined acceptable allocation formulae (including quantity limits for buyers), other factors, or some combination of all of these. A third purpose is to assist the group in obtaining the best possible pricing arrangements based on allocations of quantities ordered by buyers in the group (or MGP).

Presented herein are some preferable quantity allocation algorithms termed LIFA (Last-in, First-Adjusted), LIFA with LADP (i.e., with Least Absolute Difference from Preference), AIPA (Adjusted in Proportional Amounts), FIFA (First-In, First-Adjusted), and combinations thereof, as presented in further detail below and in FIGS. 13, 14, and 15.

To initiate an algorithm, it is first necessary to determine (for the SKU, buyer group or MGP, and order cycle on which the optimization is to be run), the total of all the preferred units (abbreviated G-TPU) of all buyers in the group and to preferably compare this to the near valid order quantities, which are preferably the nearest and next nearest valid order quantities (also referred to herein as nearest and next nearest case lot quantities) for an SKU for the group, but which may also include any other quantity of units which is an integral multiple of the number of units in a case for that product.

The nearest case lot units for a SKU in a group (abbreviated as G-NCU) equal those units that are preferably closest to the G-TPU which also are integral multiples of the units required to place an order for a product or achieve one or more price break points. For example, with a case lot units of 12 units to a case, the quantities of 12, 24, 36, and so on are each case lot units. When a product (having an SUD of 3) carries a multi-tiered pricing structure as in the instance of 1-4 units, 5-8 units, 9-12, and 13 and above units each representing different prices for a product where each higher quantity tier achieves a lower price, the 5, 9, and 13 unit levels effectively may be each viewed as case lot quantities of units and thus 5, 9, and 13 units would also be valid order quantities.

The following examples serve to further define nearest and next nearest case lots units. For a case of 12 units, if the total preferred units (G-TPU) are 17, then the nearest case lot units (G-NCU, group nearest caselot units) are preferably 12. If the total preferred units (G-TPU) are 19, then the nearest case lot units (G-NCU) are 24. If the G-TPU is 18, then the G-NCU can be either 12 or 24. In this instance, the buyer-coordinator 28 may elect to use the higher or lower quantity which is selected by the buyer-coordinator 28 as a default when setting up the buyer group information in block 44 of FIG. 2. The calculation to begin the algorithm is to compare the total preferred units (G-TPU) with the nearest case lot units (G-NCU) in order to determine the difference between them.

For purposes of maximizing the probability of achieving one or more success condition(s) it is also preferable to calculate the NEXT nearest case lot units, which are abbreviated as G-NNCU (group next nearest caselot units). In the examples cited above, the G-NNCU for the SKU sold in cases of 12 would be, for a G-TPU of 17 the quantity 24, for a G-TPU of 19 the quantity 12, and for a G-TPU of 18 the quantities of either 12 or 24 (whichever was NOT designated to be the G-NCU by the buyer-coordinator's 28 default selection in the buyer group information in block 44 of FIG. 2). It should be noted that in certain circumstances, it may be advisable to use additional integer unit multiples of case lot units that are outside the range of the nearest and next nearest case lot units and therefore the designation of "near valid order quantity" preferably includes nearest and next nearest case lot units but, alternatively, may include other integer multiples of case lot units as may be utilized to achieve the appropriate buyer group objective or objectives in the event that the nearest or next nearest caselot units does not achieve appropriate buyer group objective or objectives.

When optimization calculations are run, the calculated totals are aggregated by buyer (BTN) and buyer group (GTN), and, if in effect, an MGP (MTN), and the quantity output results of the optimizations are recorded in fields entitled, Buyer Adjusted Units (BAU) for each buyer, Group Adjusted Units (GAU) for each group and, for each MGP in effect, MGP Adjusted Units (MAU). Therefore, the algorithms measure the success condition of achieving a case lot quantity by comparing the GAU and either the G-NCU or the G-NNCU, with a success condition being a result of equality. For the first time a buyer places an order for an SKU (i.e., the time of creation of the BTN), the Buyer Adjusted Units for that buyer are set to equal the New Preferred Units for that buyer as noted in block 226. Similarly for the group, the Group Adjusted Units for that group are set to equal the Group Preferred Units for that buyer (i.e., at the time of creation of the GTN reflecting the first order of that SKU for that group) as noted in block 236. Each time the optimization calculation is run the BAU, GAU, and MAU may change. However the default condition is to preferably set the adjusted units to the latest preferred units for the appropriate buyer, group, or MGP if applicable. Effectively, each time an add, delete, or change event is made to an SKU by a buyer of a buyer group (or an MGP) for a product with an SUD of 2 or 3, the optimization process preferably utilizes the latest preferred quantities of each buyer as the starting point to achieve valid order quantities based on the buyer's preferred quantities, minimum and maximum quantities, and the allocation algorithms for that group (or MGP) in that order cycle.

As was noted previously, the allocation algorithms may also use variations for buyer ordered units that are determined by various methodologies. While these alternative variation methodologies generally include a selection of preferred units with minimum and maximum units optionally specified, and a single quantity of units with specified deviations (integer and/or percentage increases and/or decreases) as well as allowing prior ordered units, the optimization process and algorithms may also be constructed so as to offer to buyers certain quantities of units that achieve a valid order quantity, but which do NOT fall within buyer's permitted variations, as will be described further below.

It should be noted that if an MGP is in effect then the comparable abbreviations would be M-TPU (for MGP Total Preferred Units), M-NCU, (for MGP nearest caselot units), M-NNCU (for MGP next nearest caselot units) and MAU (for MGP Adjusted Units). The totals noted above would be calculated for all the buyers who are included in all buyer groups participating in the MGP, rather than just for all the buyers in a single buyer group.

LIFA: Last-In, First-Adjusted

FIG. 13 comprises an algorithm referred to as LIFA (Last in, First Adjusted) wherein the last in (ie the most recent) buyer (BTN) to add or change an order for the SKU is preferentially first adjusted to the appropriate one of a buyer specified allowable maximum and minimum quantities of units of a product in an attempt to adjust the group ordered units to achieve the G-NCU or G-NNCU. If that buyer's adjusted BTN does not result in a valid order quantity, then the next previous BTN for that SKU is adjusted toward one of the indicated maximum and minimum to determine if a valid order quantity (eg, caselot increment) may be achieved. This adjustment process is continued with each previous buyer, per the dates and times recorded in the data repository 20, until the GAU equals the G-NCU. Alternatively, the adjustment process is undertaken until all the buyers ordering the present SKU have been examined and the order quantities have been adjusted for each buyer of this SKU as far as they can be adjusted (up or down), but a valid order quantity (e.g., a caselot increment) for the SKU still has not been obtained.

It should be noted that the buyer who orders first with LIFA has the highest probability of having the exact amount of units ordered that they wanted to order, assuming that a case lot order is achieved and a valid order quantity can be placed with a supplier. Alternatively stated, the buyer that orders earliest has the least likelihood of being adjusted from their preferred quantity and, if they are adjusted, their adjustment is likely to be less than for those buyers who order later. Therefore, LIFA provides a strong incentive for buyers to place their orders early.

In block 280, the Group Adjusted Units (GAU) is compared to the G-NCU (Group-Nearest Case lot Units) for the present SKU with a result condition being one of less than G-NCU (i.e., there are too few units ordered), equal to G-NCU (i.e., it achieves case lot quantity), or greater than G-NCU (i.e., there are extra units ordered). If the GAU equals the G-NCU then the case lot quantity of units has been achieved and execution returns to block 248 of FIG. 12C.

Assuming GAU is less than G-NCU (i.e., the quantity ordered is short of the nearest case lot units), in block 281 a determination is made as to whether there is a previous BTN with at least one greater unit toward the buyers allowed maximum which may be allocated. If so, the quantity of units of the selected product attributed to that buyer will be adjusted in block 283 by the lesser of the number short or the indicated maximum for that BTN, before returning to block 280 to determine if the GAU now equals the G-NCU, indicating an integral case lot quantity has been achieved. This checking and increasing to the maximum amount of successively prior BTNs continues until an integer number of case lots has been achieved or all prior BTNs have been changed and a failure to achieve a case lot quantity remains. If an integral caselot quantity is achieved, then there is a return to block 248 of FIG. 12. If the indicated maximum for all BTNs have been allocated and the GAU still does not equal the G-NCU, then execution proceeds to block 285.

Assuming GAU is greater than G-NCU (the quantity ordered is greater than the nearest case lot units), in block 282 a determination is made as to whether there is a previous BTN with at least one lesser unit toward the buyers specified minimum which may be allocated. If so, the quantity of units of the selected product attributed to that buyer will be adjusted in block 284 by the lesser of the number extra or the specified minimum for that BTN before returning to block 280 to determine if an integral case lot quantity has been achieved. This checking and adjusting toward the minimum amount of successively prior BTNs continues until an integral case lot quantity has been achieved or all prior BTNs have been changed and a failure to achieve an integral case lot quantity remains. If an integral case lot quantity is achieved, then there is a return to block 248 of FIG. 12. If the indicated minimum for all BTNs have been allocated and the GAU is still greater than the G-NCU, then execution proceeds to block 285.

In block 285, the GAU is compared to the G-NNCU (Group-Next Nearest Case lot Units) for the present SKU with a result of GAU being less than the G-NNCU (i.e., there are too few units ordered) or GAU being greater than the G-NNCU (i.e., there are extra units ordered). (The determination of next nearest case lots G-NNCU has been described above.) If GAU is equal to G-NNCU then the case lot has been achieved and the system returns to block 248 of FIG. 12C.

Assuming GAU is less than G-NNCU (i.e., the quantity ordered is short of the next nearest case lot units), in block 286 a determination is made as to whether there is a previous BTN with at least one greater unit toward the buyers allowed maximum which may be allocated. If so, the quantity of units of the selected product attributed that buyer will be adjusted in block 287 by the lesser of the number short or the indicated maximum for that BTN, before returning to block 285 to determine if the GAU now equals the G-NNCU, indicating an integral case lot quantity has been achieved. This checking and increasing to the maximum amount of successively prior BTNs continues until an integer number of case lots has been achieved or until all prior BTNs have been changed and a failure to achieve a case lot quantity remains. If an integral caselot quantity is achieved, then there is a return to block 248 of FIG. 12. If the indicated maximum for all BTNs has been allocated and the GAU is still less than G-NNCU, then execution passes to FIG. 12, block 248 at that point.

Assuming GAU is greater than the G-NNCU (i.e., the quantity ordered exceeds the next nearest case lot units), in block 288 a determination is made as to whether there is a previous BTN with at least one lesser unit toward the buyers allowed minimum which may be allocated. If so, the quantity of units of the selected product attributed that buyer will be adjusted in block 289 by the lesser of the number extra or the indicated minimum for that BTN before returning to block 285 to determine if an integral case lot quantity has been achieved. This checking and adjusting to the minimum amount of successively prior BTNs continues until an integer number of case lots has been achieved or until all prior BTNs have been changed and a failure to achieve a case lot quantity remains. If an integral caselot quantity is achieved, then there is a return to block 248 of FIG. 12. If the indicated minimum for all BTNs have been allocated and the GAU is still greater than the G-NNCU, then execution passes to FIG. 12, block 248 at that point.

If, as noted in FIG. 12 decision block 248, an integral case lot quantity has not been ordered for that SKU and the product is only sold in case lot quantities, the buyer will have the option of adjusting (increasing or decreasing) the quantity of units ordered to make a case lot even outside the minimum and maximum range that the buyer prior established (decision block 260) as was presented more fully above when discussing FIG. 12, blocks 256 and thereafter.

Last-In, First-Adjusted with Least Absolute Difference from Preference

Like the flow diagram of FIG. 13, the blocks in FIG. 14 present an optimization algorithm that may optionally be used in block 246 of FIG. 12. The designators 290 through 299 have been assigned to the blocks in FIG. 14 as shown. This algorithm may be designated as Last-In, First-Adjusted (LIFA) with Least Absolute Difference from Preference (LADP), abbreviated as LIFA with LADP. In other words, starting with the most recent buyer order, each prior BTN is examined and adjusted by one unit only from the preferred amount towards one of the maximum or minimum allowable variation limits determined by the buyer until the first of a valid order quantity (eg an integral caselot quantity) is obtained or all the BTNs have been examined and each one adjusted by one unit only and a case lot quantity has still not been obtained.

If the entire list of BTN's has been exhausted and a caselot quantity has not been obtained, then the cycle is repeated in a second cycle, again starting with the most recent buyer except now adding or subtracting one additional unit to the prior adjusted units from the first cycle, for each buyer with an unallocated maximum or minimum until a valid order quantity, (eg an integral caselot quantity) is obtained or all of the BTNs have been adjusted to the buyers' specified allowable maximum and minimum limits without obtaining the desired case lot quantity.

In the second cycle, all the units that have been adjusted in the first cycle are maintained as the new starting quantity, and each BTN, where one additional unit may be added or subtracted, is adjusted toward the allowable maximum or minimum (as appropriate) by one additional unit. The cycles continue until there is no longer a BTN which has one additional maximum or minimum that is unallocated unless and until a valid order quantity (eg a case lot quantity) is prior obtained whereupon execution proceeds to block 248 of FIG. 12C.

If a valid order quantity is not obtained then execution proceeds to block 295 of FIG. 14B to run the same algorithm but now seeking to achieve the next nearest case lot units. If and when a case lot quantity is obtained based on the next nearest case lot units, execution proceeds to block 248 of FIG. 12C. If, after all BTN's have been exhausted for the buyer specified allowable maximum or minimums (as appropriate), a case lot quantity has still not been obtained, then the buyer is also returned to block 248 of FIG. 12C and execution proceeds so as to allow the buyer to modify the order or live with the possibility of an order not being placed for that product in that order cycle.

The steps involved in the above FIG. 14 are similar to those in FIG. 13 and are believed to be presented in clear terminology such that the flow diagram in combination with the above explanation renders a flow diagram and detailed step-by-step explanation unnecessary to a person skilled in the art.

LIFA with LADP provides a similar incentive to order as LIFA alone. However the degree to which a buyer is benefited by ordering early (or alternatively stated, penalized by NOT ordering early) is generally lessened using LIFA with LADP as compared to using LIFA alone. It may be noted that there are variations on the LIFA with LADP algorithm which are encompassed within the present invention. For example, in an accelerated mode the algorithm might attempt a two unit increment for adjustment in the first cycle rather than just a one unit increment for adjustment. This might be either utilized in the first cycle or might be used in response to a one unit increment adjustment in the first cycle which has failed to achieve the success condition. As will be noted below, LIFA with LADP can also be utilized without any specified minimum and maximum limits.

Adjusted In Proportional Amounts (AIPA)

Another allocation algorithm termed AIPA (Adjusted in Proportional Amounts) is described next and outlined in FIG. 15. As the name implies, as needed and up to the allowable maximum and minimum variation limits that may be specified by the buyer, each buyer's preferred amount is adjusted according to that ratio each buyers' preferred amount represents of the group preferred total for that SKU at the time of the adjustment calculation. In this algorithm, buyers needing only a small quantity of products would be likely to add or subtract only a small quantity of products to make a caselot. Such an approach inherently adjusts buyer quantities by larger absolute amounts for those buyers seeking larger purchase quantities and by smaller amounts for those buyers seeking smaller purchase quantities of a given product. In general, the probability of a buyer of larger quantities having greater resources to purchase and store additional units with less resistance to a larger absolute increase or decrease from a preferred amount is the inherent rationale for the AIPA allocation algorithm. This algorithm does not place any premium on ordering early and in a fashion, may present a disincentive to order a larger quantity since the larger purchasers may incur a greater absolute change in the total order than smaller purchasers (up to their allowable minimum or maximum variation limits). It is thus incumbent upon a buyer to know which algorithm is being used when ordering as part of a group and to select carefully their preferred, minimum, and maximum quantities.

Referring to FIG. 15, it will be noted that the various blocks are labeled with designations from 300 to 330. In a first block 300, the preferred quantity of units by the present buyer is divided by the group total preferred units for the same SKU and this fraction is designated the BTN/Group Ratio. The calculation of Group Adjusted Units (GAU) less the Group Nearest Case Lot Units (G-NCU) is then performed in a block 302.

If GAU is less than G-NCU, execution proceeds to a block 304 where the ratio of block 300 is multiplied by the result of the subtraction in block 302 and the product is rounded to a whole number. The rounding, in accordance with design procedures, may be up, down and a function of whether the result is positive or negative. The rounded product is then added to the present buyers preferred quantity up to the maximum indicated by that buyer to obtain a New AIPA Amount as shown in a block 304. Then a total of all the New AIPA Amounts for all buyers are calculated and a new Group Adjusted Units total is calculated in block 306.

A determination is then made in a decision block 308 whether or not the new Group Adjusted Units for that SKU results in an integer caselot quantity. If so, execution proceeds to block 248 of FIG. 12. Otherwise execution proceeds to either block 316 to run the AIPA algorithm using the next nearest case lot units or, in another mode, execution may proceed directly to block 330 and use one of the previously described algorithms of FIG. 13 or 14. The algorithms of FIG. 13 or 14 may be used so that further required adjustments needed to achieve an integral caselot quantity, subsequent to utilizing the AIPA algorithm, may be achieved by one of the algorithms of FIG. 13 or 14 before returning to block 248 of FIG. 12.

If GAU is greater than G-NCU, then a similar procedure is utilized in blocks 312, 314, 326, and 328 as was used for blocks 304, 306, 320, and 322. As may also be observed, if GAU is equal to G-NCU, the process goes directly from block 302 to block 308 and thence to block 248 of FIG. 12. Similarly if the difference in the subtraction within block 318 is zero, the process goes directly from block 318, to block 324 and thence to block 248 of FIG. 12C.

Alternative Variation Methodologies

The LIFA with LADP, and the AIPA algorithms, as well as others may be employed whereby the minimum and maximum variation limits specified by buyers are NOT utilized as constraints. By doing this the quantity of units needed to achieve a valid order quantity for an ordered product can be calculated and communicated to each buyer of the group for the buyer's acceptance (using the specified algorithm), even when the units required to achieve a valid order quantity lie outside any one or more buyer specified minimum or maximum variation limits for that product. The calculations of these would be as follows.

In utilizing the LIFA with LADP algorithm, one would perform the calculations as noted above under LIFA but would simply perform the calculation with the limit being only the Number Short, which is the amount by which the GAU is less than the G-NCU. In the instance where the GAU is greater than the G-NCU, the algorithm as noted in block 294 would perform the calculation up to the Number Extra, which is the amount by which the GAU exceeds the G-NCU. In neither instance would buyer specified maximum or minimum variation limits be utilized as constraints as they are in blocks 293 and 294.

Similarly, in the case of the AIPA algorithm, in the instance of the GAU being less than the G-NCU, the calculations in FIG. 15A block 304 would simply multiply the BTN/Group Ratio times the Number Short and round to the nearest whole number without the constraint noted in block 304 by the clause "up to allowable maximum". In the instance of the GAU being greater than the G-NCU, the calculations in FIG. 15A block 312 would simply multiply the BTN/Group Ratio times the Number Extra and round to the nearest whole number without the constraint noted in block 312 by the clause "up to allowable minimum".

Alternative algorithms may also be employed within maximum deviations established by and for the buyer group (upwards and downwards) by which all buyers in a group are willing to allow adjustments to purchase quantities without requiring the use of minimums or maximums. For example, the buyer group 10 may decide to require, as a condition of membership in the buyer group, a maximum deviation of 30% around any single purchase quantity, which is then a requirement for each product ordered. Alternatively it may be allowed that each buyer (as opposed to buyer group) could establish acceptable maximum percentage deviations for upward and downward adjustments (for each product, order, or for the buyer on all products and orders) on all ordered products to allow the buyer to establish a maximum deviation around buyer specified preferred unit quantities but eliminate the need for specifying minimum and maximum units for each ordered product. If percentage deviations are used, then it may be preferable to establish rounding policies that liberally allow rounding down or up to the nearest integer units. For example, in an instance where 12 units is a case, since 30% of 8 units equals 2.4 units (and 0.4 units is not an integer), then it may be beneficial to allow rounding of 2.4 units either down to 2 units or up to 3 units to increase the probability of achieving the caseload quantity of units which would enable a valid order quantity to be achieved and therefore, an order to be placed. Deviation methodologies may thus also utilize different upward and downward limits.

The alternative deviation methodologies as noted may be used when there is collective agreement among the buyer group, or when an individual buyer is willing to establish an alternative deviation mode to the preferred mode of utilizing buyer specified minimum and maximum variation limits for each product ordered through the group. Effectively, giving up all of the individual buyer's right to specify a maximum or minimum can increase the certainty for a group of buyers that an order will be placed for each product that the buyer orders, but buyers may still wish to set some limits as noted above. The tradeoff of an arrangement which does not utilize any buyer specified maximum or minimum deviation limits would be that the buyer may have to accept a lesser or greater amount of units that are significantly different than the purchase quantities originally ordered by the buyer and, more importantly, are outside a buyer's true acceptable maximum or minimum variation limits for that product. As noted previously, various buyer group or individual buyer modes of establishing variation limits may be utilized based on either the buyer group or each buyer's preferences.

The use of alternative variation methodologies may be enabled in the setup of buyer group information by the buyer-coordinator 28 in block 44 of FIG. 2 and may also be coupled with trigger events. For example, the buyer-coordinator may set up the buyer group so that an optimization calculation is performed at some point prior to the cutoff (e.g., such as 48 hours before cutoff) for each SKU where the group has not achieved a valid order quantity. The buyer adjusted units that result from running this optimization at the trigger event may then be coupled with an electronic communication (e.g. by e-mail) notifying as per FIG. 18 buyers of the group about the quantities of units needed to be ordered by each buyer so as to create a valid order quantity for this SKU in this order cycle. Alternatively a buyer-coordinator 28 could simply run alternative optimization algorithms at will to determine the outcome (with and without minimum and maximum constraints) for any order cycle to aid in decision-making and quantity order planning for the group.

First In, First Adjusted (FIFA) (with or without LADP)

The LIFA and LIFA with LADP algorithms may be modified so that instead of the LAST (most recent) order being the first adjusted with each preceding order next being adjusted as necessary, the FIRST order in the system may be adjusted with each succeeding order thereafter being adjusted as necessary. Such an algorithm is designated First-In, First-Adjusted (FIFA). FIFA may also be coupled with the Least Absolute Difference from Preference (LADP) to achieve a FIFA with LADP algorithm similar to the LIFA with LADP algorithm except selecting the first order placed and adjusting each succeeding order thereafter and by one unit only up to the allowed maximum or minimum. The steps involved are similar to those in FIGS. 13 and 14 except with certain straightforward modifications, some of which are noted in this paragraph, and are believed to be presented in clear terminology such that the flow diagram in combination with the above explanation renders a flow diagram and detailed step by step explanation unnecessary to a person having ordinary skill in the art.

The above algorithms are generally described herein with certain possible variations as noted. However, many additional variations including rounding, order of operations, differing calculations and limits determination methods, and other alterations to these as may readily be envisioned are intended to fall within the scope of the invention.

After completing the allocation algorithms process and achieving a success condition indicating a valid order quantity has been achieved, then the Quantity Optimization Module block 204 in FIG. 11 leads next to the Pricing Module block 206 in FIG. 11.

Figure 16A:
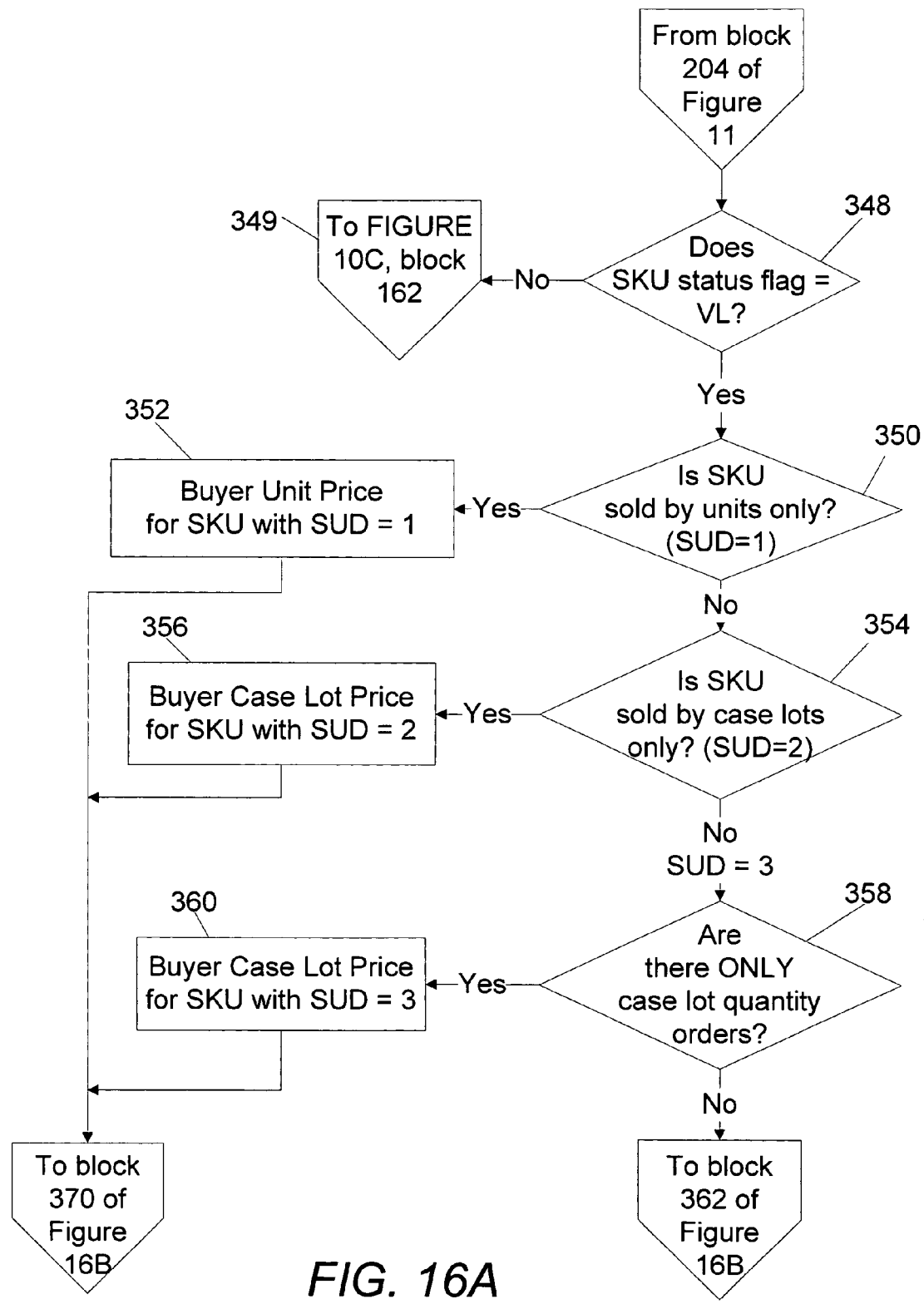
FIGS. 16A-16D are a flow diagram illustrating steps involved in the pricing module of FIG. 11 and includes the pricing algorithms of Average Pricing in FIG. 16C and Pricing by Product in FIG. 16D (FIGS. 16A-16D will be referred to herein collectively and individually as FIG. 16)
Figure 16B:
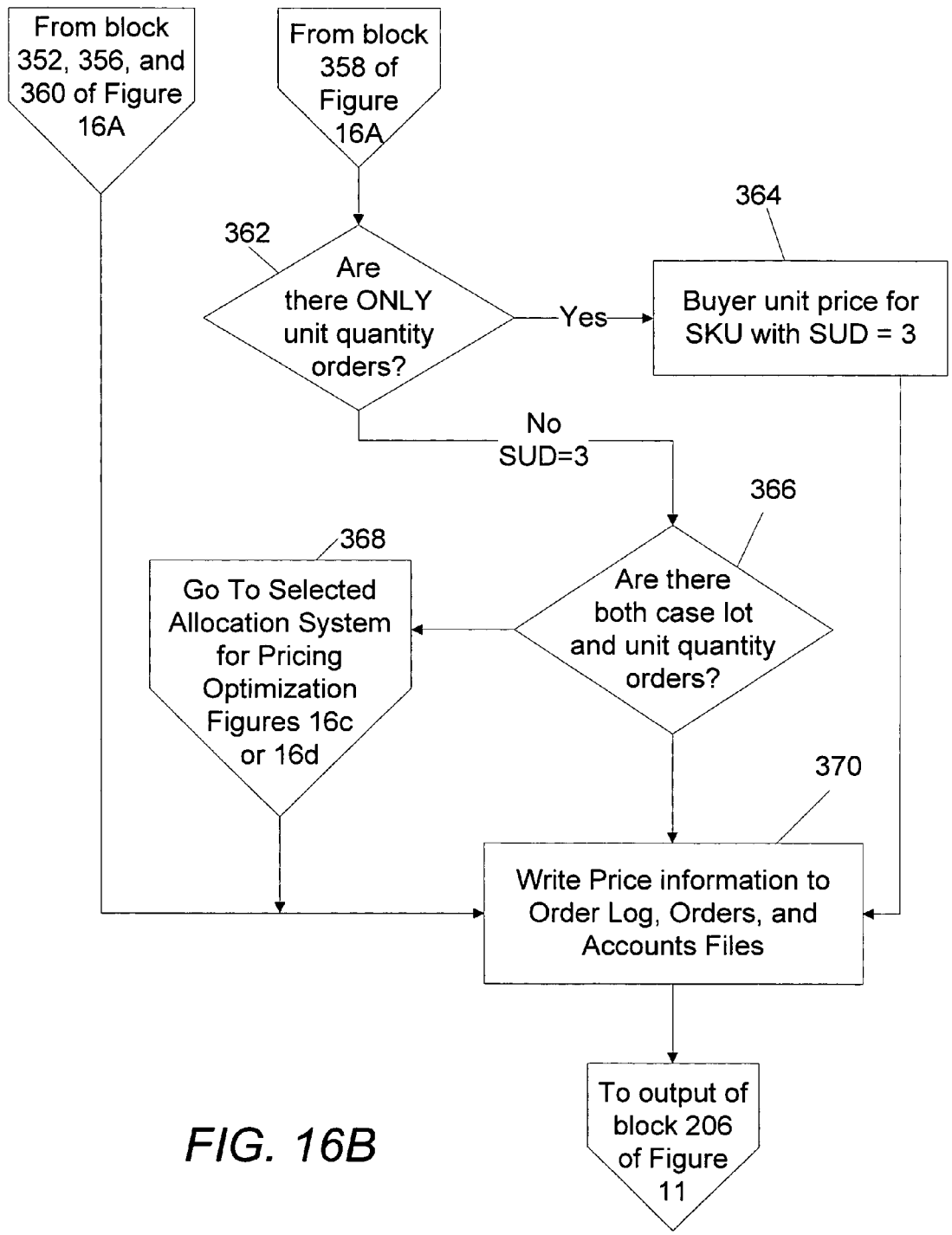
Figure 16C:
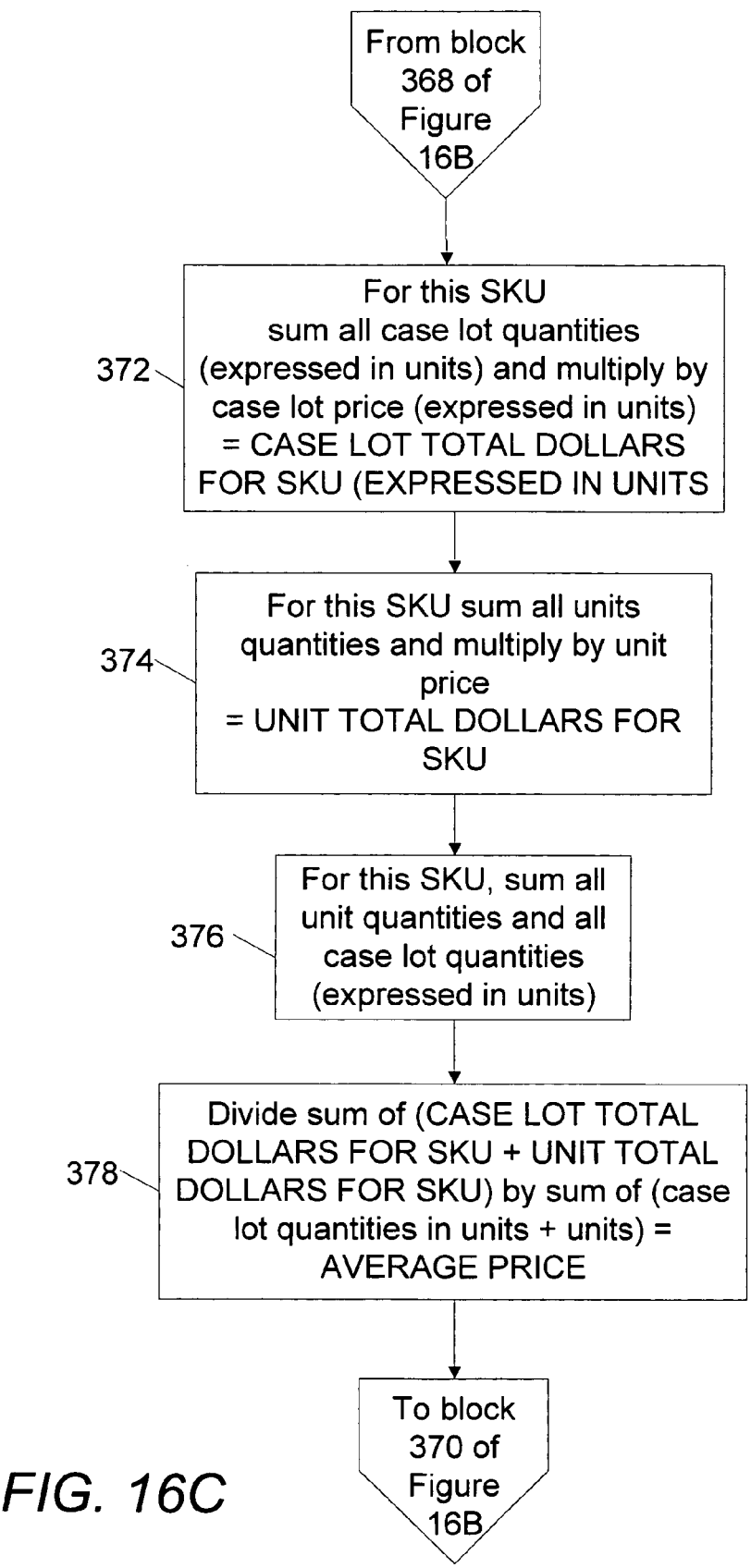
Figure 16D:
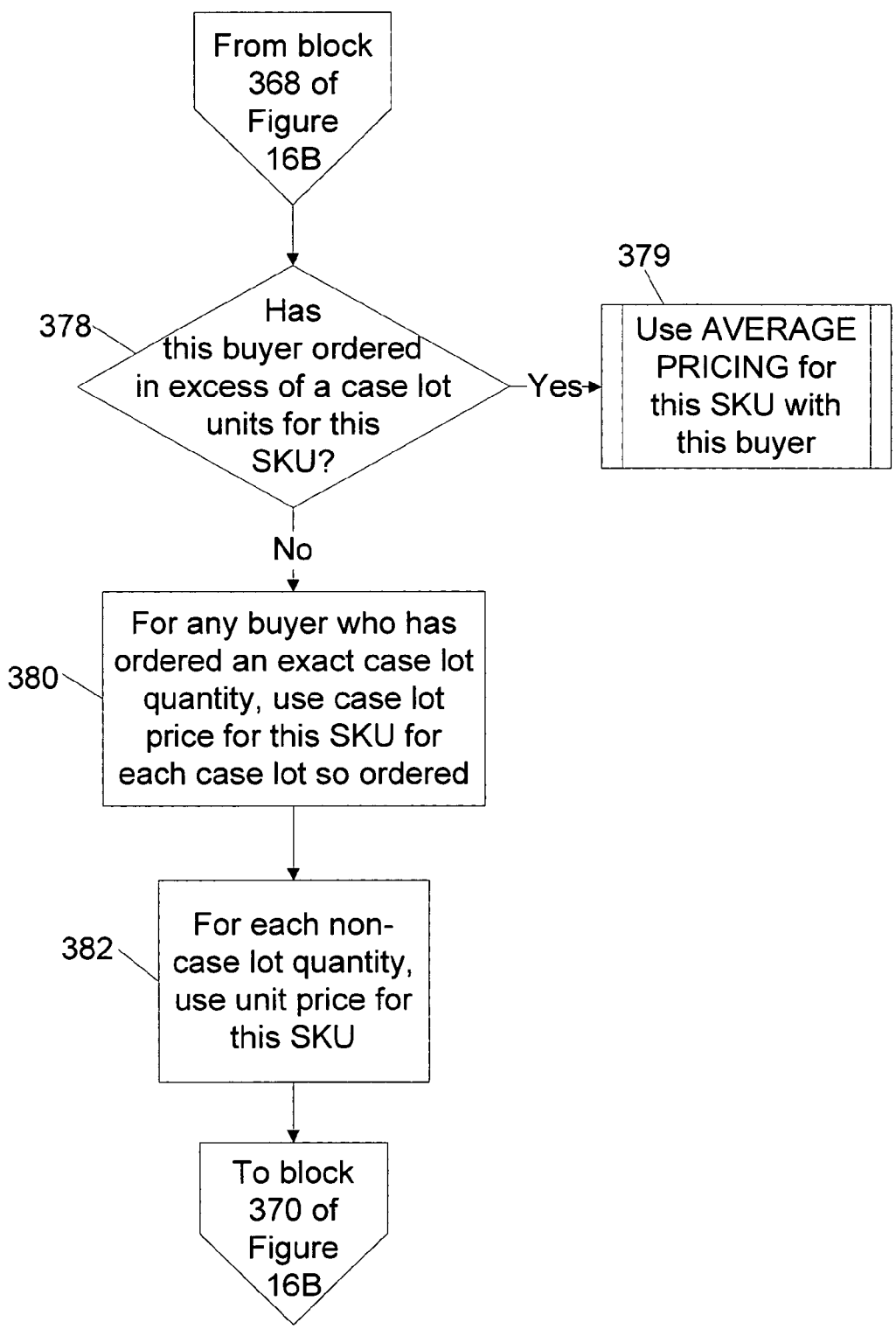

The Pricing Module is described in further detail with respect to FIG. 16 blocks 348 through 382, inclusive of two pricing algorithms that are presented in FIG. 16C and FIG. 16D. The pricing module block of FIG. 16 receives an input from block 204 of FIG. 11 in a decision block 348 to determine if the SKU is part of a valid order for that group. If it is not a valid order (i.e., it is IL or "In Limbo") then execution proceeds to block 349 directing execution to FIG. 10C block 162 for recording the buyer's order information in the appropriate files and displaying buyer orders. If the order is valid (SKU status=VL), then execution next proceeds to block 350 for pricing. In block 350, if the SUD flag is set to "1" for units only, execution proceeds to a block 352 to request the SKU price from data repository 20. When this information is returned it is sent to a block 370 for entry into the order log, the order file, and the accounts files. If the SUD flag is not "1", the next step after block 350 is a decision block 354. If the SUD is "2" the case lot price is obtained in a similar manner through the action of block 356 and forwarded to block 370 for entry into the appropriate files. Execution next proceeds from block 354 to a decision block 358 where a check is made to ascertain if there are only caselot quantity orders at the present time. If so, the caselot price is obtained through the action of the blocks 360 before proceeding to the actions of block 370. If there is an other-than-integer-of-caselot quantity of units ordered, the next step after block 358 is a decision block 362 where it is ascertained if there are only other-than integers-of-case-lot quantities of units of the product being ordered. If so, a request is made for the unit price through the actions of block 364 before the result is next transmitted to block 370.

If none of the previous conditions are met, execution proceeds to a decision block 366 and is forwarded to an Allocation System for Pricing as shown in a block 368, before the price results are transmitted to block 370. Execution then proceeds from the output of pricing module 206 and then to decision block 164 in FIG. 10 where the buyer may make a further update to the order, or conclude the session.

The Allocation System for Pricing mentioned above for determining pricing is applicable where SUD="3" (i.e., the SKU is available in both caselot and unit quantities) and the quantity of units of product ordered are in excess of a case lot but the quantity of units ordered for this product are not an integer multiple of case lot units. The pricing system may be any of many in accordance with the requirements of the buyer-coordinator and two are noted in FIGS. 16C and 16D. One exemplary system noted in FIG. 16C is designated herein as Average Pricing. In FIG. 16C, block 372 denotes a summation of the total dollars of all buyers of case lot orders (as expressed in dollars per unit). Block 374 denotes the total dollars of all other than case lot orders (e.g., unit orders). Block 376 denotes a summation of all unit quantities and all case lot quantities (expressed in units). In block 376 all unit quantities and all case lot quantities (expressed in units) are summated to create the total units for this SKU for this group (or MGP). In block 378 and the sum of blocks 372 and 374 are divided by the sum calculated in block 376 to arrive at the average dollar price per unit. This amount is then passed to block 370 of FIG. 16B and is charged to each buyer based on the quantity of units that they have ordered (regardless as to whether the order is a caselot or a unit order).

A second allocation approach in this instance is described in FIG. 16D and is termed Pricing by Product. This approach is to simply charge buyers who have ordered case lot quantities, the exact case lot price (block 380) and the buyers who have ordered units, the exact unit price (block 382). As noted in block 378, a single buyer who for a given SKU has ordered in excess of a caselot quantity would be accorded Average Pricing as noted in block 379, although the case lot order and the units order prices may be presented separately to the buyer. Pricing by Product provides to the buyer group (and not to the buyers) the benefits of lower pricing from aggregation of orders. For instance, if two buyers collectively achieve exactly a caselot quantity of units, but are nonetheless each charged single unit pricing (which is typically significantly higher than caselot pricing), then the cost savings from achieving the caselot quantity are not provided to the buyers but rather the cost savings accrue to the benefit of the buyer group.

It will be apparent that the above quantity and pricing allocation algorithms generally teach those key elements which may enable the allocations and calculations of order quantities to be implemented by one of ordinary skill in the art. Although the above description of prices has used dollars as the cited currency, the pricing of the products may be in any currency that is acceptable to sellers and buyers and is thus not limited to any one currency. Sales and any other applicable taxes, markups, commissions, or other surcharges are preferably included in the product price so that buyers will view the actual full price inclusive of all add-ons for those products which buyers choose to order.

Additional elements of the invention which are also important but which may require less detailed explanation follow next. The order log file in which the OTNs for each buyer are recorded may be in perpetual existence. However, to prevent massive data build up and system performance degradation, the data in the order log file may be transferred from the order log file to monthly accounting files for all closed order cycles as part of a monthly accounting cycle. By performing this step monthly for all closed order cycles, monthly account records are maintained and the order log file is kept to a manageable size so as not to impair system performance. Similarly, the Buyer Adjusted Quantity, Group Adjusted Quantity and MGP Adjusted Quantity files may be transferred and purged as part of the monthly accounting cycles for closing all completed order cycles.

Buyers are preferably provided with the ability to access online the information needed to identify and select an SKU for placing an order. Buyers may also store their personal data, including past orders and payments for past and current order cycles in which they have placed orders, on electronic media which is in the buyer's own possession and control in addition to such information being stored in the data repository. A database of information from both the suppliers, such as product information, and from the buyers is preferably maintained in the data repository 20. The flow diagram of FIG. 17 presents steps of a buyer-coordinator 28 with respect to the product information supplied by the supplier and inserted in the data repository 20. The buyer-coordinator 28 enters the program as shown in a block 400 and chooses, in a block 402, to update product information as relates to the condition of said data as it might be or is supplied by a supplier. Next, the buyer-coordinator 28 retrieves and views the product information file in a block 404. An SKU is selected or perhaps added in a block 406 and the request is sent to the data repository 20 to retrieve data on a selected SKU. This retrieved data preferably includes data obtained from or provided by the supplier as to pricing to the group (for at least one of a unit quantity and a case lot quantity if there is a price difference), the order quantity increments (units or a case lot), minimum order quantity, a product description, packaging and dietary information, and so forth.

Supplier data may be modified at any time preferably by a supplier but may also be updated by the buyer-coordinator 29 or the SYSOP 19. The modification of product information, such as unit or case lot prices, may occur for any of a number of other reasons such as altered pricing from the original manufacturer or grower (when the supplier to the buyer group is a distributor), increased shipping costs, price specials, discontinued products, and the like. The retrieved data is returned to block 406 for use by the buyer-coordinator and, if supplier data has changed, the buyer-coordinator 28 may wish to change data, such as the pricing that is accessible by the buyers in the buyer group. This changed data is updated in connection with a block 410 along with a log file 412 and the product information file 414 both of which files will typically be stored in the data repository 20. After the change, a decision block 416 will ascertain if any more SKUs are to be reviewed and/or changed. If so there is a return to block 406; otherwise, the product information software module ends. The ending may merely result in the return to a main menu for logging off the system or choosing another action.

Buyers can thus access the latest product information that a supplier has provided including special pricing of products, products which are going to be discontinued, new products which are available, or new suppliers of those products. It is noted that real time integration with supplier inventory data affords buyers the opportunity to know in advance and at the time of placing their orders which products are in stock and which are out of stock, thus allowing buyers to choose alternative replacement products as necessary and desired.

Figure 18:
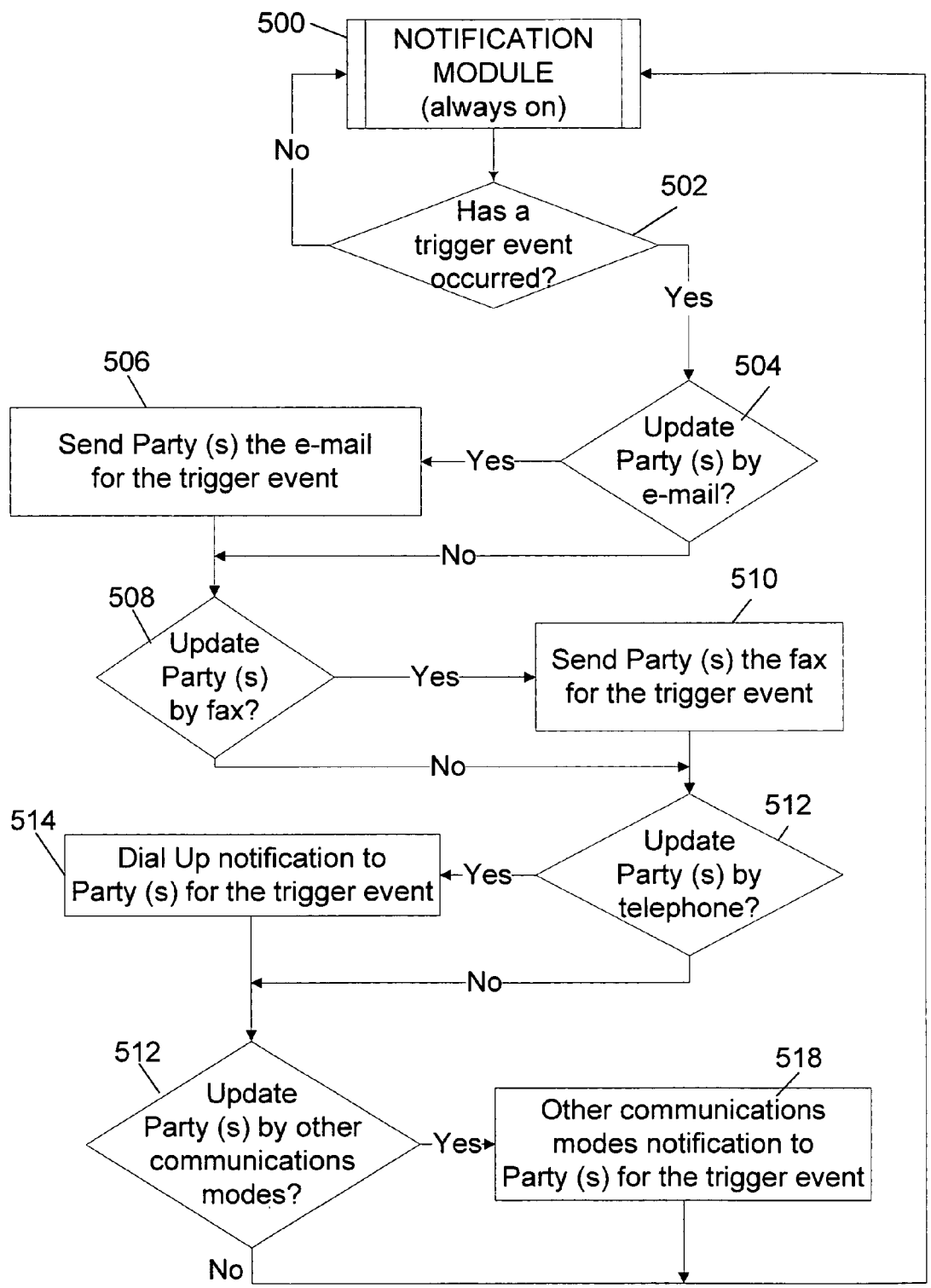
FIG. 18 is a flow diagram illustrating a process of creating a notice for buyers based on a trigger event condition.

As is noted in FIG. 18, it is contemplated that at pre-established points, designated trigger events, which may be determined by at least one of the buyer-coordinator, the buyer, and the system, notifications may be sent by e-mail as noted in block 506, by fax as noted in block 510, or by telephone as noted in block 514, or by other communications modes as noted in block 518, so that buyers will know information such as orders placed for products which did not achieve case lot quantities and thus may be modified, additional products from other buyers in the group which also did not achieve case lot quantities, and updates on lack of availability of products in a supplier's inventory or which were not shipped with the current order. Further, after a buyer selects an additional product to order, a trigger may be activated which utilizes the notification system to send communications via e-mails, faxes, or other communications modes to other buyers in the group indicating that a new product has been selected by one buyer and additional units are needed for ordering this product so that a valid order quantity can be achieved.

Through the functionality afforded by the present invention, purchase quantity adjustments and optimizations are enabled, many tedious and time consuming activities between the buyer-coordinator and buyers are eliminated, and buyers can receive better product information from suppliers while placing their orders with an increased likelihood of buyer orders being placed and then filled. Further a buyer may also make alternate plans for purchasing products elsewhere should products not be shipped in a more timely fashion based upon information provided to buyers while in communication with the data repository 20.

Additionally, the present invention provides substantially instantaneous updating, aggregation, and optimization of buyer order quantities. Moreover, the present invention provides an online mode of aggregating a composite order for a group of buyers which is then communicated with at least one supplier of products. Suppliers are able to provide updated information to the buyer group and buyers on a real time basis as buyers utilize the invention to place their orders. Communications functions are enabled which save time and increase order efficiency and effectiveness for buyer groups.

Various modifications of the disclosed embodiments, as well as alternative embodiments of the invention, will become apparent to persons skilled in the art upon reference to the description of the invention. It is therefore, contemplated that the claims will cover any such modifications or embodiments that fall within the true scope and spirit of the invention.

The invention claimed is:

1. A data repository comprising an interface for communicating over a computer network, said data repository comprising a computer usable medium having computer readable program code embodied therein executable by a processor, said program code comprising:

program code for receiving from each of two or more buyer terminals of a group of buyers a quantity of units of said product desired to be ordered by each of said two or more buyers;

program code for calculating the total units of said product desired to be ordered as the sum of the quantity of units of said product desired to be ordered by each of said two or more buyers;

program code for determining at least one valid order quantity of units of said product, wherein said at least one valid order quantity of units is the multiplicative product of at least one integer and a pre-defined number of units;

program code for determining for each of said at least one valid order quantity of units the absolute difference between said total units and a respective one of each of said at least one valid order quantity of units;

program code for determining a minimum absolute difference of said absolute differences between said total units and each of said at least one valid order quantity of units; and program code for identifying as a nearest valid order quantity that valid order quantity that is equivalent to adjusting by said minimum absolute difference said total units of said product desired to be ordered.

2. The data repository of claim 1 wherein program code for determining further comprises:

program code for determining at least two valid order quantities of units of said product, wherein said at least two valid order quantities of units is the multiplicative product of at least two integers and a pre-defined number of units;

program code for determining for each of said at least two valid order quantities of units the absolute difference between said total units and a respective one of each of said at least two valid order quantity of units;

program code for determining a first least minimum absolute difference of said absolute differences between said total units and each of said at least two valid order quantities of units, the valid order quantity of units corresponding to said first least minimum absolute difference constituting said nearest valid order quantity of units;

program code for determining a second least minimum absolute difference of said absolute differences between said total units and each of said at least two valid order quantities of units, the valid order quantity of units corresponding to said second least minimum absolute difference constituting a next nearest valid order quantity of units; and program code for adjusting said total units of said product by at least one of said first least minimum absolute difference and said second least minimum absolute difference.

3. The data repository of claim 1 wherein said quantity of units of said product desired to be ordered by each of said two or more buyers comprises a preferred quantity and at least one of a minimum quantity and a maximum quantity, and the program code for calculating further comprises calculating the total units of said product desired to be ordered as the respective sum of at least one of: total minimum quantities, total preferred quantities, and total maximum quantities of units of said product, desired to be ordered by said each of said two or more buyers.

4. The data repository of claim 1 said desired quantity comprises at least one of a preferred quantity, a minimum quantity, a maximum quantity, a prior ordered purchase quantity, and a combination quantity of units of said product, wherein said combination quantity comprises at least one of a preferred quantity less a deviation and a preferred quantity plus a deviation.

5. The data repository of claim 1 the program code for receiving, calculating, determining, and identifying are executed contemporaneously.

6. The data repository of claim 1 the program code for receiving, calculating, determining, and identifying is repeated for at least one additional product.

7. The data repository of claim 1 further comprising program code for adjusting said quantities of units of said product desired to be ordered by one or more of said two or more buyers by at least a portion or all of said minimum absolute difference until the sum of the quantity of units of said product desired to be ordered by each of said two or more buyers is equal to said nearest valid order quantity.

8. The data repository of claim 1 wherein the valid order quantity of units corresponding to said minimum absolute difference constitutes a nearest valid order quantity of units, said computer readable program code further comprising:
   program code for determining whether said nearest valid order quantity is less than or greater than said total units;
   program code for upon a determination that said nearest valid order quantity is less than said total units, decreasing said quantity of units of said product desired to be ordered by at least one of said two or more buyers; and
   upon a determination that said nearest valid order quantity is greater than said total units, program code for increasing said quantity of units of said product desired to be ordered by at least one of said two or more buyers.

9. The data repository of claim 1 wherein the valid order quantity of units corresponding to said minimum absolute difference constitutes a nearest valid order quantity of units, said computer readable program code further comprising:
   program code for determining whether said nearest valid order quantity is less than or greater than said total units; and
   upon a determination that said nearest valid order quantity is less than said total units, program code for decreasing said quantity of units of said product desired to be ordered by at least one of said two or more buyers until said total units is equal to said nearest valid order quantity; and
   upon a determination that said nearest valid order quantity is greater than said total units, program code for increasing said quantity of said product desired to be ordered by at least one of said two or more buyers until said total units is equal to said nearest valid order quantity.

10. The data repository of claim 1 wherein the valid order quantity of units corresponding to said minimum absolute difference constitutes a nearest valid order quantity of units, the computer readable program code further comprising program code for adjusting said quantity of units of said product desired to be ordered by at least one of said two or more buyers by the lesser of:
    the absolute difference between said total units and said nearest valid order quantity, and
    the absolute difference between (1) said quantity of units of said product desired to be ordered by at least one of said two or more buyers and (2) a predefined maximum deviation from said quantity of units of said product desired to be ordered by at least one of said two or more buyers.

11. The data repository of claim 1 wherein the valid order quantity of units corresponding to said minimum absolute difference constitutes a nearest valid order quantity of units, and wherein said quantity of units of said product desired to be ordered by each of said two or more buyers are placed in respective orders, said computer readable program code further comprising:
    program code for recording the sequence in which each order is received from each of said two or more buyers; and
    program code for adjusting the quantity of units of said product ordered by a buyer in the most recently received order that has not yet been adjusted, by the lesser of:
    the absolute difference between said total units and said nearest valid order quantity, and
    the absolute difference between said purchase quantity of units of said product ordered by said buyer and a predefined maximum deviation from said quantity of units of said product ordered by said buyer.

12. The data repository of claim 1, wherein the valid order quantity of units corresponding to said minimum absolute difference constitutes a nearest valid order quantity of units, and wherein said quantity of units of said product desired to be ordered by each of said two or more buyers are placed in respective orders, said computer readable program code further comprising:
    program code for recording the sequence in which each order is received from each of said two or more buyers; and
    program code for cyclically adjusting by a single unit at a time said total units and said quantity of units desired to be ordered from each of said two or more buyers in sequence from the most recently received order to the earliest received order until said total units is equal to said nearest valid order quantity.

13. The data repository of claim 1 wherein the valid order quantity of units corresponding to said minimum absolute difference constitutes a nearest valid order quantity of units, and wherein said quantity of units of said product desired to be ordered by each of said two or more buyers are placed in respective orders, said computer readable program code further comprising:
    program code for recording the sequence in which each order is received from each of said two or more buyers; and
    program code for cyclically adjusting by a single unit at a time said total units and said quantity of units ordered from each of said two or more buyers in sequence from the most recently received order to the earliest received order, omitting said adjustment of an order if a predefined maximum deviation in a quantity of units ordered by a buyer who placed a respective order is attained, until said total units is equal to said nearest valid order quantity.

14. The data repository of claim 1 wherein the valid order quantity of units corresponding to said minimum absolute difference constitutes a nearest valid order quantity of units, and wherein said quantity of units of said product desired to be ordered by each of said two or more buyers are placed in respective orders, said computer readable program code further comprising:
program code for recording the sequence in which each order is received from each of said two or more buyers who place an order;
program code for calculating for each order, the ratio of the quantity specified by each respective order to the total units;
program code for calculating the absolute difference between the total units and said nearest valid order quantity;
program code for calculating for each respective order, the numerical result of multiplying said ratio by said absolute difference, and adjusting said quantity of each respective order with reference to each respective numerical result;
program code for determining whether said updated total units is equal to said nearest valid order quantity and, upon a determination that said updated total units does not equal said nearest valid order quantity, adjusting said quantity of units ordered by a buyer in the most recently placed order that has not yet been adjusted, by the lesser of:
the difference between the total units and said nearest valid order quantity, and
the difference between said quantity of units ordered by a buyer and a predefined maximum deviation in the most recently placed order that has not yet been adjusted.

15. The data repository of claim 1 wherein the valid order quantity of units corresponding to said minimum absolute difference constitutes a nearest valid order quantity of units, and wherein said quantity of units of said product desired to be ordered by each of said two or more buyers are placed in respective orders, said computer readable program code further comprising:
program code for recording the sequence in which each order is received from each of said two or more buyers desiring one or more units of said respective product;
program code for calculating for each order, the ratio of the quantity of units of said product specified by each respective order to the total units of said product;
program code for calculating the absolute difference between the total units and said nearest valid order quantity;
program code for calculating for each respective order, the numerical result of multiplying said ratio by the absolute difference, and adjusting said quantity of each respective order with reference to each respective numerical result up to a maximum deviation specified for each respective order;
program code for repeating the program code for calculating said total units to thereby update said total units; and
program code for determining whether said updated total units is equal to said nearest valid order quantity and upon a determination that said updated total units does not equal said nearest valid order quantity, adjusting the quantity of units ordered by a buyer in the most recently placed order that has not yet been adjusted, by the lesser of:
the difference between said total units and said nearest valid order quantity, and
the difference between the quantity of units of said product and a predefined maximum deviation in the most recently placed order that has not yet been adjusted.

16. The data repository of claim 1 wherein the valid order quantity of units corresponding to said minimum absolute difference constitutes a nearest valid order quantity of units, and wherein said quantity of units of said product desired to be ordered by each of said two or more buyers are placed in respective orders, said computer readable program code further comprising:
program code for recording the sequence in which each order is received from each buyer desiring one or more units of said respective product;
program code for calculating for each order, the ratio of the quantity of units of said product specified by each respective order to the total quantity of units of said product;
program code for calculating the absolute difference between the total quantity and said nearest valid order quantity;
program code for calculating for each respective order, the numerical result of multiplying said ratio by said absolute difference, and adjusting said quantity of each respective order with reference to each respective numerical result; and
program code for repeating the program code for calculating total units to thereby generate an updated total units;
program code for determining whether said updated total units is equal to said nearest valid order quantity and, upon a determination that said updated total units does not equal said nearest valid order quantity, repeating the program code for identifying, wherein the program code for identifying further comprises:
program code for identifying as a nearest valid order quantity that valid order quantity that is equivalent to adjusting by a single unit the quantity of units specified in the order received from each of said two or more buyers in cyclical sequence from the most recently received order to the earliest received order until the total units is equal to said near valid order quantity.

17. The data repository of claim 1 wherein the valid order quantity of units corresponding to said minimum absolute difference constitutes a nearest valid order quantity of units, and wherein said quantity of units of said product desired to be ordered by each of said two or more buyers are placed in respective orders, said computer readable program code further comprising:
program code for recording the sequence in which each order is received from each of said two or more buyers desiring one or more units of said respective product;
program code for calculating for each order of a respective product, the ratio of the quantity specified by each respective order to the total units;
program code for calculating the absolute difference between said total units and said nearest valid order quantity;
program code for calculating for each respective order, the numerical result of multiplying said ratio by said absolute difference, and adjusting said quantity of each respective order with reference to each respective numerical result up to a maximum deviation specified for each respective order;

program code for repeating the program code for calculating a total units to thereby generate an updated total units;

program code for determining whether said updated total units is equal to said nearest valid order quantity and upon a determination that said updated total units does not equal said nearest valid order quantity, repeating the program code for identifying, wherein the program code for identifying further comprises:

program code for identifying as a nearest valid order quantity that valid order quantity that is equivalent to cyclically adjusting by a single unit the quantity of units specified in the order received from each of said two or more buyers in sequence from the most recently received order to the earliest received order, omitting said adjustment of an order if a predefined maximum deviation of a respective order is attained, until the total units is equal to said nearest valid order quantity.

18. The data repository of claim 1 wherein the valid order quantity of units corresponding to said minimum absolute difference constitutes a nearest valid order quantity of units, and wherein said quantity of units of said product desired to be ordered by each of said two or more buyers are placed in respective orders, and wherein said quantity of units of said product comprises a preferred quantity and at least one of a minimum quantity and a maximum quantity, said computer readable program code further comprising:

program code for calculating for said product a total preferred units comprising a sum of a referred quantity of units of said respective product specified in each order;

program code for calculating for said product a total minimum units comprising a sum of a minimum quantity of units of said respective product specified in each order;

program code for calculating for said product a total maximum units comprising a sum of a maximum quantity of units of said respective product specified in each order;

program code for determining whether said total preferred units is less than or greater than said nearest valid order quantity;

upon a determination that said total preferred units is less than said nearest valid order quantity, program code for increasing a quantity of units of said respective product to be allocated to at least one respective buyer who desires one or more units of said respective product to a quantity of units not greater than said maximum quantity of units of said respective product to be allocated to each respective buyer; and upon a determination that said total preferred units is greater than said nearest valid order quantity, program code for decreasing a quantity of units of said respective product to be allocated to at least one respective buyer who desires one or more units of said respective product to a quantity of units not less than said minimum quantity of units of said respective product to be allocated to each respective buyer.

19. The data repository of claim 1 wherein the valid order quantity of units corresponding to said minimum absolute difference constitutes a nearest valid order quantity of units, and wherein said quantity of units of said product desired to be ordered by each of said two or more buyers are placed in respective orders, and wherein said quantity of units of said product is a preferred quantity of units of said product, said computer readable program code further comprising:

program code for receiving from each respective buyer of said two or more buyers of said group of buyers with said respective at least one order at least one deviation from said preferred quantity of units of said product; and program code for determining a maximum quantity and a minimum quantity of units of said product with reference to said preferred quantity of units of said product and said at least one deviation.

20. The data repository of claim 1 said quantity of units of said product desired to be ordered by each of said two or more buyers are placed in respective orders, and wherein said quantity of units of said product is a preferred quantity of units of said product, said computer readable program code further comprising:

program code for receiving from each respective buyer of said two or more buyers of said group of buyers with said respective at least one order at least one deviation from said preferred quantity of units of said product, wherein said deviation comprises at least one of a predefined integer quantity of units and a predefined percentage of said preferred quantity of units; and program code for determining a maximum quantity and a minimum quantity of units of said product with reference to said preferred quantity of units of said product and said at least one deviation.

21. The data repository of claim 1 said quantity of units of said product desired to be ordered by each of said two or more buyers are placed in respective orders, and wherein said quantity of units of said product is a preferred quantity of units of said product, said computer readable program code further comprising:

program code for receiving from each respective buyer of said two or more buyers of said group of buyers with said respective at least one order at least one of a maximum deviation decrease and a maximum deviation increase from said preferred quantity of units of said product, wherein said maximum deviation decrease comprises at least one of a predefined maximum integer quantity decrease of units and a predefined maximum percentage decrease of said preferred quantity of units, and said maximum deviation increase comprises at least one of a predefined maximum integer quantity increase of units and a predefined maximum percentage increase of said preferred quantity of units; and program code for determining a minimum quantity and a maximum quantity of units of said product with reference to said preferred quantity of units of said product and respective said at least one maximum deviation decrease and said at least one maximum deviation increase.

22. The data repository of claim 1 said quantity of units of said product desired to be ordered by each of said two or more buyers are placed in respective orders, and wherein said quantity of units of said product is a preferred quantity of units of said product, said computer readable program code further comprising:

program code for receiving from each respective buyer of said two or more buyers of said group of buyers with said respective at least one order at least one of a predefined maximum percentage decrease of units from said preferred quantity of units of said product and a predefined maximum percentage quantity increase of units to said preferred quantity of units of said product; and program code for calculating for each buyer who desires one or more units of said respective product at least one of a maximum quantity of units of said respective product that may be ordered, said maximum quantity being the numerical result of adding the multiplicative product of said predefined maximum percentage increase and said preferred quantity of units specified in said order placed by said at least one buyer for said respective product to said preferred quantity of units specified in said order placed by said at least one buyer for said respective product, and a minimum quantity of units of said respective product that may be ordered, said minimum quantity being the numerical result of subtracting said predefined maximum percentage decrease multiplied by said preferred quantity of units specified in said order placed by said at least one buyer for said respective product from said preferred quantity of units specified in said order placed by said at least one buyer for said respective product.

23. The data repository of claim 1 said quantity of units of said product desired to be ordered by each of said two or more buyers are placed in respective orders, and wherein said quantity of units of said product comprises a preferred quantity of units of said product, and said computer readable program code further comprises:
   program code for receiving from each respective buyer of said two or more buyers with said respective at least one order for said product at least one of a predefined maximum integer quantity decrease of units and a predefined maximum integer quantity increase of units; and
   program code for calculating for each of said two or more buyers who desires one or more units of said respective product at least one of a maximum quantity of units of said respective product that may be ordered, said maximum quantity being the sum of said preferred quantity of units specified in said order placed by said at least one buyer for said respective product and said predefined maximum integer quantity of units added to said maximum quantity increase of units, and a minimum quantity of units of said respective product that may be ordered, said minimum quantity being said preferred quantity of units specified in said order placed by said at least one buyer for said respective product less the predefined maximum integer quantity decrease of units.

24. The data repository of claim 1 further comprising:
   program code for determining whether said nearest valid order quantity is less than or greater than said total units;
   program code for upon a determination that said nearest valid order quantity is less than said total units, decreasing said quantity of units of said product ordered by at least one respective buyer, and repeating the program code for calculating said total units and decreasing until said total units of said product is equal to said nearest valid order quantity; and
   upon a determination that said nearest valid order quantity is greater than said total units, program code for increasing said quantity of units of said product ordered by said at least one respective buyer, and repeating the program code for calculating, determining and increasing until said total units of said product is equal to said nearest valid order quantity.

25. The data repository of claim 1 further comprising:
   program code for determining whether said nearest valid order quantity is less than or greater than said total units; and
   upon a determination that said nearest valid order quantity is less than said total units, program code for decreasing said quantity of units of said product ordered by at least one respective buyer; and
   upon a determination that said nearest valid order quantity is greater than said total units, program code for increasing said quantity of units of said product ordered by at least one respective buyer.

26. The data repository of claim 1 further comprising program code for adjusting the quantity of units of said product desired to be ordered by each of said two or more buyers until said minimum absolute difference is minimized.

27. The data repository of claim 1 further comprising program code for displaying said minimum absolute difference to at least one of said each of said two or more buyers to enable at least one of said each of said two or more buyers to adjust the quantity of units of said product desired to be ordered by at least one of said each of said two or more buyers.

28. The data repository of claim 1 the program code for determining a minimum absolute difference further comprises program code for determining a minimum absolute difference of the absolute differences between said total units and at least one valid order quantity of units that is equal to or greater than said total units of said product desired to be ordered.

29. The data repository of claim 1 further comprising program code for placing an order for said nearest valid order quantity of said product to a supplier of said product.

30. The data repository of claim 1 further comprising program code for receiving an order for said nearest valid order quantity of said product.

31. A computer program article for use with a computer for facilitating the ordering of products, the computer program article comprising a computer usable medium having computer readable program code embodied therein executable by a processor, said program code comprising:
   program code for receiving from two or more buyers of a group of buyers a quantity of units of said product desired to be ordered by said two or more buyers;
   program code for calculating the total units of said product desired to be ordered by said two or more buyers;
   program code for determining at least one valid order quantity of units of said product, wherein said at least one valid order quantity of units is the multiplicative product of at least one integer and a pre-defined number of units;
   program code for determining for each of said at least one valid order quantity of units the absolute difference between said total units and a respective one of each of said at least one valid order quantity of units;
   program code for determining a minimum absolute difference of the differences between said total units and each of said at least one valid order quantity of units; and
   program code for identifying as a nearest valid order quantity that valid order quantity that is equivalent to adjusting by said minimum absolute difference said total units of said product desired to be ordered.

32. The computer program article of claim 31 wherein the program code for receiving, calculating, determining, and identifying is executed contemporaneously.

33. A system for facilitating the ordering of products, the system comprising:
   a communications network;
   a plurality of buyer terminals connectable to said communications network and accessible to a respective plurality of buyers; and
   a data repository coupled to said communications network, said data repository comprising a computer usable medium having computer readable program code embodied therein executable by a processor, said program code comprising:
   program code for receiving via said network from two or more buyer terminals of a group of buyer terminals a quantity of units of said product desired to be ordered by a respective two or more buyers of said plurality of buyers;
   program code for calculating the total units of said product desired to be ordered by said two or more buyers;

program code for determining at least one valid order quantity of units of said product, wherein said at least one valid order quantity of units is the multiplicative product of at least one integer and a pre-defined number of units;

program code for determining for each of said at least one valid order quantity of units the absolute difference between said total units and a respective one of each of said at least one valid order quantity of units;

program code for determining a minimum absolute difference of the differences between said total units and each of said at least one valid order quantity of units; and program code for identifying as a nearest valid order quantity that valid order quantity that is equivalent to adjusting by said minimum absolute difference said total units of said product desired to be ordered.

34. The system of claim 33 wherein the program code for receiving, calculating, determining, and identifying is executed contemporaneously.

35. A data repository comprising an interface for communicating over a computer network, said data repository comprising a computer usable medium having computer readable program code embodied therein executable by a processor, said program code comprising:

program code for receiving via said network from two or more buyer terminals of a group of buyer terminals a quantity of units of a product desired to be ordered by a respective two or more buyers;

program code for calculating the total units of said product desired to be ordered by said two or more buyers;

program code for determining at least one valid order quantity of units of said product, wherein said at least one valid order quantity of units is the multiplicative product of at least one integer and a pre-defined number of units;

program code for determining for each of said at least one valid order quantity of units the absolute difference between said total units and a respective one of each of said at least one valid order quantity of units;

program code for determining a minimum absolute difference of the differences between said total units and each of said at least one valid order quantity of units; and program code for adjusting by said minimum absolute difference said total units of said product desired to be ordered.

* * * * *